US011006073B1

(12) United States Patent
de Benoist et al.

(10) Patent No.: US 11,006,073 B1
(45) Date of Patent: May 11, 2021

(54) VIRTUAL WORLD METHOD AND SYSTEM FOR AFFECTING MIND STATE

(71) Applicant: Steelcase Inc., Grand Rapids, MI (US)

(72) Inventors: Nicolas de Benoist, Paris (FR); Francis Gerard Graziano, Grand Rapids, MI (US); Mark Baloga, East Grand Rapids, MI (US); Paul Noll, Grand Rapids, MI (US); Terry West, Caledonia, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 16/516,984

(22) Filed: Jul. 19, 2019

Related U.S. Application Data

(63) Continuation of application No. 15/385,192, filed on Dec. 20, 2016, now Pat. No. 10,404,938.

(60) Provisional application No. 62/270,898, filed on Dec. 22, 2015.

(51) Int. Cl.
*G06F 3/048* (2013.01)
*H04N 7/14* (2006.01)
*G06T 11/60* (2006.01)
*H04N 7/15* (2006.01)

(52) U.S. Cl.
CPC ............. *H04N 7/147* (2013.01); *G06T 11/60* (2013.01); *H04N 7/15* (2013.01)

(58) Field of Classification Search
CPC .......... G06F 3/0484; G06T 11/60; H04N 7/15
See application file for complete search history.

(56) References Cited

U.S. PATENT DOCUMENTS

| 5,111,392 | A | 5/1992 | Malin |
| 5,293,479 | A | 3/1994 | Quintero et al. |
| 5,396,583 | A | 3/1995 | Chen et al. |
| 5,442,733 | A | 8/1995 | Kaufman et al. |
| 5,847,971 | A | 12/1998 | Ladner et al. |
| 5,850,352 | A | 12/1998 | Moezzi et al. |
| 5,929,861 | A | 7/1999 | Small |

(Continued)

FOREIGN PATENT DOCUMENTS

| EP | 1189174 A3 | 11/2002 |
| WO | 9631047 A2 | 10/1996 |

(Continued)

OTHER PUBLICATIONS

Tang, et al., Display and Presence Disparity in Mixed Presence Groupware, In Proceedings of the Fifth Conference on Australasian User Interface, vol. 28, pp. 73-82, Australian Computer Society, Inc., 2004.

(Continued)

*Primary Examiner* — Mahelet Shiberou
(74) *Attorney, Agent, or Firm* — Quarles & Brady LLP

(57) ABSTRACT

A system and method for creating a virtual world conferencing experience wherein a first set of real world emissive surfaces and content thereon is replicated on virtual world emissive surfaces where the virtual world emissive surfaces are juxtaposed in a virtual world instance at locations and in orientations that replicate the juxtapositions in the real world arrangement and where the virtual world instance is presented on a second set of real world emissive surfaces at a virtual world workstation where the second set of emissive surfaces are arranged differently than the first set of real world surfaces.

20 Claims, 48 Drawing Sheets

(56) References Cited

U.S. PATENT DOCUMENTS

| | | |
|---|---|---|
| 6,002,855 A | 12/1999 | Ladner et al. |
| 6,052,669 A | 4/2000 | Smith et al. |
| 6,198,852 B1 | 3/2001 | Anandan et al. |
| 6,271,842 B1 | 8/2001 | Bardon et al. |
| 6,522,312 B2 | 2/2003 | Ohshima et al. |
| 6,545,700 B1 | 4/2003 | Monroe |
| 6,813,610 B1 | 11/2004 | Bienias |
| 6,879,946 B2 | 4/2005 | Rong et al. |
| 7,062,722 B1 | 6/2006 | Carlin et al. |
| 7,080,096 B1 | 7/2006 | Imamura |
| 7,246,044 B2 | 7/2007 | Imamura et al. |
| 7,249,005 B2 | 7/2007 | Loberg |
| 7,277,572 B2 | 10/2007 | MacInnes et al. |
| 7,277,830 B2 | 10/2007 | Loberg |
| 7,301,547 B2 | 11/2007 | Martins et al. |
| 7,523,411 B2 | 4/2009 | Carlin |
| 7,567,844 B2 | 7/2009 | Thomas et al. |
| 7,680,694 B2 | 3/2010 | Glazer et al. |
| 7,886,980 B2 | 2/2011 | Nishimura et al. |
| 7,908,296 B2 | 3/2011 | Loberg |
| 8,065,623 B2 | 11/2011 | Bohlman |
| 8,069,095 B2 | 11/2011 | Glazer et al. |
| 8,321,797 B2 | 11/2012 | Perkins |
| 8,326,704 B2 | 12/2012 | Glazer et al. |
| 8,339,364 B2 | 12/2012 | Takeda et al. |
| 8,400,490 B2 | 3/2013 | Apostolopoulos et al. |
| 8,493,386 B2 | 7/2013 | Burch et al. |
| 8,510,672 B2 | 8/2013 | Loberg |
| 8,522,330 B2 | 8/2013 | Shuster et al. |
| 8,611,594 B2 | 12/2013 | Devine et al. |
| 8,654,120 B2 | 2/2014 | Beaver, III et al. |
| 8,671,142 B2 | 3/2014 | Shuster et al. |
| 8,751,950 B2 | 6/2014 | Loberg |
| 8,762,877 B2 | 6/2014 | Loberg et al. |
| 8,762,941 B2 | 6/2014 | Loberg |
| 8,797,327 B2 | 8/2014 | Finn et al. |
| 8,947,427 B2 | 2/2015 | Shuster et al. |
| 9,053,196 B2 | 6/2015 | Ratzlaff et al. |
| 9,087,399 B2 | 7/2015 | Shuster et al. |
| 9,110,512 B2 | 8/2015 | Exner |
| 9,189,571 B2 | 11/2015 | Loberg |
| 9,245,064 B2 | 1/2016 | Loberg |
| 9,245,381 B2 | 1/2016 | Howell |
| 9,852,388 B1 | 12/2017 | Swieter et al. |
| 9,911,232 B2 | 3/2018 | Shapira et al. |
| 9,955,318 B1 | 4/2018 | Scheper et al. |
| 9,983,684 B2 | 5/2018 | Wang et al. |
| 2002/0065635 A1 | 5/2002 | Lei et al. |
| 2003/0067536 A1 | 4/2003 | Boulanger et al. |
| 2004/0113945 A1 | 6/2004 | Park et al. |
| 2004/0259554 A1 | 12/2004 | Rappaport et al. |
| 2005/0253840 A1 | 11/2005 | Kwon |
| 2006/0210045 A1 | 9/2006 | Valliath et al. |
| 2007/0118420 A1 | 5/2007 | Jung et al. |
| 2007/0156540 A1 | 7/2007 | Koren et al. |
| 2007/0190496 A1 | 8/2007 | Lamb |
| 2008/0231926 A1 | 9/2008 | Klug et al. |
| 2008/0263446 A1 | 10/2008 | Altberg et al. |
| 2009/0049081 A1 | 2/2009 | Loberg |
| 2009/0161963 A1 | 6/2009 | Uusitalo et al. |
| 2010/0268513 A1 | 10/2010 | Loberg |
| 2010/0306681 A1 | 12/2010 | Loberg et al. |
| 2011/0191706 A1 | 8/2011 | Loberg |
| 2011/0285704 A1 | 11/2011 | Takeda et al. |
| 2012/0046768 A1 | 2/2012 | Raoufi |
| 2012/0249591 A1 | 10/2012 | Maciocci et al. |
| 2012/0268463 A1 | 10/2012 | Loberg |
| 2013/0083173 A1 | 4/2013 | Geisner et al. |
| 2013/0297409 A1 | 11/2013 | Jones et al. |
| 2013/0307842 A1 | 11/2013 | Grinberg et al. |
| 2013/0339074 A1 | 12/2013 | Nagy et al. |
| 2014/0132595 A1 | 5/2014 | Boulanger et al. |
| 2014/0214368 A1 | 7/2014 | Loberg |
| 2014/0222916 A1 | 8/2014 | Foley et al. |
| 2014/0223334 A1 | 8/2014 | Jensen et al. |
| 2014/0267411 A1 | 9/2014 | Fein et al. |
| 2014/0362075 A1 | 12/2014 | Howell |
| 2015/0062122 A1 | 3/2015 | Takeda et al. |
| 2015/0085056 A1* | 3/2015 | Van Broeck ............ G06F 3/013 348/14.1 |
| 2015/0113581 A1 | 4/2015 | McArdle et al. |
| 2015/0170256 A1 | 6/2015 | Pettyjohn et al. |
| 2015/0242179 A1 | 8/2015 | Benson et al. |
| 2015/0302116 A1 | 10/2015 | Howell |
| 2015/0309705 A1 | 10/2015 | Keeler et al. |
| 2015/0317410 A1 | 11/2015 | Blodgett |
| 2015/0325035 A1 | 11/2015 | Howell |
| 2015/0332496 A1 | 11/2015 | Howell |
| 2015/0356774 A1 | 12/2015 | Gal et al. |
| 2016/0026253 A1* | 1/2016 | Bradski ................ H04N 13/344 345/8 |
| 2016/0110916 A1 | 4/2016 | Eikhoff |
| 2016/0140930 A1 | 5/2016 | Pusch et al. |
| 2016/0180602 A1 | 6/2016 | Fuchs |
| 2016/0217323 A1 | 7/2016 | Takeuchi |
| 2016/0291922 A1 | 10/2016 | Montgomerie et al. |
| 2016/0292925 A1 | 10/2016 | Montgomerie et al. |
| 2016/0323541 A1* | 11/2016 | Nilsson ................. H04N 7/141 |
| 2018/0060041 A1 | 3/2018 | Williams et al. |

FOREIGN PATENT DOCUMENTS

| | | |
|---|---|---|
| WO | 0131397 A1 | 5/2001 |
| WO | 03026299 A1 | 3/2003 |
| WO | 2004062257 A2 | 7/2004 |
| WO | 2007093060 A1 | 8/2007 |
| WO | 2009100538 A1 | 8/2009 |
| WO | 2009100542 A1 | 8/2009 |
| WO | 2009111885 A1 | 9/2009 |
| WO | 2011066452 A2 | 6/2011 |
| WO | 2012109368 A1 | 8/2012 |
| WO | 2014191828 A1 | 12/2014 |
| WO | 2014193415 A1 | 12/2014 |
| WO | 2015075705 A2 | 5/2015 |
| WO | 2015191112 A1 | 12/2015 |
| WO | 2016165016 A1 | 10/2016 |

OTHER PUBLICATIONS

Windows Mixed Reality Cliff House—YouTube, https://www.youtube.com/watch?v=TDc_ObWkK3g, 2017.

Holoportation: Virtual 3D Teleportation in Real-Time (Microsoft Research), YouTube, https://www.youtube.com/watch?v=7d59O6cfaM0, 2016.

Facebook Spaces Beta—Oculus, https://www.oculus.com/experiences/rift/1036793313023466/, Copyright 2018 Oculus VR, LLC.

Virtualitics, Explore the Power of AI + VR, https://www.virtualitics.com, Copyright 2018 Virtualitics, Inc.

VRGO—The VR Chair, http://www.vrgochair.com/, Copyright VRGO 2018.

Russell, Why Virtual Reality Will Be the Most Social Computing Platform Yet, https://a16z.com/2016/06/20/social-vr/, Jun. 2016, 10 pages.

Altspacevr Inc., Be There, Together, https://altvr.com/, Copyright 2018 Microsoft.

* cited by examiner

VIRTUAL WORLD METHOD AND SYSTEM FOR AFFECTING MIND STATE

CROSS-REFERENCE TO RELATED APPLICATIONS

This patent application is a continuation of U.S. patent application Ser. No. 15/385,192, filed on Dec. 20, 2016, which claims priority to U.S. provisional patent application No. 62/270,898, filed on Dec. 22, 2015, all of which applications are incorporated herein by reference in their entirety.

STATEMENT REGARDING FEDERALLY SPONSORED RESEARCH OR DEVELOPMENT

Not applicable.

BACKGROUND OF THE DISCLOSURE

The field of this disclosure is virtual systems and more specifically virtual methods and systems that create visual conditions intended and designed to positively affect mental states in work place environments.

Hereinafter, unless indicated otherwise and in order to simplify this explanation, the term "enterprise" will be used to refer to an entity that provides spaces that include affordances for people to use to perform various tasks and, for example, may include a large or small corporation that employs people in various business endeavors. In addition, the term "employee" will be used to refer to any person that uses an enterprise space or facility including a person that is actually employed by an enterprise, a contractor that works indirectly for the enterprise, a visitor in an enterprise facility, etc.

For many employees, work, family and other demands are difficult to balance and, at times, can feel overwhelming. For this reason, most people strive to use their time effectively and therefore endeavor to be highly focused on what they are trying to accomplish at any specific time. For instance, when people work, they want to work efficiently and effectively to get some job done (e.g., create work product, evaluate a topic, participate in a conference). As another instance, when people relax, they want to completely relax so that they can rejuvenate themselves as quickly as possible. As still one other instance, when people play, many people like to push themselves to their physical or mental limit as a personal challenge or as an efficient use of the limited amount of time allotted by many people to these important activities. In addition to using time effectively, most people attempt to strike some type of balance between the demands put on their time so that they can maintain their sense of well-being.

How well a person works, relaxes and plays is directly related to her mind state (i.e., state of mind). Humans have evolved over millions of years to be sensory beings and to this day, a person's seeing, hearing, feeling, smelling and tasting senses continue to have overwhelming effects on a person's mind state. For this reason, what a person senses often times directly effects the degree to which that person can mentally engage in an immediate activity. For instance, if a person sees coworkers passing by while trying to relax during a break, her time relaxing is typically less effective as her mind wanders about contemplating encountered coworkers. If another person is thinking about how cold he is while participating in a yoga class, his discomfort diminishes the physical and psychological effect of the time spent in class. If yet another person is trying to draft a white paper on some aspect of nuclear physics at a workstation located near a hallway between conference rooms and is constantly hearing people as they travel between meetings through the hallway, the audible distractions will disrupt his focus and hence the efficiency and effectiveness of his time spent drafting the paper.

In addition to our immediately sensed environment, one other factor that often affects a person's instantaneous mind state is temporally preceding mind states. For instance, if a person participating in an afternoon meeting with colleagues is thinking about conclusions drawn from an immediately preceding meeting, thoughts about the prior conclusions often unintentionally affect her effectiveness and efficiency in the current meeting. As another example, if a person routinely drives through a highly congested area when travelling from work to home each night, the person's mind state upon arriving home may be substantially affected by the stress of making her nightly commute. As still one other example, a person that has an extremely stressful day at the office may find it difficult to fully participate in a pickup basketball game at a local gym after work as the day's activities continue to cycle through the person's mind.

Recognizing the importance of environment on mind state and hence use of time, for thousands of years people have tried to optimize their environments in ways designed to control their mind states and therefore to promote or optimally facilitate different activities at different times. Perhaps the best example of how most people control environment to optimize a specific activity centers around sleep. While the best sleeping environment for one person may differ in some ways from the best environment for another, most people, over time, determine the best sleeping conditions for themselves and then construct an environment that provides those conditions when sleep is sought. For instance, a first person may sleep best in a quiet, temperate, dry and dark space that includes a comfortable bed surface. Recognizing this, the first person would typically create a sleeping space that is quiet, dry, temperate and dark and that includes a suitable bed structure. As another example, most yoga class participants can achieve desired poses best in a warm or even hot environment and therefore, among other environmental conditions, yoga studios are often heated to optimize for yoga activities.

Recognizing the effect a mind state can have on a person's subsequent mind state, many individuals have adopted habits that allow them to rejuvenate between sequential activities so that they can, in effect, reset their minds to prepare for a next activity. For instance, in many cases a person may take a few minutes to rest and decompress after a stressful drive home from work prior to participating in some family activity. As another instance, some people may try to find a restful place between meetings at work where they can quiet their minds prior to a next scheduled meeting.

In addition to individuals trying to provide environments and adopt habits to control mind state, many employers have attempted to provide enterprise environments and cultures that do the same. Most efforts at controlling work environments to positively affect mind state have centered around eliminating sensory environmental stimuli when work tasks are to be performed. Here, the thought has been that if a sense is not stimulated, that sense cannot interfere with what an individual is thinking about and therefore the individual should be able to concentrate on an immediate work task more effectively. For instance, to reduce visual distractions, in many cases, workstations and other personal spaces were developed that included visual barriers including walls and screens so that a space user's view outside the space was blocked and other employees outside the space could not be seen. To reduce audible distractions, wall and screen barriers were designed to deaden sound and, in at least some cases, white noise generating devices were developed to effectively block out meaningful noises from being perceived by space users. Distractions associated with physical discomfort or the sense of touch were limited or eliminated by providing highly adjustable task chairs, adjustable tables and monitor arms and other ergonomic interface affordances adjustable to fit any body and any specific user preferences.

Regarding the need to reset mind state between work activities, many enterprises have attempted to design enterprise buildings and campuses as well as employee work schedules in ways that recognize the importance of intermediate work day rejuvenation. For instance, most meetings of any duration are planned to have built in break periods to allow employees to use rest rooms, grab a beverage or a snack, or attend to personal needs. As another instance, many enterprises encourage employees to take some time between scheduled activities to rejuvenate in some fashion.

To help employees rejuvenate, many enterprises provide outdoor spaces or specially designed interior spaces that include affordances designed to support rejuvenation. For instance, many enterprise campuses include outdoor patios or decks with ponds, trees or other natural affordances between campus buildings. As another instance, many enterprises provide quiet spaces within buildings that include comfortable lounge chairs, dim lighting and perhaps even some type of calming or contemplative music.

Thus, in most cases, enterprise spaces designed to get work done have been separated from dedicated rejuvenation spaces and the two different space types have been designed to have very different affordance sets, one set that attempts to block sensory stimuli and the other set that stimulates the senses in ways that at least try to foster a tranquil mind state. While the intent behind providing differently afforded spaces to affect mind state and hence affect work efficiency and effectiveness is worthy, current solutions have several shortcomings.

First, while enterprises routinely provide separate spaces designed to facilitate employee rejuvenation, the very fact that the spaces are separate can have a negative impact on space utilization. To this end, most employees that already feel time crunched simply do not take the time to physically travel to some out of the way space to rejuvenate. In addition, despite attempts to change their cultures, in many enterprises where hard work and effort are highly valued, an employee may perceive that other employees will unfairly judge his dedication to the enterprise if he regularly travels to and uses a rejuvenation space.

Second, in many cases spaces that are provided for rejuvenation are not dedicated rejuvenation spaces and instead are provided to accomplish two or more enterprise goals at the same time, which means that the spaces are not optimized for rejuvenation. For instance, "relaxing" spaces in an open office plan such as couch and lounge chair arrangements near an enterprise cafeteria are often provided both as a rejuvenation space and as an informal gathering space where employees can informally interact with each other between work activities. As another instance, an outdoor patio or deck space between enterprise buildings is often provided both as a rejuvenation space and as a way of opening up an internal space to "nature".

One characteristic of nature is that it is uncontrolled and therefore mind state, including a relaxing state, can be easily distracted. For instance, if a squirrel scampers across a patio and up a tree, an employee on the patio can become easily distracted. As another instance, as clouds block and unblock sun from subtending the pages of a book being read by an employee on a patio, the employee can be distracted by the changing and uncontrolled environment. Thus, where a space is designed for two or more purposes at the same time, the ability of moist employees to rejuvenate within the space is substantially reduced.

Third, even where an enterprise provides interior work spaces dedicated to rejuvenation, in most cases, despite best intentions, because different employees have different rejuvenation space preferences, rejuvenation spaces simply have not been optimized for most employees. Perhaps the best way to think about preferred rejuvenation environments is to think about the varied locations that employees travel to when on vacation and how those employees relax when in their preferred vacation spots. Some employees like the beach, others the mountains and still others the desert. Some employees like vacations in natural settings while others prefer to be located in a city. Some employees like pure relaxation on vacation while others prefer trips designed for learning about a historical culture. Some employees want to read while on vacation while others simply want to unplug from any cognitive activities. Many times even a single employee will prefer different rejuvenating environments at different times. For instance, at one time, an employee may want no sensory stimuli while relaxing and at a second time, the same employee may want to read a novel on a beach with Chakra music quietly playing in the background. These varied rejuvenating environmental preferences have meant that known dedicated enterprise rejuvenation spaces cannot meet the needs of most employees.

Fourth, even where an employee periodically uses a regenerative space between meetings or focused individual work at a workstation, the quick transition from one to the other can have a jolting effect on an employee's mind state. Thus, for instance, moving from a stressful meeting to a rejuvenating activity in a dedicated space and then on to personal focused work at a workstation can psychologically whipsaw an employee from stress to relaxation and back into a stressful situation which can reap havoc on the employee's well-being.

Fifth, there is at least some evidence that the workstation and conference space environments designed to eliminate or at least substantially reduce sensory stimuli during work activities is sub-optimal for work efficiency and effectiveness as well as for employee wellbeing. To this end, for instance, there is empirical evidence that peppermint and other scents have a focusing effect when perceived during work activities. As another instance, there is evidence that certain types of music (e.g., typically non-lyric, familiar, relatively quiet and generally steady; e.g., baroque, Chakra, etc.) or audio stimuli of certain types can have a focusing effect on employees during work. As still one other instance there is evidence that light, in particular natural light or a view of a window, may have a positive effect on employee wellbeing. Other sensory stimuli may also have an immediate effect on employee efficiency, effectiveness and overall wellbeing. Thus, while elimination of sensory stimuli during work activities is better than being bombarded with distracting stimuli, complete stimuli elimination often times goes too far and has an adverse impact on mind state and therefore overall employee effectiveness and efficiency.

Sixth, just as different employees prefer different environments while rejuvenating, employees have many different environmental preferences while performing work activities. For instance, while one person may work well in a sensory blocking workstation, another person may be able to perform at least some tasks best when on a beach, when located at the edge of a calm north woods lake, or when located near an exterior window. Known enterprise space affordances simply do not allow employees to create their preferred working environments and instead, in many cases, employees are located in sub-optimal sensory blocking workstations that have no resemblance to optimally afforded workspaces.

Thus, there is a need for personalized enterprise spaces that are better afforded to support both work and rejuvenation activities for employees. Ideally, affordances within the enterprise spaces would provide optimal settings for each employee or group of employees, based on personal preferences, to meet work, rejuvenation, wellbeing and other objectives. In addition, there is a need for spaces that can support groups of employees to foster specific mind states that are optimal for achieving different employment as well as other personally rewarding tasks.

SUMMARY OF THE DISCLOSURE

It is believed that visual stimuli has as much effect on mind state as virtually any other sensory stimulus. It has also been recognized that known enterprise spaces do little if anything to take advantage of this realization to increase employee efficiency, effectiveness and wellbeing. Instead of simply trying to eliminate the effects of visual stimulants on employees, as do known space affordance systems, the present disclosure describes systems and methods that create visual stimulation in ways to foster desired mind states. For example, one employee may love to hang out at the edge of a peaceful north woods lake when relaxing and may want the ambiance of a small farmhouse in Tuscany when reading a work related business plan. Here, the sensory stimuli at the edge of a lake or in a Tuscan farmhouse may be particularly pleasant for the employee. It is believed that the pleasant sense one gets from being in a preferred sensed environment can have an extremely positive effect on mind state and therefore on activities like relaxing and focused work.

It has also been recognized that employment requirements and practical limitations make it impossible for most employees to be in their preferred environments while either relaxing or working. For instance, most people's jobs require them to be located at an enterprise facility to perform many employment tasks such as attending meetings, producing and sharing work product with other employees, being available in person when a boss requires something, etc. Being at a north woods lake or in Tuscany are simply unworkable in these cases.

Regarding practical limitations, most people do not have personal access to a peaceful lake or a Tuscan home and therefore, while they may optimally persist in one of those environments, they simply cannot have access to those environments whenever desired. In addition, where an employee has different preferred environments for work and/or rejuvenation, even if the employee had access to each, typically, travelling from one to the other between activities would make no sense (e.g., consecutive preferred environments may be on opposite sides of the world). Moreover, even if someone has access to a preferred environment and their job requirements would allow them to work and rejuvenate in that single environment, real environments like a beach, a lakeside, a desert setting, etc., are unpredictable and therefore are often extremely distracting. In real environments, for instance, unexpected noises occur, unexpected people walk by, planes fly overhead, animals move past and ambient conditions like temperature, lighting, humidity, air flow, etc., change unexpectedly. Unpredictable environments lead to unpredicted sensory stimuli, which renders these real environments poor for maintaining mind state for work, rejuvenation or any other type of persistent activity.

Consistent with at least some embodiments of the present disclosure, a system is provided and controlled to optimally stimulate the visual sense, along with other senses, to produce specific employee mind states desirable for fully participating in focusing and/or rejuvenating activities, as well as other activities. To this end, at least some embodiments of the present disclosure contemplate providing a set of emissive surfaces within an enterprise virtual world (VW) station and about an "emersion location" occupied by one or a set of employees and driving those surfaces with non-content visual stimuli designed or created to foster desired mind states. In particularly advantageous embodiments, the emissive surfaces will include at least emissive surface sections arranged on multiple sides of the emersion location so that the employee feels as though she is immersed in the visual stimuli (i.e., in the VW). Here, the visual stimuli (e.g., "ambient visuals") will typically be subtle so the visuals do not distract the employee at the emersion location. The ambient visuals will typically include some type of movement so that the space has a "living" or "live" feeling to it as the employee performs activities in the space. For instance, the ambient visuals may present wheat blowing gently in a field, views from the top of a hill in the countryside where tree tops viewable on a distant hill move in a light wind, views in a room in a farm house including a fire in a hearth that includes some movement, views from a location adjacent a lake in the north woods where water and trees move slightly, etc.

In at least some cases the ambient visuals will be provided by a 3D virtual world engine that includes a 3D virtual world data set where an employee has the ability to virtually travel within the 3D data set to obtain different views into the virtual world at different VW locations. Here, the VW data set may be designed so that different VW locations are optimized for different purposes or to create or positively affect different mind states. For instance, one VW location may be optimized for rejuvenation while a second VW location is optimized for individual focused work activity. As another instance, first, second and third VW locations in another VW data set may each be optimized with different scenes designed for rejuvenation and an employee in the VW may be able to select any one of the three different locations based on personal or immediate preferences.

In at least some cases, a system may enable travel throughout a VW where there are natural transitions between different VW spaces that are designed to ease a change in mind state as an employee moves from one location with one set of location characteristics to another location within the same VW. For instance, to travel from a focused work location to a rejuvenation location, a system may require an employee to travel through the VW for a minimum of three minutes so that the employee's mind senses the transition. During the transition process from one VW location to the other, the scenery in the VW may change slowly to ease the transition. In addition to gradual changes in the ambient visuals, audio may also change gradually to create a greater sense of a change in location.

In some cases, instead of a change in VW location, characteristics of a specific location within a VW may change. For instance, an employee may prefer a bright sunny environment while performing individual focused work and a rainstorm when rejuvenating. In this case, when transitioning from work to rejuvenation, the VW weather may be controlled so that clouds roll in and a persistent rainstorm occurs during a 30-minute rejuvenation period. At the end of the rejuvenation period, the clouds may part and the sun may again appear to help the employee transition to another scheduled activity.

In at least some systems, it is contemplated that an employee will be able to earmark different VW locations that are deemed particularly advantageous for facilitating specific activities so that the employee can subsequently return to those locations to have similar experiences. For instance, a specific VW location that is deemed optimal for rejuvenation may be marked for subsequent access.

In at least some embodiments, an employee may be able to define different zones within their instance of a VW for different types of activities. For instance, a first zone may be reserved only for rejuvenation while a second zone is reserved for individual focused work activities and a third zone is for exploring different VW locations.

In some cases, an employee may be able to post content at specific locations within a VW. For instance, an employee working on a specific project may be able to post project content at a specific focused work location in the VW that is associated with the project so that any time the employee virtually travels to that location, the posted content is presented at that location. Because the views at a VW station are virtual, any combination of virtual display surfaces may be presented at a VW location. For instance, an entire project space including 15 different virtual display surfaces arranged about a VW location may be persistently presented so that the content persists from one visit to the next and only changes when the employee changes the content at the location. Providing content persistence enables an employee to mentally re-engage the content quickly upon return to the VW location.

In some cases an employee may be able to "pack up" content at one location and move that content to a different VW location where the content can again be expanded to its state of presentation prior to the packing up activity. Thus, where an employee wants to continue working on a project but wants to try a different VW location, the employee can simply port project content to a different location.

In some cases, an employee may be able to add content to a VW location using any computing device that is linked to a network even when not inside the VW itself. For instance, if an employee is remote from a VW station, the employee may use her smart phone or tablet-type computing device to take a picture of some object that the employee would like to consider along with other content posted at a project specific VW location. Once the image is obtained, in at least some cases, a VW sharing application icon may be presented to the employee that can be selected to post the image to the VW generally or to a specific VW location of project location to which to post the image. When the employee subsequently access the VW or the project location, newly posted content may be indicated so that the employee can re-consider the content, delete the content, store the content as a project file or post the content on a virtual display surface. While described in the content of an image, this content posting feature may be used to post any type of content to a VW or a specific project at a VW location including documents, articles, web sites, videos, spreadsheets, etc., that are generated using any type of application.

In at least some cases, an employee may be able to access project or VW content in a real world setting. For instance, if an employee travels to a real world conference room that includes first through fourth emissive surfaces on first through fourth walls that define a rectangular conference space, the employee may be able to access project content posted in the VW and to present that content on the first through fourth emissive surfaces in the real world conference space. Here, in some cases the system may rearrange content from the VW location in the real world to be viewed head on the four surface in the real conference space. For instance, where the employee has ten different virtual display surfaces arranged in a circle about a project location in the VW where each virtual display surface is angled differently toward the employee's VW emersion location, the ten sets of posted content may be presented as ten separate windows that are squarely arranged on the four real world emissive surfaces, three on a front surface, two on a left side surface, three on a rear surface and the remaining two on the right side surface.

In other cases where the content is rearranged to squarely be presented on real world surfaces, the arrangement of content on those surfaces may, while being squared off to align with the real world surfaces, be arranged to at least somewhat track the locations of the posted content in the virtual world. For instance, where content is posted on first through tenth virtual display surfaces arranged through a 270 degree arc about an employee's VW location, the content on the first through tenth virtual surfaces may be arranged in first through tenth windows on only three of the four emissive surfaces in the real world that align best with the 270 arc in the VW. Thus, for example, content from the first through third VW display surfaces may be arranged in first through third windows on a left emissive surface in the real world, content from the fourth through seventh VW display surfaces may be arranged in fourth through seventh windows on a front emissive surface in the real world and content from the eighth through tenth VW display surfaces may be arranged in eighth through tenth windows on the right side emissive surface in the real world to reflect the VW world arrangement to the extent possible.

In still other cases, the VW content representations and juxtapositions may be presented in the real world environment by simply using the VW engine to drive the emissive surfaces in the real world conference space in the same way that the engine drives the emissive surfaces in a VW station. Thus, in this case, an employee at the real world conference space may travel to a project space in the VW to observe all posted content at that location on virtual display surfaces in the same angular arrangement as when at a VW station as described above. Here, the employee or some other employee could navigate in the VW representation in the conference space to square up with any VW display surface and see content thereat.

In any of the above examples, in at least some embodiments, when an employee makes changes to project content in a real world conference space or using a more conventional computer user interface (e.g., a conventional workstation), changes to that content may be used to update the content in the VW. Thus, for instance, where an employee posts project content from ten VW display surfaces on four emissive surfaces in a conference space and changes (e.g., annotates, composes, deletes, etc.) the content presented in the third window, the third window changes may be used to update the content presented on the third VW display surface.

In some cases where an employee knows that he will be working with other employees in a real world conference space, the employee may be able to access a real world space template at a VW location so that the employee can develop content for the real world space while working in the VW.

Thus, for instance, in a case where a real world conference space used routinely by a project team including five people includes first through fourth emissive surfaces arranged on first through fourth walls that define the space, an employee may decide to arrange virtual display surface at a VW location corresponding to the project in an identical fashion so that movement between the VW location and the real world conference space feels natural. Thus, here, content in the VW project location may be arranged on four virtual display surfaces arranged in a rectangular shape to mirror the real world surface locations.

Similarly, in at least some cases an employee may be able to access content initially developed in a real world conference space associated with a project or other space that includes several emissive surfaces in the VW and that content may be presented in the VW in the same relative juxtapositions as in the real world space. For instance, where a real world conference space includes first through fourth emissive surfaces on first through fourth walls that define a rectangular space, if project content is stored for subsequent access and an employee accesses that project content in a VW, the content may be reposted in the exact same way in the VW that it appears in the real world space on four virtual display surfaces arranged in a rectangle about the employee's emersion location.

In cases where project content is developed and stored in a real world location in addition to content posted on emissive surfaces, the entire project content set may be rendered accessible in a VW location associated with the project. Thus, for instance, where first through fourth content sets are presented on real world emissive surfaces and other project content that is not currently displayed on the emissive surfaces but is stored for access in a session queue, in at least some cases the entire session queue may be rendered accessible at a VW location associated with the project.

In some cases a system may track all digital content encountered by an employee in an enterprise facility and may render that content accessible automatically within a VW for reconsideration and, if desired, association with specific locations within the VW space. For instance, where a first employee attends three different project sessions in real world conference spaces during a Tuesday morning and then uses a VW workstation to access a VW, session content developed during each of the three morning sessions may be presented to the first employee for reconsideration and, if desired, posting to one or more different locations in the employee's instance of the VW. Here, for example, where the first employee wants to store session content at a first location in the VW, the employee can travel to the first location in the VW, access the session content and then post the session content at that location causing the content to be posted in the same relative juxtaposition as the content in the real world conference space.

In some embodiments, two or more employees may be able to conference within a VW. Here, in some cases, for instance, first and second employees at first and second different and remotely located VW stations, may be able to face each other in the VW and have the exact same visual experience during a conference session where the first employee sees a VW view behind the second employee and the second employee sees a VW view behind the first employee. In some cases, first and second employees may choose a side-by-side view in a VW where the two employees have the same forward looking and side views in the VW. This side-by-side view is useful when first and second employees travel in the VW together or when the two employees want the sense that they are looking at content on the same display screen and content on that screen in a front view.

In some cases, a VW may be modified automatically as a function of an employee's specified preferences. For instance, where an employee marks a specific VW location as a favorite, the system may automatically change aspects of other VW locations to be more like the favorite location. As another instance, where an employee marks a specific VW location as not preferred, the system may automatically change other VW locations so that those locations are different than the not preferred location. In still other cases, an employee may rank specific experience types on a scale once the employee is done using the location for a specific activity and the ranking may be used to modify the VW location or as a gauge when suggesting future locations for the same type of activity.

In at least some embodiments a VW stations may be equipped with one or more sensors for sensing a flow state of an employee using the station. Here, flow indicates how focused an employee is on a specific type of activity. Thus, where an employee is in a deep condition associated with a rejuvenation activity, the employee is said to be in a strong rejuvenation flow state or when an employee is concentrating deeply, the employee may also be in a strong focus flow state. Here, an employee's flow state can be used for several different purposes. First, the flow state can be used to determine when the system should start transitioning the employee from one activity at the station to a different activity type at the station. When an employee is in deep flow, the system may prolong a current activity if there is no hard stop in the employee's schedule so that the employee can get greatest benefit out of her time.

Second, flow state can be used by the system to automatically suggest specific VW locations for specific activity types to a specific employee either based on where the specific employee has experienced deep flow activity or based on VW locations where other employees routinely experience deep flow states. Thus, where the system recognizes that 90% of all VW station users quickly enter a deep rejuvenation flow state at a specific VW location, the system may suggest that location by a different employee for a rejuvenation activity.

Third, flow state can be used to automatically alter a VW to provide more VW locations that have characteristics that are consistent with optimized flow locations. Thus, where a first employee consistently achieves a deep flow state at a VW location with a specific set of location characteristics, the system may automatically either suggest changes to other VW locations or simply make changes that cause the other VW locations to be more like the deep flow location.

Fourth, flow state and, more specifically, transitions between consecutive deep flow states may be used to determine how quickly a specific employee can enter and exit different deep flow states and then to alter transition routines so that ambient visuals can change at an optimal rate for a specific employee. Here, as an employee becomes familiar with using a VW station and the VW locations/environments presented at the station, it is believed that the user's ability to enter deep flow and exit deep flow and to transition between consecutive deep flow states will increase appreciably so that the time required to make these transitions shortens over time. Here, as an employee's ability to transition between flow states increases, the system may automatically adjust VW transition routines to shorten transition periods and increase employee efficiency appreciably.

Flow sensors may include any type of sensor or a set of sensors that provide biometrics to a server that can drive any algorithm designed to detect flow. For instance, the sensors may include cameras or other sensor types that can sense skin temperature, eye movement, posture, etc. In some cases, one or more of the sensors may sense the amount of content being generated over a rolling period where greater content generation is associated with a deeper flow state, etc. In still other cases an employee may be able to indicate a perceived flow state, and the system may learn from employee input and sensed biometrics a characteristic set that is associated with deep flow for the specific employee that can be used to identify subsequent flow states.

DETAILED DESCRIPTION OF THE DISCLOSURE

Figure 1:
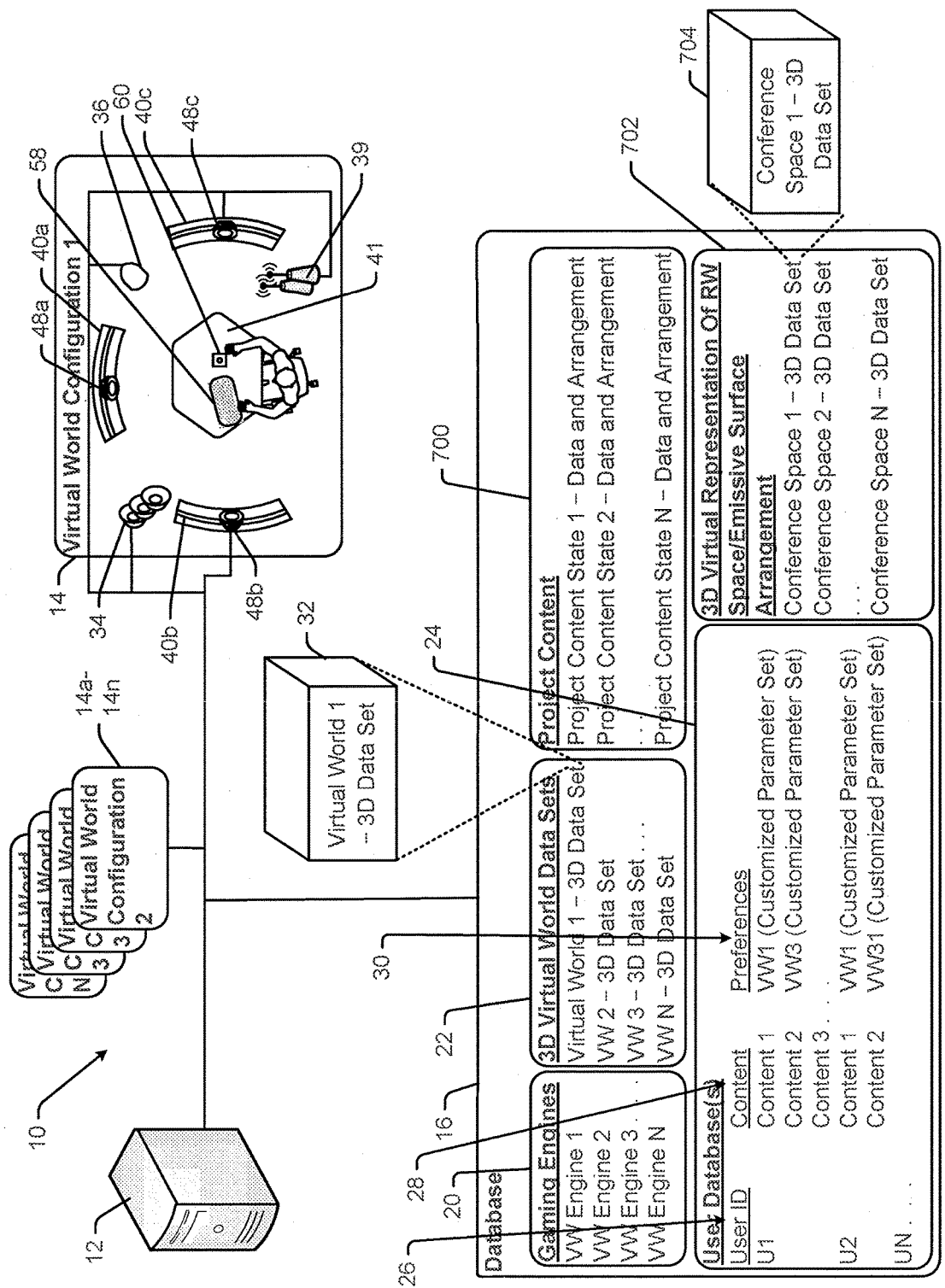
FIG. 1 is a schematic illustrating one VW system that is consistent with at least some aspects of the present disclosure.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features and aspects illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

The phrase "emissive surface" is used herein in a broad sense to refer to any type of surface on which digital or analog content may be presented to system users and may include, for instance flat electronic displays designed, curved electronic displays, projector screens, etc. Where projector screens are employed, it is assumed that projectors would be included for projecting content onto the displays as described hereafter. While flat image representations may be presented in some embodiments on one or more emissive surfaces as described hereafter, in particularly useful embodiments 3D images are presented on emissive surface in cases where an optimized emersion effect is desired.

Referring now to the drawings wherein like reference numerals correspond to similar elements throughout the several views and, more specifically, referring to FIG. 1, the present disclosure will be described in the context of an exemplary system 10 including, among other components, a server 12, a plurality of virtual world (VW) configurations or stations 14, 14a-14n and a database 16. Server 12 is shown as a single computing device. Nevertheless, it should be appreciated that server 12 may include a plurality of computing devices that operate together to perform various aspects of the present disclosure. In addition, while server 12 is shown as a single device for controlling a plurality of virtual world configurations 14, 14a-14n, a separate server or computer may be dedicated to each of the configurations or stations 14, 14a through 14n, etc. As computing devices become more powerful, the server processes may be performed by any type of computing devices including but not limited to a desktop computer, a laptop computer, a tablet type computing device, a smart phone type computing device or some wearable computing device.

At a high level, server 12 runs one or a plurality of VW software engines akin to modern gaming engines to drive the configurations 14, 14a-14n to present an immersive visual and audio virtual world (VW) to at least one system user (e.g., employee using the system 10) where the VWs are designed to positively and subtly affect user mind state. Thus, ambient visual stimuli are presented to the employee at a station emersion location. Similar to the way certain persistent scents or certain types of music affect mind state, the combination of audio and certain types of video also affect mind state and can be used to help employees achieve certain goals including increased work productivity as well as personal rejuvenation and a healthy level of well being. At most times, the visual effects will include at least some automatic and persistent movement and audio sound but no particularly distracting visual or audio effects such as, for instance, a deer running through a visual scene, a shooting star in a scene, a person's voice calling out on the audio track, an unexpected high volume sound, etc.

In addition, where an immersive VW configuration or station 14 (see FIGS. 3 and 4) includes spaced apart display screens about an employee's location, in particularly advantageous embodiments the VW includes similar scenes or video presentations on each surface so that there is at least some continuity between the presented scenes at any given VW location. It has been recognized that where two views into a VW are separated by an open space, the human mind can, in effect, stitch together the two views and create a larger or more effective immersive experience. Here, the mental stitching effect is hampered and in some cases eviscerated where there is no continuity between spaced apart views. Thus, for instance, referring to FIG. 8, at one location represented by the images shown on surfaces 46a, 46b and 46c, while each VW view is different, each view includes jungle foliage of a similar type so that there is at least some continuity between the three views.

Figure 8:
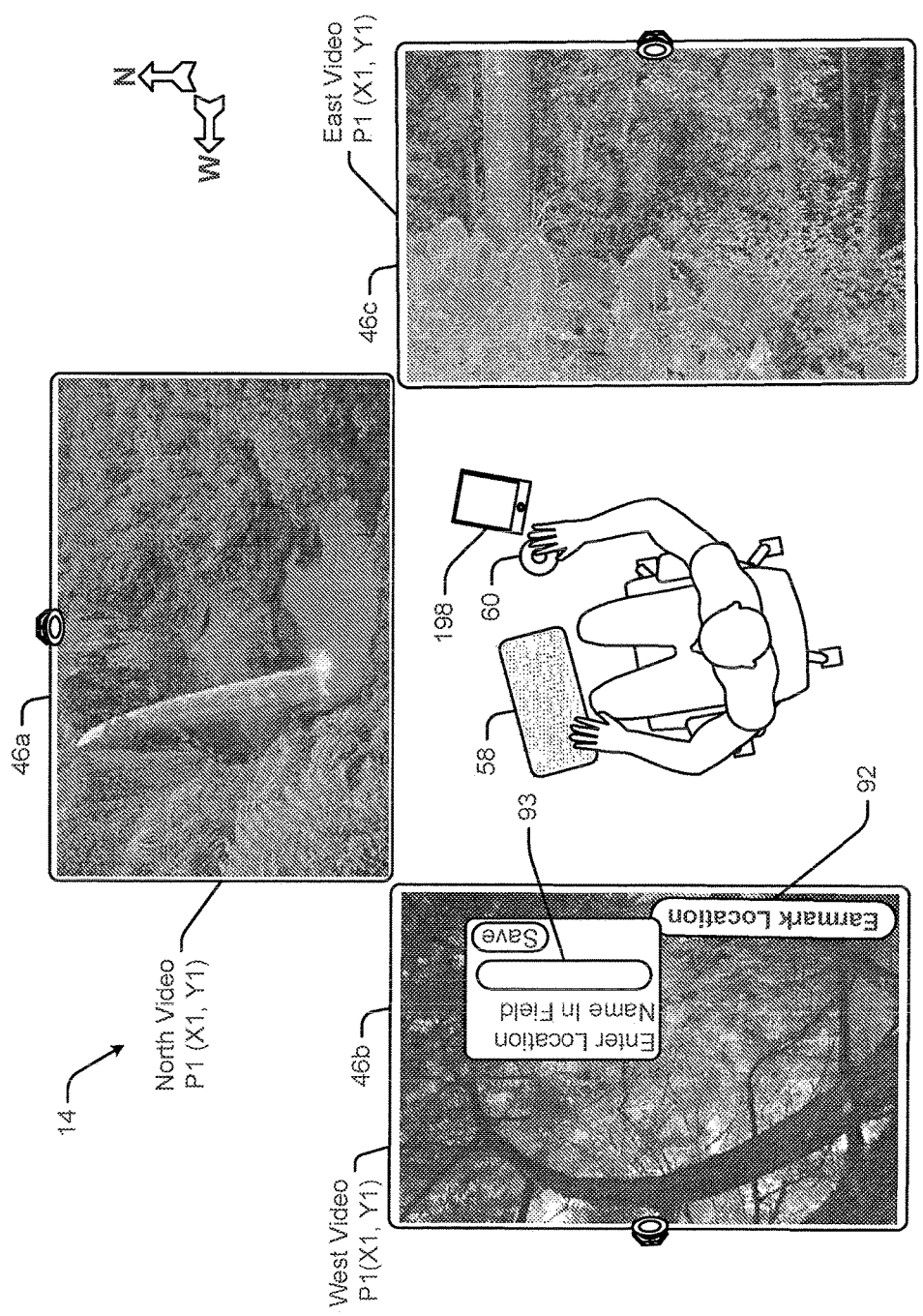
FIG. 8 is a schematic illustration of an exemplary a VW station in a first operating state.

Views that have continuity should be contrasted with a case where completely different and discontinuous views are presented on the three surfaces 46a, 46b and 46c. For instance, consider a case where surface 46b in FIG. 8 shows a beach scene, surface 46a presents the waterfall scene shown in FIG. 8 and surface 46c presents a scene showing an exterior wall of a home. While it may be possible for all three of these views to appear from one instantaneous VW location, the discontinuity blocks the employee's mind from stitching the scene together and therefore negatively affects the immersive mind state. Hereinafter, unless indicated otherwise, a dynamic, non-distracting audio and ambient visual representation with at least some level of immersive continuity will be referred to generally as a "persistent dynamic background effect".

One exemplary persistent dynamic background effect may include a video showing wheat fields in all directions with a simple path through the fields that goes on for a long distance within the VW and accompanying audio presenting the sound of wheat rustling in a light breeze. Here, the video may show the wheat gently blowing in a virtual wind so that it moves back and forth to present a sense of constant and uninterrupted motion. As another instance, another persistent dynamic background effect may include a jungle scene with green plants in most directions and a waterfall in the distance along one trajectory from the perspective of the employee where the plants move slightly periodically and the waterfall has some movement. Here, audio from the direction of the waterfall may present the sound of a waterfall while audio from the other directions may sound like rustling leaves. Again, in each of these examples, movement in the visual effect and the audio effect sounds are generally persistent so that, while creating a sense that the space is dynamic, nothing in the video or audio effects is alarming or demands extra attention from the employee. Many other virtual effects are contemplated that are described hereafter.

In at least some embodiments the software enables an employee to virtually move within a VW to, in effect, travel within the VW to different locations where the different locations present different combinations of audio and visual effects. While VW locations that are proximate each other may present similar audio and visual effects, in the interest of simplifying this explanation, unless indicated otherwise, it will be assumed that "different" VW locations (e.g., a first location, a second location, etc.) have different combinations of audio and video effects. For instance, at a first VW location, a first video and a first audio effect may be presented, at a second VW location, the first video effect may be presented along with a second audio effect (e.g., higher volume or different sound set than at the first location), at a third VW location a second video effect and the first audio effect may be presented, at a fourth VW location, a third video and a third audio effect may be presented, and so on.

It is believed that the ability to travel within a VW among different locations has several advantageous effects on employee mind state. First, the ability to move to different VW locations allows an employee to seek out and try different locations for different purposes to get a sense of how different locations affect the specific employee. It has generally been recognized that, while persistent dynamic background effects positively affect most employee mind states, different employees have different preferences. For instance, while one employee may prefer the visual and audio effects associated with an open field of wheat, another employee may prefer the visual and audio effects associated with a jungle scene including a waterfall in the distance and yet a third employee may prefer audio and visual effects associated with the inside of a farmhouse up in the hills in Provence France. Only a specific employee can know how they are affected by specific audio and visual stimuli. In effect, each employee operates as a highly specialized sensor to detect and identify optimized VW environments for themselves. Here, each employee can travel to different VW locations and experience their effects on the specific employee.

Second, each employee may identify different preferred or optimized VW locations for different activities and may travel to the different VW locations when participating in associated activities. For instance, when performing a content generating work activity (e.g., drafting a word processor document), a first employee may prefer a sense of being in a relatively closed or small environment like the inside of a small farm house and, when reading a novel as a form of active rejuvenation, the first employee may prefer a sense of being out in the open on a beach near the ocean. As another instance, when mediating as a form of passive rejuvenation, the first employee may prefer sights and sounds that mimic an ancient Buddhist temple.

Third, as an employee uses different virtual locations for different activities, the employee develops a sense of familiarity with each space and the activities associated therewith. Here, in at least some cases it is believed that this sense of familiarity can eventually shorten the time required for an employee to transition from one activity to another and enter a "flow" state in which the employee is substantially entirely engaged in the activity being performed. For instance, when an employee virtually travels to a familiar ancient Buddhist temple to rejuvenate through meditation for a few minutes, the familiarity of the VW location, it is believed, has a triggering effect that causes the employee to delve into a meditative state quickly. Thus, the rate of deep flow transition should increase over time as an employee uses a VW station.

Fourth, personally selected VW locations for activities afford employees at least some sense of control over their daily lives. Here, for instance, while an employee may not want to work on a word processor document for 4 hours a day, by enabling the employee to work in a VW environment of their choosing, the simple act of choosing location has a spill over effect on the work task and causes a stronger sense that the employee has autonomously chosen to perform the work task. The end result is a better overall attitude while performing the work activity.

Fifth, while an employee is not physically moving from one location to another when traveling in the VW, visual perception of movement has a psychological effect on many employees and serves as a mental divider between consecutive activities. Thus, when transitioning from a 2 hour effort to generate a complex word processor document to a 30 minute rejuvenating meditation activity, VW travel causes a perception of leaving the work activity behind in one location and moving to a completely different location, a sort of rejuvenation sanctuary that is mentally, if not physically, separate from the work space.

Consistent with the above description, the FIG. 1 database includes a plurality of VW engines 20 and a plurality of 3D VW data sets 22. Each VW data set 22 includes a set of three dimensional data corresponding to a virtual world where each set includes a separate data voxel for each point in a 3D space corresponding to the data set. For instance, exemplary data set 32 may include data corresponding to a virtual jungle world including trees, one or more rivers, lakes and ponds, hills, cliffs, waterfalls, etc., while a different one of the VW data sets 22 may include data corresponding to a farm in Provence France including a farm house, fields, hills, a view of a body of water, etc. Here, voxel values in VW 32 and the virtual items they correspond to change over time as items in the 3D space move. For instance, where a branch of a tree moves between one time and a next, voxels that represent the branch change so that one voxel that corresponded to a point in a branch at one time may represent a transparent air voxel at the next time (e.g., the branch moved out of the voxel location between the two times).

In general, in many VWs, air voxels will be completely transparent and other voxels may be opaque or at least somewhat opaque. For instance, a voxel corresponding to a tree branch may have a brown color and be opaque and a voxel corresponding to a leaf may have a green color and be opaque. When an employee is immersed at a point or location in a VW data set, the employee has different fields of view from that location in all directions. Here, the employee can see through transparent air voxels and sees any other voxels in the 3D VW data set that are not blocked by some other opaque voxel between a specific voxel and the employee's current VW location. Thus, a voxel corresponding to a tree trunk may block the employee's view of a voxel corresponding to a branch on the other side of the trunk, an instantaneous leaf voxel may block an employee's view of a jungle hut there behind within a VW.

Each VW may have movement restrictions associated therewith so that an employee in the VW cannot move to certain locations. For instance, there may be restrictions associated with each tree trunk in a VW so that an employee cannot move through the trunk and has to go around the trunk when moving in the VW. As another instance, in at least some cases an employee's movement in a VW may be limited to certain paths or trajectories even though the employee is currently in an open air voxel space. For instance, a VW may include a worn path through a jungle, steps at a Buddhist temple, a clearing through a tree line, etc., where the VW may limit an employee to movement along the path, steps or clearing to help guide the employee between locations having different audio and visual effect combinations.

In at least some embodiments there may be preferred locations in a VW world for specific activities. For instance, in some cases there may be some locations and orientations in a VW will present a persistent dynamic background effect (e.g., slow movement on emissive surfaces where scenes presented on each surface are at least somewhat visually contiguous) optimized for focused work. Thus, in some cases, when an employee is at a specific VW location and in a specific orientation that is not aligned with a persistent dynamic background effect but is close to a location and orientation combination that would present that effect, the system may at least suggest the preferred location and orientation for the desired effect.

Referring again to FIG. 1, each VW engine 20 includes a software program that can present instances of the VW data sets 22 to employees via configurations or VW workstations 14, 14a through 14n. To this end, each engine 20 drives emissive surfaces (e.g., displays) and speakers in an associated configuration to present audio and video output to an employee to immerse the employee in the VW. Each engine, in at least some embodiments, allows a user to travel about the VW as described above. Thus, an employee at one location in a VW is able to move through the VW to other locations.

Figure 2:
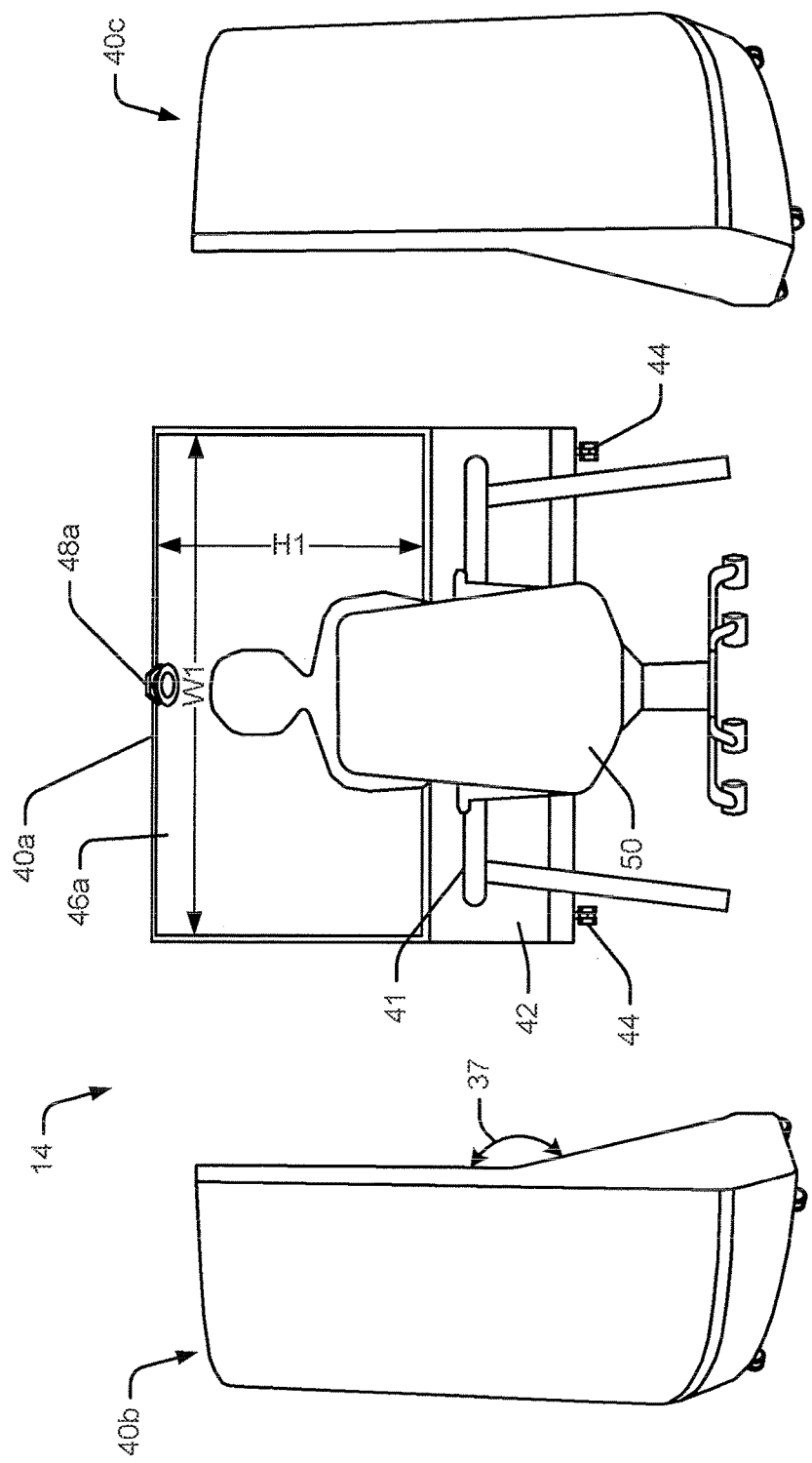
FIG. 2 is a perspective view of an exemplary VW station that is consistent with at least some aspects of the present disclosure.

Referring still to FIG. 1 and now also to FIGS. 2 and 8, exemplary VW configuration 14 includes three emissive surface totems or display assemblies 40a, 40b and 40c as well as an audio system including speakers 34 and one or more interface devices 58, 60, 198. In addition, in at least some cases, configuration 14 also includes other sensor devices 36 (described below) and wireless access points 39 or other networking components. A task chair 50 and, in some cases, a workstation or table 41 (see FIG. 1) is provided for use by an employee.

Each display assembly 40a, 40b, etc., is similarly constructed and operates in a similar fashion and therefore, in the interest of simplifying this explanation, only assembly 40a will be described here in any detail. Assembly 40a includes a cart 42 supported on casters or wheels for movement in an associated real world space. A large emissive surface or display screen 46a is mounted to cart 42 and faces to one side of the cart. While surface 46a may be flat, in other embodiments the surface 46a is somewhat curved between lateral edges so that the surface is concave toward a space occupied by an employee in chair 50. Where present, the curvature enhances the sense of being immersed in the VW content presented via the assemblies 40a through 40c. Surface 46a has height and width dimensions H1 and W1, respectively. Height dimension H1 in at least some embodiments is between 24 inches and sixty inches while width dimension W1 is between thirty inches and 100 inches. Here, optimal width and height dimensions may be a function of the distance between an employee's physical location in a space and the locations of the assemblies 40a, 40b and 40c. Thus, for instance, where the distance between the employee's physical location (i.e., the emersion location associated with the station 14) and assemblies 40a, 40b and 40c is relatively small (e.g., 3 feet), the surface 46a and other surface dimensions may be relatively small when compared to an embodiment where the distance between the employee's physical location and the assemblies 40a, 40b and 40c is larger (e.g., 5 to 12 feet).

Generally speaking, the surface 46a dimensions should be large so that the immersive effect of the visual representation is greater. Nevertheless, it has been recognized that a strong immersive effect occurs even when there are large spaces between adjacent assemblies 40a, 40b and 40c. As described above, it is believed that the human brain effectively stitches together different view points along different fields of view about an employee's physical location to cause an immersed feeling or sense even when only relatively small windows into the VW are spaced apart by reality (e.g., by open spaces). Thus, for instance, in an exemplary configuration 14 shown in FIG. 4, when viewed from an employee's physical location, each emissive surface 46a, 46b and 46c may only occupy 10 to 50 degrees of a user's 360 degree surrounding FOV so that open spaces between the surfaces occupy between 40 and 80 degrees of the surrounding FOV between adjacent emissive surfaces 46a, 46b and 46c. Other open space FOVs are contemplated where the display assemblies 40a, 40b, 40c are arranged in different angular positions with respect to the physical location of the employee. For example, in FIG. 3, the open space FOVs may be between 70 and 110 degrees where the emissive surfaces each occupy between 10 and 50 degrees of an employees FOV. Other open space FOVs are contemplated. In particularly advantageous embodiments the open space FOVs will be between 45 and 65 degrees so that the immersive effect is relatively strong.

Figure 30:
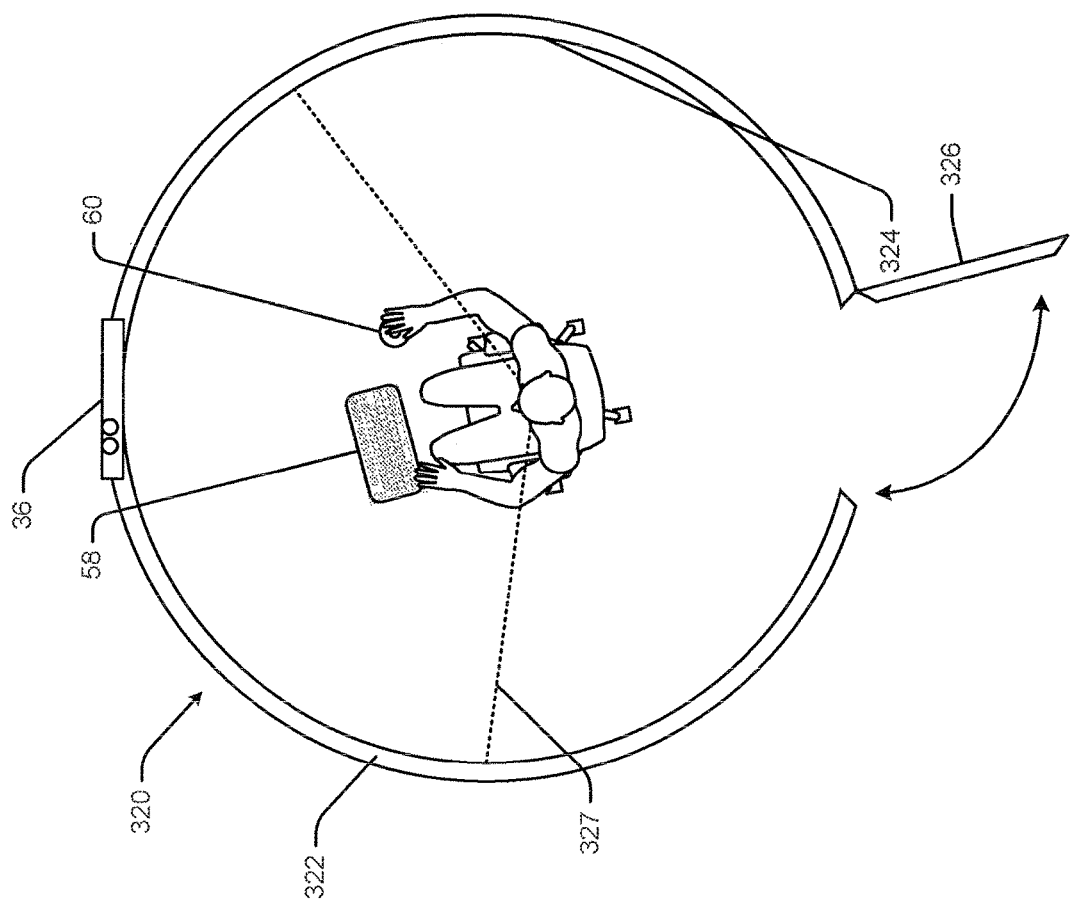
FIG. 30 is a top plan view of another VW station that includes a cylindrical emissive surface that surrounds an employee.

While an optimal system may include emissive surface that completely surrounds an emersion location (i.e., an employee's location at a station; see exemplary FIG. 30 described hereafter), currently there is a practical reason not to provide such as a configuration. The emersion effect is best if the VW views are relatively high definition. The higher the pixel count on the emissive surfaces, the better the effect. In some embodiments a conventional gaming engine may be used to generate the VW views. Here, gaming engines typically obtain a single view into a VW and present that view on a single display screen. The gaming engines currently have a maximum pixel generating count. In some embodiments it is contemplated that a single gaming engine may be used to drive all emissive surfaces at a station. To drive three surfaces that are arranged about a station, the engine obtains three VW views that are aligned in the real world with the three surfaces and each view has approximate ⅓rd the total engine pixel count. Here, experiments have shown that the ⅓rd count has sufficient definition to cause an intended immersion effect. It is believed, however, that further reduction in pixel count would adversely affect the intended immersion effect. With conventional gaming engines if a complete surrounding surface as in FIG. 30 were to be driven, the VW definition would be very granular instead of high definition and therefore would not be optimal.

In some cases a sensor 36 (see again FIG. 30) may be provided in a station 320 to sense at least the general direction in which an employee In the station is gazing. Here, where pixel count is an issue given engine limitations, server 12 may modify the sections of surface 324 that present VW views on the fly so that the VW view is always aligned with the employee's general gazing direction. Thus, for instance, in FIG. 30 where an employee's general field of view is shown by phantom line 327, server 12 may only present a virtual view in the section of surface 324 subtended by the employee's FOV. Then, when the employee turns to the side, the new gaze direction may be detected and server 12 could change the VW view to align with the employee's new gaze direction. Here, in some cases, low definition views in the VW may be presented in an employee's peripheral view while processing power is used on generating a high definition image in an employee's foveal view.

In other embodiments two or more gaming engines may operate simultaneously on a single VW instance to generate higher pixel count views into the VW that create a better immersive experience. For instance, where a station 14 includes first, second and third emissive surfaces 46a, 46b and 46c, first, second and third gaming or VW engines may be run at the same time by server 12 where each has a different high definition VW view and drives a different one of the surfaces 46a, 46b and 46c, respectively. In the case of a configuration like 320 in FIG. 30, three or more simultaneously running engines may be used to drive the surrounding surface 324 with high definition views. It is contemplated that the pixel count of gaming and VW engines generally will continue to increase appreciably and eventually a single engine will be able to present a maximum number of perceivable surrounding pixels about an emersion location.

Referring again to FIG. 2, while assembly 40a is shown as having an emissive surface 46a that is spaced above an ambient floor surface, in at least some embodiments it is contemplated that the lower edge of surface 46a and lower edges of other surfaces 46b and 46c may extend substantially all the way to the ambient floor surface. In addition, while shown as having no curvature with respect to vertical, in at least some cases each surface 46a, 46b and 46c may have some curvature with respect to vertical to be concave toward the employee's physical location. In other cases, each surface 46a, 46b and 46c may have a lower portion that angles upwardly as suggested by the angle shown at 37 in FIG. 2 so that the lower portion generally faces upward toward an employee sitting in chair 50. Again, the larger emissive surface that presents more pixels about a user enhances the immersion effect.

Figure 4:
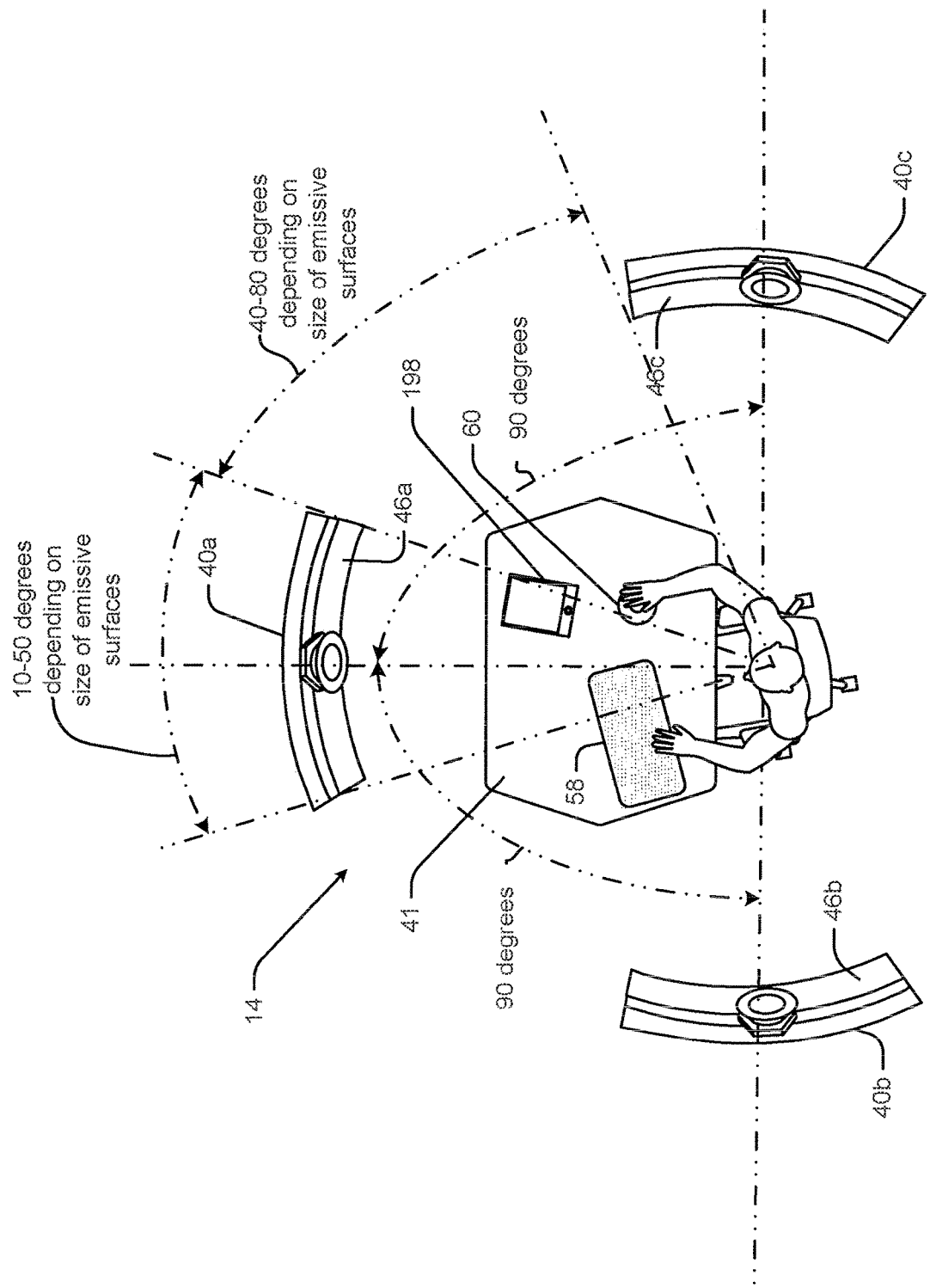
FIG. 4 is similar to FIG. 3, albeit showing station affordances in a different arrangement.

Other emissive surface shapes are contemplated. For instance, the degree of surface curvature may change along the width dimension W1 so that the amount of curvature in a central portion (e.g., the central ⅓rd or ⅔rds) is less than the amount of curvature near the lateral edges. In addition, the curved shapes of emissive surfaces 46a, 46b and 46c may be different or surface 46a may have a different shape than each of surfaces 46b and 46c while surfaces 46b and 46c have similar shapes, the shapes selected to enhance the immersive effect of the VW presented. In this regard, it has been recognized that as illustrated in FIG. 4, for instance, surface 46a resides generally in an employee's fovial view while surfaces 46b and 46c reside in the employee's peripheral view. Here, people perceive visual effects differently in their peripheral view than they do in their fovial view and therefore, in at least some cases, different shaped peripheral and fovial surfaces may be advantageous.

In addition to supporting emissive surface 46a, cart 42, in at least some cases, supports high fidelity speakers 34 and microphones (not illustrated) that form part of the audio system. In other cases speakers 34 and microphones may be separately mounted on walls, on the table 41 or on other support structure about assemblies 40a through 40c.

Figure 3:
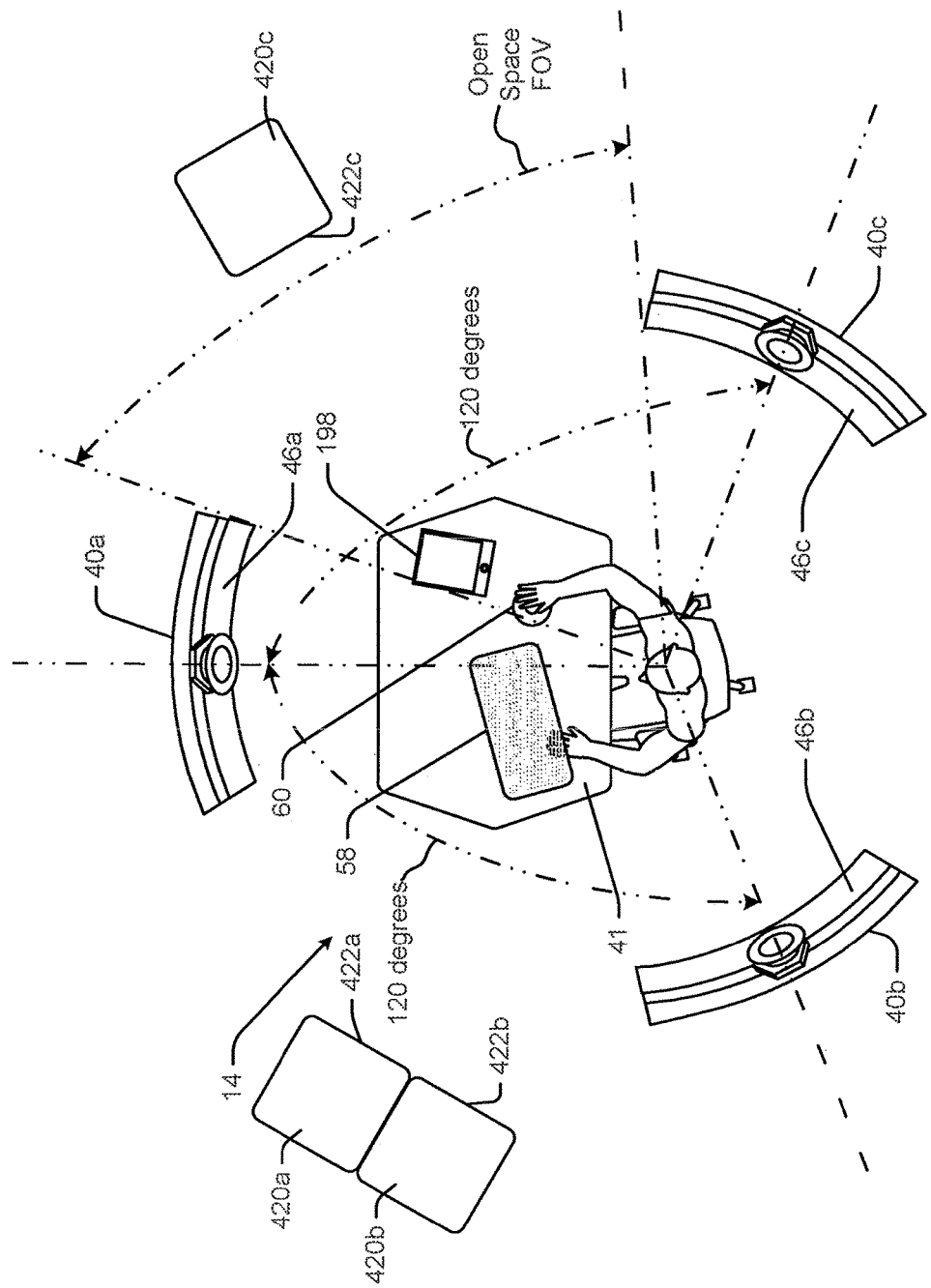
FIG. 3 is a top plan view of a VW station akin to the FIG. 2 station, albeit showing additional affordances consistent with some disclosure aspects.

Referring still to FIG. 2 and also to FIG. 3, in some cases the three assemblies 40a through 40c may be persistently positioned about a user's location in chair 50 at specific relative juxtapositions. For instance, in some cases assemblies 40a though 40c may be arranged with 120 degrees separating each adjacent two assemblies about the user's location with one assembly 40a immediately in front of seat 50 and the second and third assemblies to the left and behind and to the right and behind chair 50. In other cases, as shown in FIG. 4, the assemblies 40a through 40c may be arranged so that a horizontal axis through central points on the surfaces 46a through 46c form 90 degree angles with each other and generally face the user's location. Other relative juxtapositions of the emissive surfaces are contemplated.

While three emissive surfaces are shown in most of the figures in this disclosure, other embodiments are contemplated that will include only two or four or more emissive surfaces for presenting VW views to an employee. For instance, in a system that includes five assemblies including 40a through 40c, the fourth and fifth assemblies may be provided between the first and second 40a and 40b and between the first and third 40a and 40c, respectively, in FIG. 4. Other screen or surface configurations are contemplated and are described in detail hereafter.

Referring yet again to FIG. 1, server 12 is linked to each of the emissive surfaces 46a through 46c and speakers 34 to drive those devices with content that is consistent with a VW data set from database 22. This link may be wired or wireless. Where wireless, the link may be via the wireless access points 39 proximate a space in which configuration 14 is located. Server 12 is further linked to the interface devices 58, 60 for receiving control commands therefrom. In a particularly advantageous embodiment devices 58 and 60 are wirelessly linked via access points 39 to server 12.

Referring to FIG. 4, interface device 58 includes a conventional wireless keyboard. Device 198 includes a tablet type computing device that can run a VW software application to provide on screen tools useable to define personal preferences within a VW and to navigate within a VW in a manner to be described hereafter.

Figure 5:
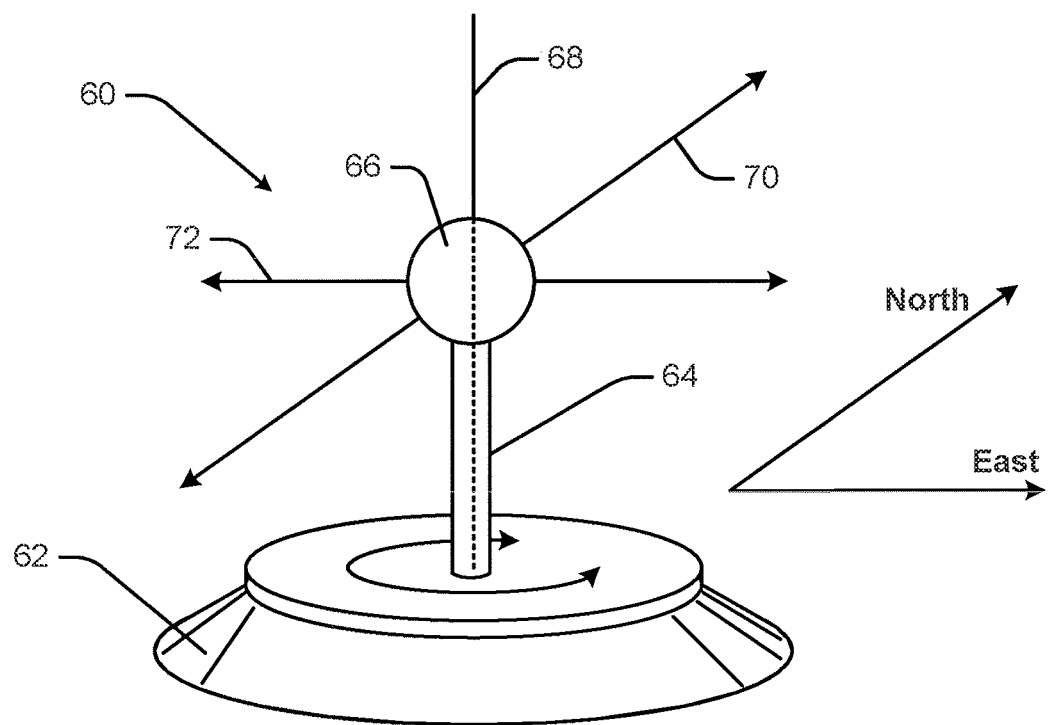
FIG. 5 is a perspective view of an exemplary joy stick type interface device that may be used as a VW navigation tool in a VW station.
Figure 6:
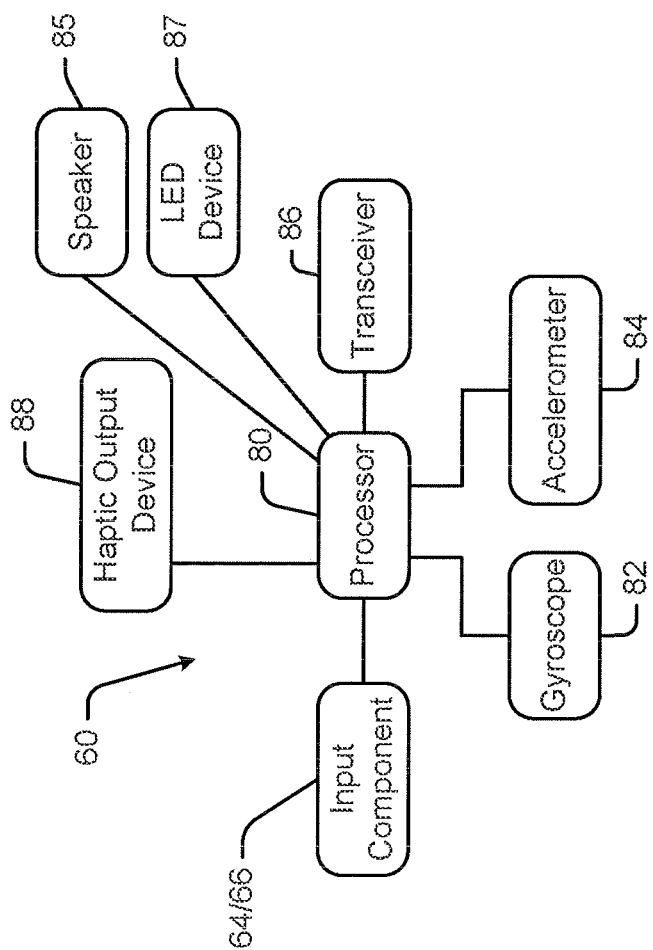
FIG. 6 is a schematic view of the internal components of the interface of FIG. 5.

Referring also to FIGS. 5 and 6, interface device 60 is a joystick type input device that includes a generally circular or disc shaped base member 62, a vertical shaft 634 that extends upward from the base 62 and a spherical knob 66 at an upper end of the shaft 64. Here, as is the case with many joystick type interface devices, an employee can grasp knob 66 and push the knob to any side along any generally horizontal trajectory (e.g., see axis 70 and 72) to create a directional movement command. In addition, in at least some embodiments shaft 64 can be rotated about a vertical axis 68 to indicate a turning or rotating motion as indicated at 67. In at least some cases, while shaft 64 can rotate and be pushed in any direction with respect to base 62, the shaft 64 will be spring loaded so that it always returns to a steady state orientation as shown in FIG. 5.

Referring still to FIG. 6, in addition to including the joystick input component 64/66 and other components described above, device 60 also includes a processor 80, a transceiver 86, a haptic output device 88 and orientation sensing devices 82 and 84. Here, the orientation sensing devices may include a gyroscope and an accelerometer or other sensing devices that generate signals useable by processor 80 to determine the relative orientation of device 60 within a space including the system 14 and therefore to discern the relative orientation and juxtaposition of device 60 with respect to the emissive surfaces 46a, 46b, 46c in the space. Once relative orientation and juxtaposition with respect to the surfaces 46a, 46b and 46c is known, any directional or rotational movement of shaft 64 can be determined relative to the surfaces and used to travel accordingly in the VW. Thus, for instance, if axis 70 in FIG. 5 is aligned directly with the central portion of surface 46a, by pushing shaft 64 directly forward toward surface 46a, movement in the VW would be along the forward trajectory directly into the VW represented on surface 46a. Here, if the user pushes shaft 64 to the left, movement would be left into the VW into surface 46b, and so on. Here, if device 60 were rotated through 90 degrees about the vertical axis 68 and then shaft 64 were pushed forward toward surface 46a, again, movement in the VW would be along the forward trajectory directly into the VW represented on surface 46a as the device processor 80 world compensate for the new relative orientation of device 60 in the system space.

To rotate within a VW, an employee rotates shaft 64 about axis 68 with respect to base 62. Here, rotation within the VW continues as the employee holds shaft in the rotated position. Once the shaft is released, the spring that loads the shaft pulls the shaft back into the steady state position and rotation stops. Other interface devices for navigating VWs are contemplated.

The haptic output device 88 may include a vibrator or other haptic device that can generate a signal that can be sensed by touch by a device 60 user. Here, processor 80 may control device 88 to generate some type of haptic signal when some limit is met within a VW. For instance, if an employee moves into a virtual structure that the employee cannot pass through, device 88 may create a vibration to indicate the limiting position in the VW.

In some cases device 60 may also include a speaker 85 and/or an LED or other light type device that can provide different feedback or special effects to an employee using the device. For instance, again, when an employee traveling in the VW moves into a structure that the employee cannot pass through, the speaker may generate a collision sound or some other warning signal. When the system generates sound associated with a VW location, some or all of the sound may be generated by the speaker 85.

Figure 7:
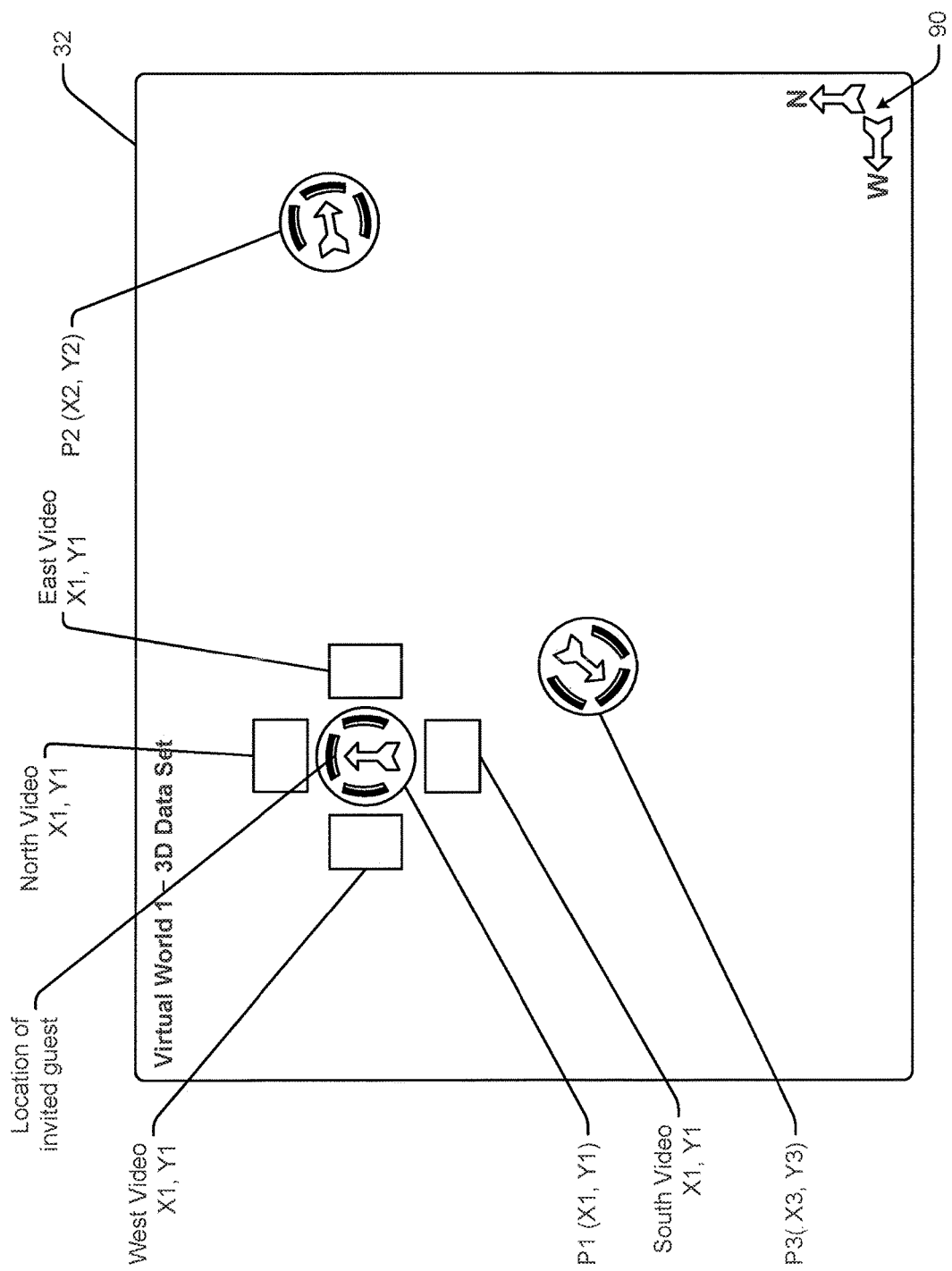
FIG. 7 is a 2D top plan view of a 3D VW data set showing three different employee locations within the VW.

Referring now to FIG. 7, an exemplary 3D VW data set 32 is shown in 2D form from a top plan view. A directional legend is shown at 90 within the data set. First, second and third different user or employee positions within the VW data set are indicated by position icons P1, P2 and P3. As shown, icons P1, P2 and P3 are located at X and Y locations in data set 32 of (X1, Y1), (X2, Y2) and (X3, Y3), respectively. Each position icon includes an arrow (e.g., 33) indicating an orientation or direction (e.g., with respect to the N-W legend) of an associated employee. Thus, for instance, at position P1, an employee is facing due north, at position P2 an employee is facing almost due east and at position P3 an employee is facing south-west.

Referring still to FIG. 7, at each of the positions P1, P2 and P3, an employee has views of the data set 32 that are aligned with the positions of the emissive surfaces 46a, 46b and 46c that comprise configuration 14. For instance, see the views presented by surfaces 46b, 46a and 46c in FIG. 8 associated with a west video view, a north video view and an east video view as labeled in FIG. 7, respectively. Not shown in FIG. 8 is a south video view in FIG. 7 that is behind the employee's VW location and which would not be aligned with any of surfaces 46a, 46b or 46c while the employee faces north in the VW 32. See also FIG. 9 where the employee has rotated through 90 degrees to not face west in the VW so that the south video view from FIG., 7 is shown on surface 46b and the west and north video views are shown on surfaces 46a and 46c, respectively. Here, while the employee's position at P1 remains unchanged, the employee's orientation has rotated through 90 degrees. While not shown, the transition from the FIG. 8 state to the FIG. 9 state world be smooth so that the employee could appreciate the continuity that exists within VW 32 as the transition is occurring.

Referring still to FIG. 7 and also to FIGS. 5 and 8, the employee can move about within space 32 to any allowed location (e.g., a location that the VW engine allows) such as to any of locations P2 and P3. As the employee travels in VW 32, the employee would see smooth transitions and movement on all three emissive surfaces 46a, 46b and 46c and eventually would be presented with front, left and right views aligned with a new position and orientation similar to the views shown in FIG. 8.

While some systems may require an employee to rely on memory to return to the same VW locations time and again, in other cases it is contemplated that an employee will be able to earmark or flag different favorite locations within VW 32 to help the employee return to specific locations for specific activities. To this end, see icon 92 in FIG. 8 which may be selected via some type of interface device (e.g., a mouse controlled cursor). For instance, any of surfaces 46a, 46b, 46c, etc., may be touch sensitive so that an icon or other content presented thereon can be selected or indicated via touch. As another instance, one of the interface devices 58, 60, 198, etc., used by an employee may be used to move an on screen cursor to a surface icon 92 and select the icon via a double click or the like on the surface. In still other cases it is contemplated that icon 92 may be presented to an employee via one of the employee's wireless hand held interface devices like device 198. Here, if icon 92 were presented on the display screen that forms part of device 198, when the icon 92 is selected, device 198 would transit a wireless signal to server 12 via access points 39 (see again FIG. 1) instructing the server to commence a process whereby the employee's current VW location is marked. Unless indicated otherwise it should be assumed that any of the other icons shown in the figures that are described hereafter may be selected in any of the ways described above.

Referring still to FIG. 8, once icon 92 is selected, server 12 may open a naming or label field 93 as shown and allow the employee to assign a personal label or title to an instantaneous VW location. Once saved, the label is stored in the database 24 as a user preference for the user's instance of the associated VW. To this end, see the VW 2D representation in FIG. 16 where a location 166 has been labelled "Rejuvenation". Once stored, when the employee again accesses VW 32, the employee may simply use an interface device to select the named or labelled location to return to that location. For instance, a tablet 198 computing device interface screen is shown in FIG. 17 that includes, among other features described hereafter, a location icon 166a labeled "Rejuvenate". Here, it is contemplated that an employee may simply select (e.g., double tap) icon 166a to travel to the associated location 166 (see again FIG. 16) in the VW presented by the system. While only one named location appears in FIG. 17, it should be appreciated that an employee may name and mark as many locations as she would like to help the employee remember and reaccess specific VW locations.

Referring again to FIG. 1, exemplary database 16 includes a user database that, among other things, stores user preferences associated with various VW data sets in database 22. To this end, database 24 includes a list of system users or employees that use the system in column 26 and, for each user in column 26, a preferences set in column 30. For instance, for employee U1, the preferences set includes customized parameter sets for each of VW1 and VW2 from VW data sets VW1 and VW2 in database 22. While the customized parameter sets may include many different customized parameters for associated VWs, in at least some cases when an employee earmarks and names a special VW location, that location and its name will be stored as a customized parameter within list 30. Other customized parameters are contemplated and some are described hereinafter.

While the VW can be used to help an employee rejuvenate, the VW can also help an employee achieve an efficient and effective mind state while accesses or developing work content or work product in at least some cases. For this reason, in at least some cases an employee may open up and work on work product or content within a VW. To this end, see the "content" icon shown in FIG. 9 that is selectable by an employee to access her personal content. Here, the term "content" is used to refer to many different things. First, the term content includes any document or digital data set that is arranged to have some meaning. For instance, content may include a PDF document, an image, an audio recording, etc. Second, the term content also includes various types of software applications that an employee may want to use to generate or access other content types. For instance, here, content may include a word processor application, a spreadsheet application, a CAD or CAM application, an e-mail application, an image manager application, etc. Third, the term content also includes combinations of documents and applications required to access those documents. For instance, when a Word document is to be accessed, the combination of the Microsoft Word application and the document may be considered one instance of content, when an image is to be accessed, the image along with the application may be considered a single instance of content, etc. Thus, in some cases, where a document is opened that requires an application to access, the application may be opened first and then the document accessed and opened within the required application.

Figure 10:
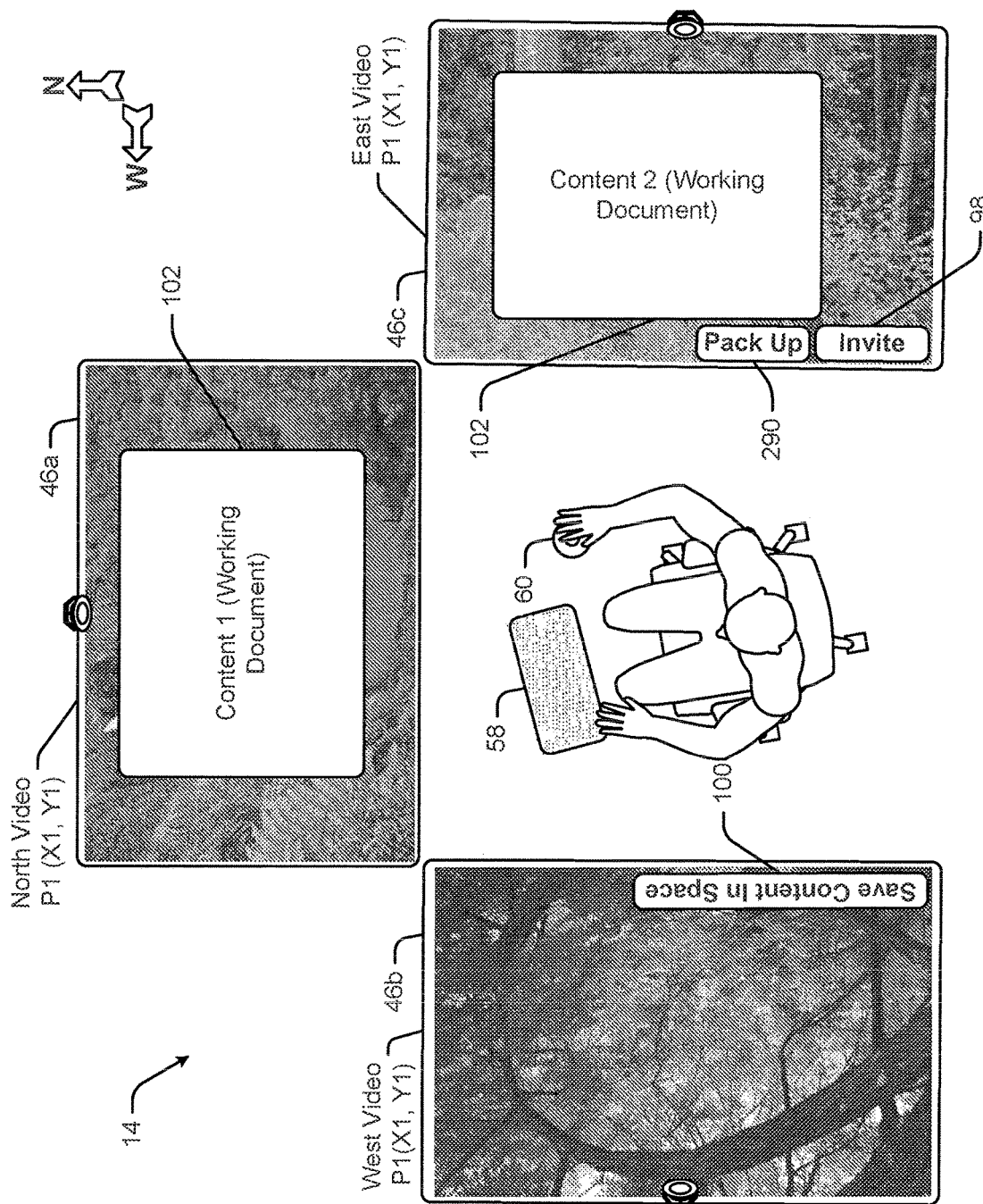
FIG. 10 is similar to FIG. 8, albeit with the statin in another operating state.

FIG. 10 shows an employee at location P1 accessing content in a window 102. As shown, when content is accessed in the VW, in at least some embodiments a separate content window 102 is opened that is dimensionally smaller than the emissive surface (e.g., 46a) on which it is presented so that at least peripheral or edge sections of the presenting surface 46a persistently show the VW from the employee's location and the side surfaces 46b and 46c continue to persistently show the VW. Here, again, by presenting at least some VW views peripherally, the human mind is still capable of effectively stitching the VW together so that the mind state altering effect of being in the VW at least somewhat persists. While a default is to present some VW view on the edge sections of surface 46a, an employee may, in at least some cases, expand the content window to cover the entire surface 46a when desired.

In addition, in at least some cases it is contemplated that an employee may be able to open up several different content windows to access multiple applications and content at the same time. In this case, the multiple windows may be opened on surface 46a only or on two or all three of the surfaces 46a, 46b and 46c, depending on user preferences.

In at least some cases an employee may want to associate specific content with specific VW locations. For instance, an employee may want to leave a spreadsheet open within her instance of a VW so that she can routinely access and modify the spreadsheet in the future in the same environment used to initially create the spreadsheet. As another example, an employee may want to leave images of family members posted in a location associated with rejuvenation. Referring to FIG. 10, in some embodiments when an employee accesses or is creating content, the system may present a "Save Content In Space" icon 100 or the like on one of the surfaces 46c that is selectable to, in effect, post the content at an instantaneous VW location so that the content is then associated with the specific location.

While not shown, if an employee has several content windows opened up at one VW location, the employee may be able to save all opened content at the employee's instantaneous VW location. For instance, again referring to FIG. 10, if the employee has separate content windows 102 and 105 opened up on surfaces 46a and 46c when save icon 100 is selected, all of the open content may be saved at the instantaneous VW location. In addition, when two or more content windows are saved at the same time, the content windows may be automatically linked in the system so that they are accessed together as a single content unit the next time the employee accesses that information. Linking simultaneously saved content together to be presented subsequently together is useful in cases where many windows of content are presented at the same time during a session and where the saving employee wants to access that information in the same arrangement subsequently.

Referring again to FIG. 1, content saved by an employee at a VW location may be stored in the user database 24 in another column 28 where the content is associated with the employee or user that saved the content. Thus, as shown in FIG. 1, three different sets of content are associated with user U1, two sets with user U2, and so on. In addition to saving the employee's content in database 24, the customized parameter set for a VW in column 30 may store location parameters for each content instance stored by the employee so that content in the database 24 is clearly associated with specific VW locations for the specific employee.

Figure 16:
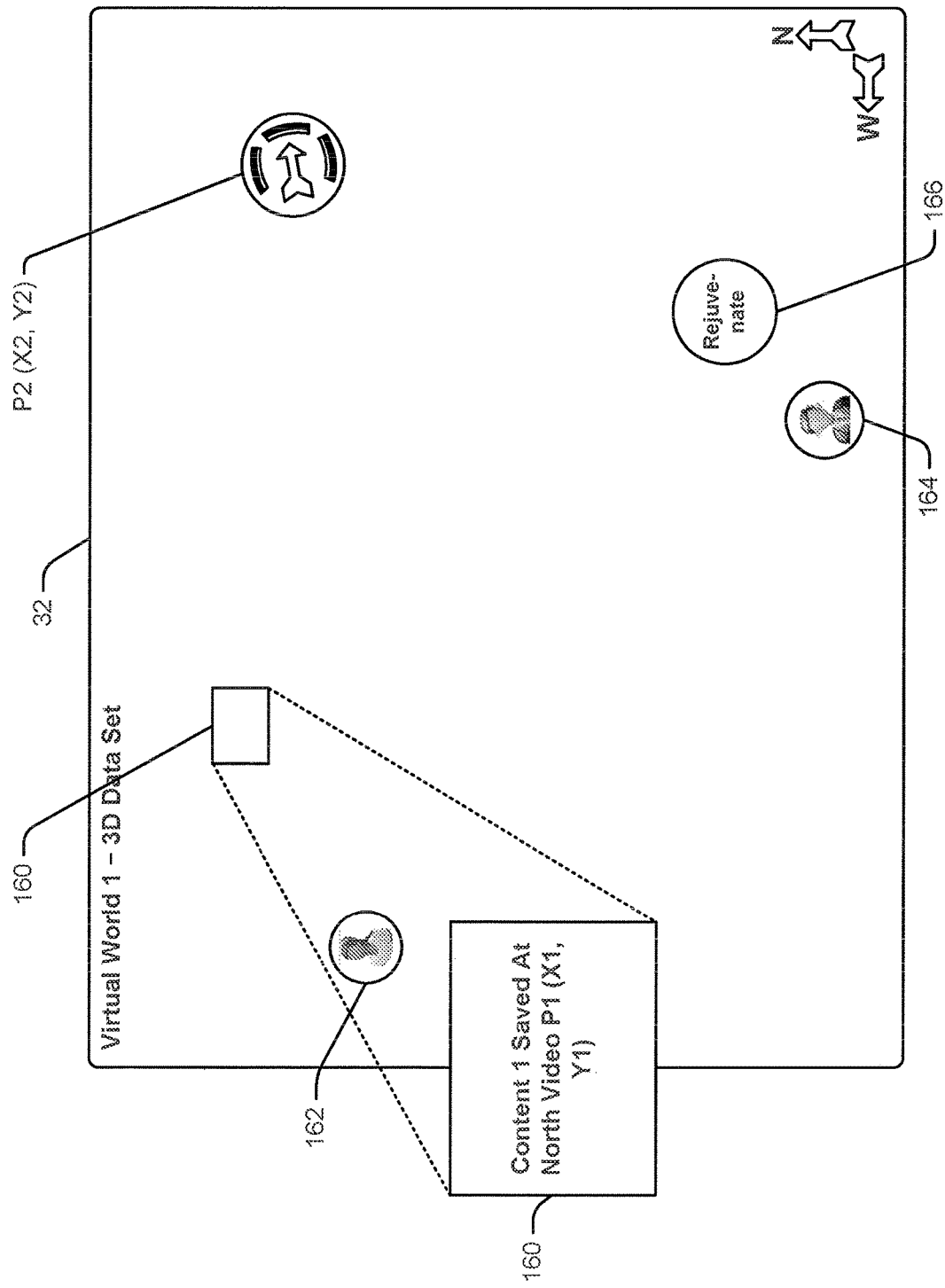
FIG. 16 is similar to FIG. 7, albeit showing the data set with content posted to a specific location as well as locations of other employees in the VW.
Figure 17:
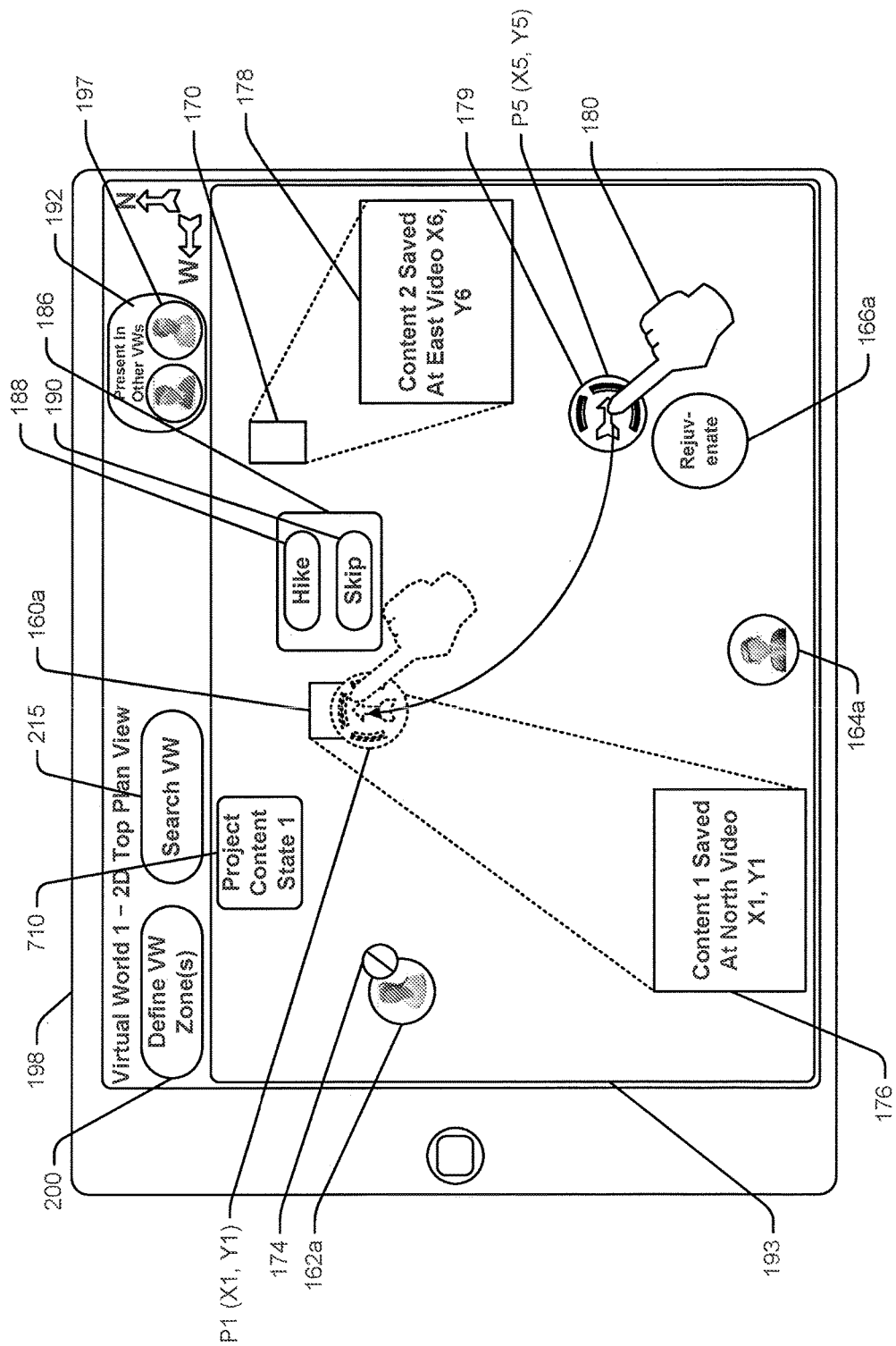
FIG. 17 is a view of a tablet type interface device including a 2D representation of a VW that may be used to navigate a 3D VW world that is presented on the emissive surfaces shown in FIG. 8 or other illustrated embodiments.

Referring now to FIG. 16, a 2D representation of the 3D VW 32 is shown where content 160 has been associated with position P1. While shown as a rectangle 160 in order to simplify an understanding of the present description, in at least some embodiments the content at location P1 is associated with the point P1 at coordinates X1 and Y1 as opposed to a planar space or even a line in the 2D representation. Similarly, where three or more content windows are opened up to view at a specific VW location, those windows and associated content are associated with the specific VW X and Y point so that they are accessible at that specific point or location. Again, when accessed, the content is presented in a spaced relationship away from the employee in real space and away from the associated point so that the employee can see the content.

Once content is stored for a specific VW location, whenever the employee returns to the specific location, the content associated with the location may be rendered accessible to the employee. To this end, see again FIG. 9 where a "Content 1" icon for the employee's instantaneous VW location is presented at 96. By selecting icon 96, the content associated with the employee's instantaneous VW location is again accessed and presented, as before, on the emissive surface(s) 46a, 46b and 46c. When an application is required to present the content, the application may be automatically opened and run by a system server. In at least some cases one or more applications may be run to modify content in the VW and those changes may be automatically stored in the VW for subsequent access.

Figure 9:
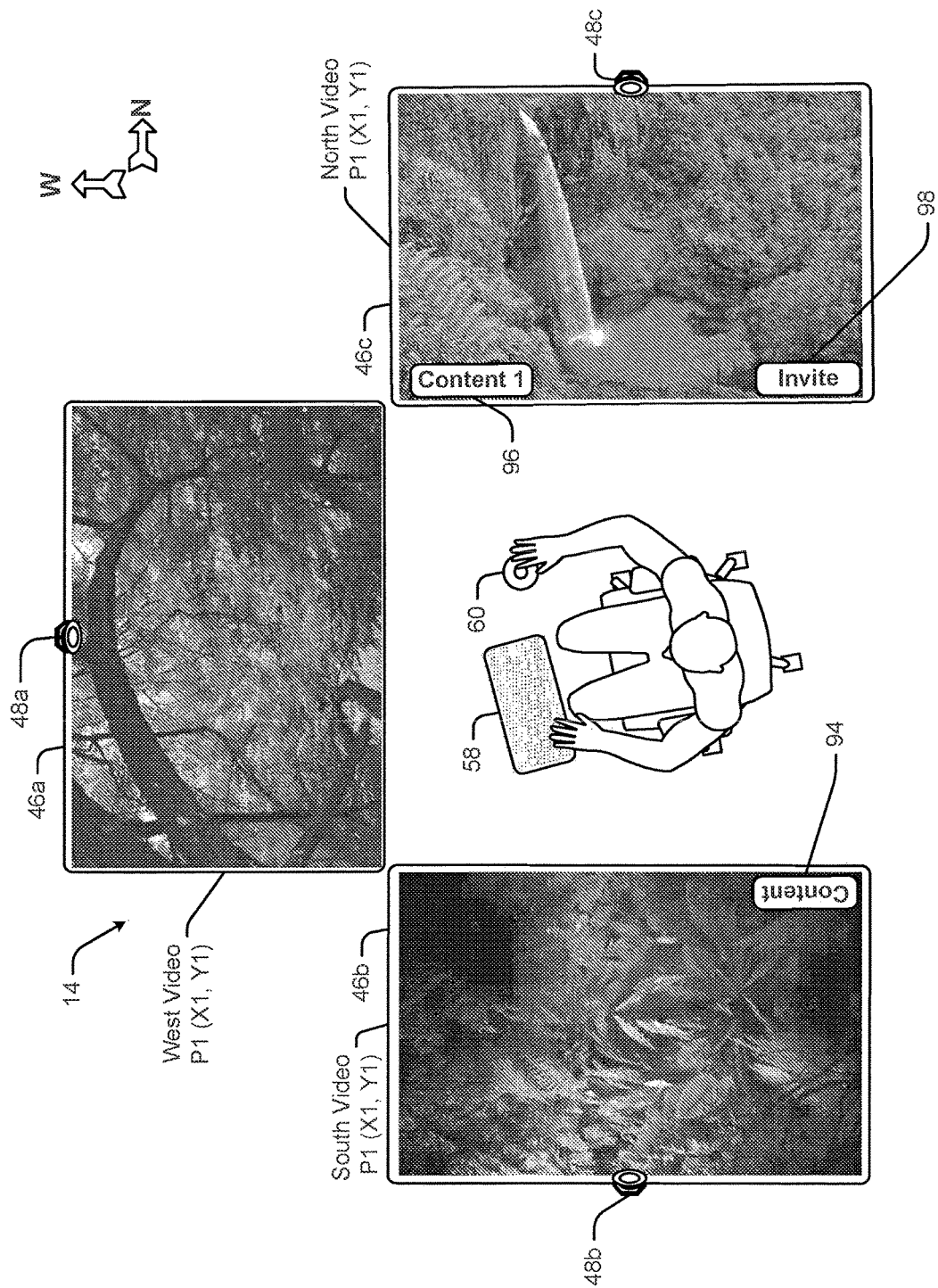
FIG. 9 is similar to FIG. 8, albeit with the statin in another operating state.

In FIG. 9 content icon 94 is different than content 1 icon 96 in that the content associated with icon 96 is linked to the employee's instantaneous VW position while the content associated with icon 94 is more general and may include all or a larger set of content that is generally associated with or owned by an employee and that, at least initially, is not associated with the instantaneous VW location of the employee.

In some cases multiple sets of content may be independently (e.g., at different times) associated with each VW location. In this case, when an employee travels to the VW location, the system may present some tool for accessing any content that is associated with the specific location. For instance, a first employee may always perform work content generating activities at the exact same VW location and, in that case, the first employee may have a large number of documents associated with the specific location. Referring again to FIG. 13, to enable intuitive access to a list of content associated with a location, when the employee arrives at the location, server 12 may present a "Content Associated With This Location" icon 116 on one of the configuration surfaces 46b which, when selected, causes a content selection window 118 to be opened up which includes a list of selectable content associated with the specific location. While not shown, in at least some cases more complex content searching tools may be provided for the employee at any location associated with any content.

In at least some cases server 12 may be useable to locate and contact or conference with other employees while in a VW. Thus, for instance, a first employee using configuration 14 may want to participate in a video conference with a second employee while remaining in a VW. To facilitate video conferences, at least one camera 48a (see FIG. 11) may be mounted to or otherwise provided proximate central or front surface 46a to obtain high definition video of the employee using configuration 14. The other assemblies 40b and 40c may likewise include cameras 48b and 48c, respectively, for obtaining side images of the employee using configuration 14.

Figure 11:
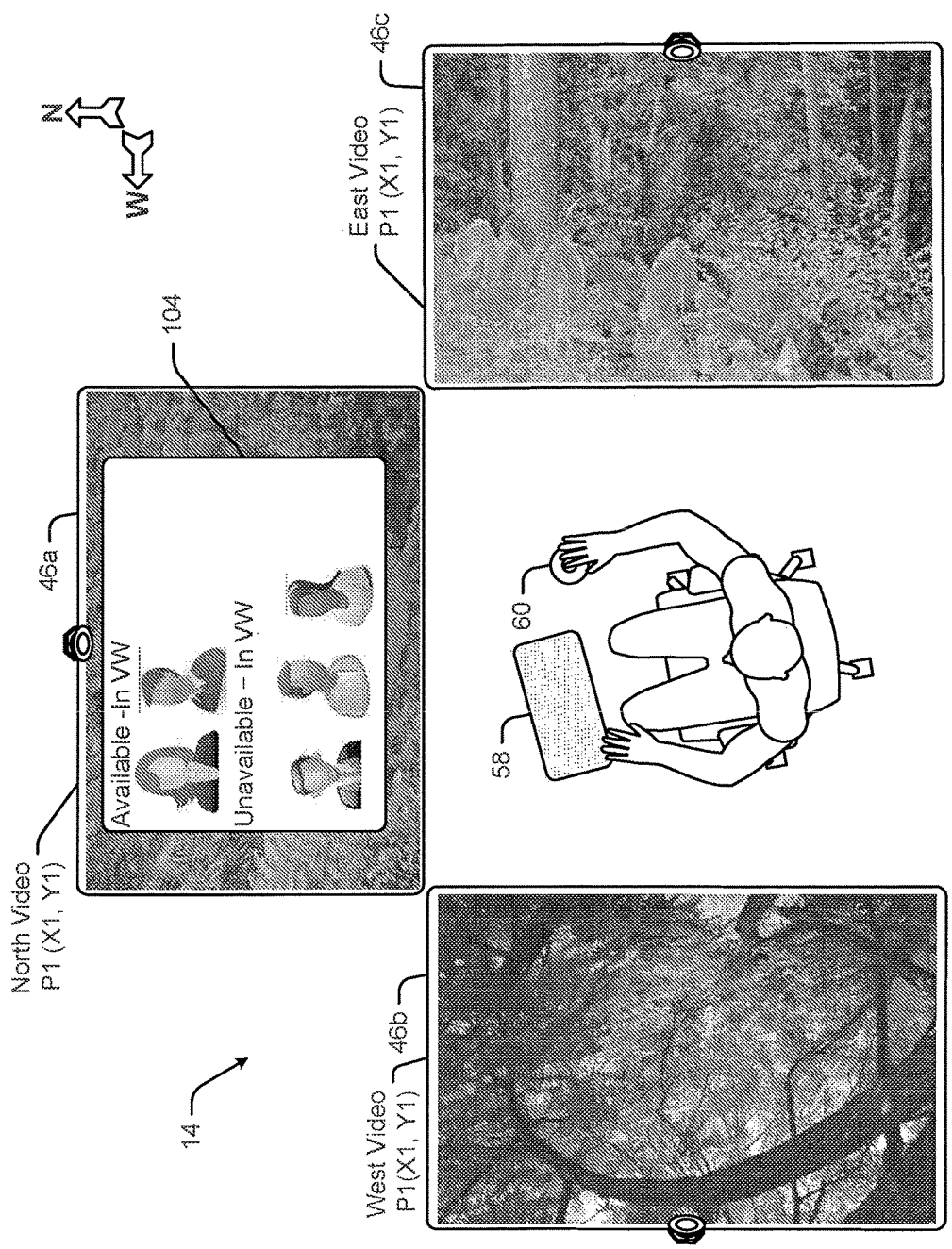
FIG. 11 is similar to FIG. 8, albeit with the statin in another operating state.

Referring still to FIG. 9, an "Invite" icon is presented at 98 that can be selected to obtain information related to availability of other employees to conference. After icon 98 is selected, a window 104 may be opened that includes information about other employee availability for conferencing as shown in FIG. 11. In the example, the other employee information includes a list of employees that are currently available and that are in their own VW instances as well as a list of unavailable (e.g., busy) employees that are currently in a VW. Here, it is assumed that each other employee in the two lists is using a configuration akin to configuration 14 including emissive surfaces, speakers, cameras, etc., to present audio and visual VW effects. In other cases server 12 may generate other employee lists such as, employees available at any workstation suitable for video conferencing, employees available where their proximity to a video conferencing work station is unknown, employees that are available in the next 10 minutes (based on an electronically maintained schedule), etc.

When another employee is located within the same VW instance as a first employee, the list may indicate this special VW relationship, etc. In still other cases server 12 may indicate employees that are in a work, rejuvenation or other type of scheduled activity or deep flow and those that are not. Here, employee schedules as well as real time location and activity sensing systems may be employed by server 12 to determine any of the above statuses and to adjust presented lists accordingly.

Figure 12:
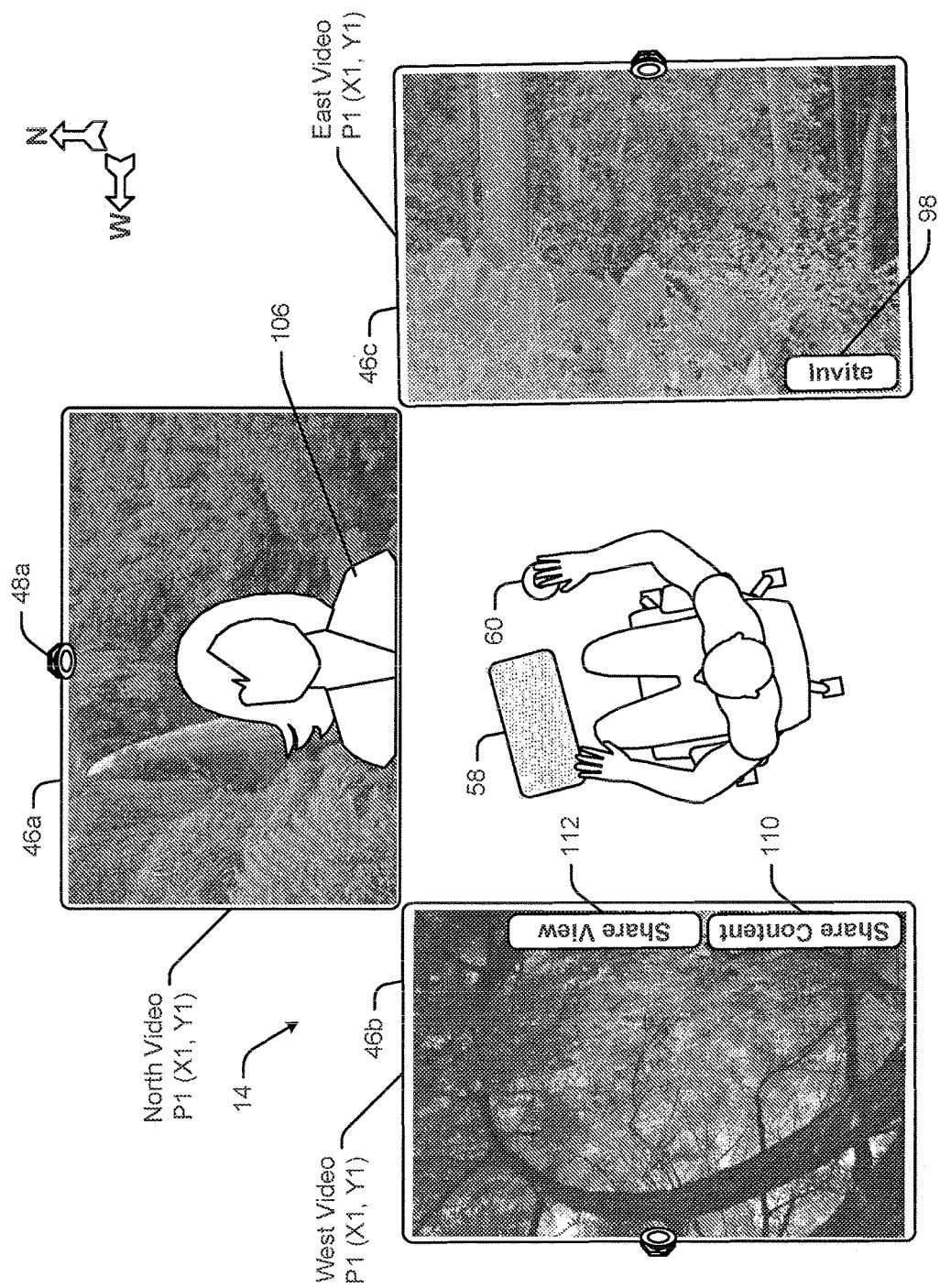
FIG. 12 is similar to FIG. 8, albeit with the statin in another operating state.

Referring again to FIG. 11, the employee using configuration 14 may select an available other employee from the first list to send a conference request to the selected employee. If the other employee accepts the invite, as seen in FIG. 12, a video representation of the other employee 106 may be presented on surface 46a. In the alternative, a video window may be opened up on surface 46a, again, smaller than the dimensions of surface 46a so that lateral edges of the surface 46a can continue to present views into the VW. The employee using configuration 14 may also select an unavailable other employee from the other list which, in some cases, may present an invite to the other employee at some future time that is determined to be appropriate for presenting an invite to the unavailable employee (e.g., when the other employee emerges from a current "deep flow" state).

In at least some cases when two employees are in different instances of the same VW or are in different VWs altogether when a conference request is accepted, one employee's VW may be placed within the other employee's VW at the same location as the other employee so that the two employees share a common VW experience during their conference. For example, in FIG. 12 where a first employee using configuration 14 is in a first VW that presents jungle views when a conference invite is accepted by the second employee shown at 106, assume that prior to accepting the invite, the second employee was located in a second VW that presents beach views. Here, once the second employee accepts the first employee's invitation to join the conference, the second employee may automatically be placed in the first VW that presents the jungle views. Instead of being immediately placed in the first VW, server 12 may develop a virtual path from the second VW to the first VW and start a virtual travel process from the second VW to the first that will take a short duration (e.g., 15 seconds), to simulate travelling from the second VW to the first.

Figure 22:
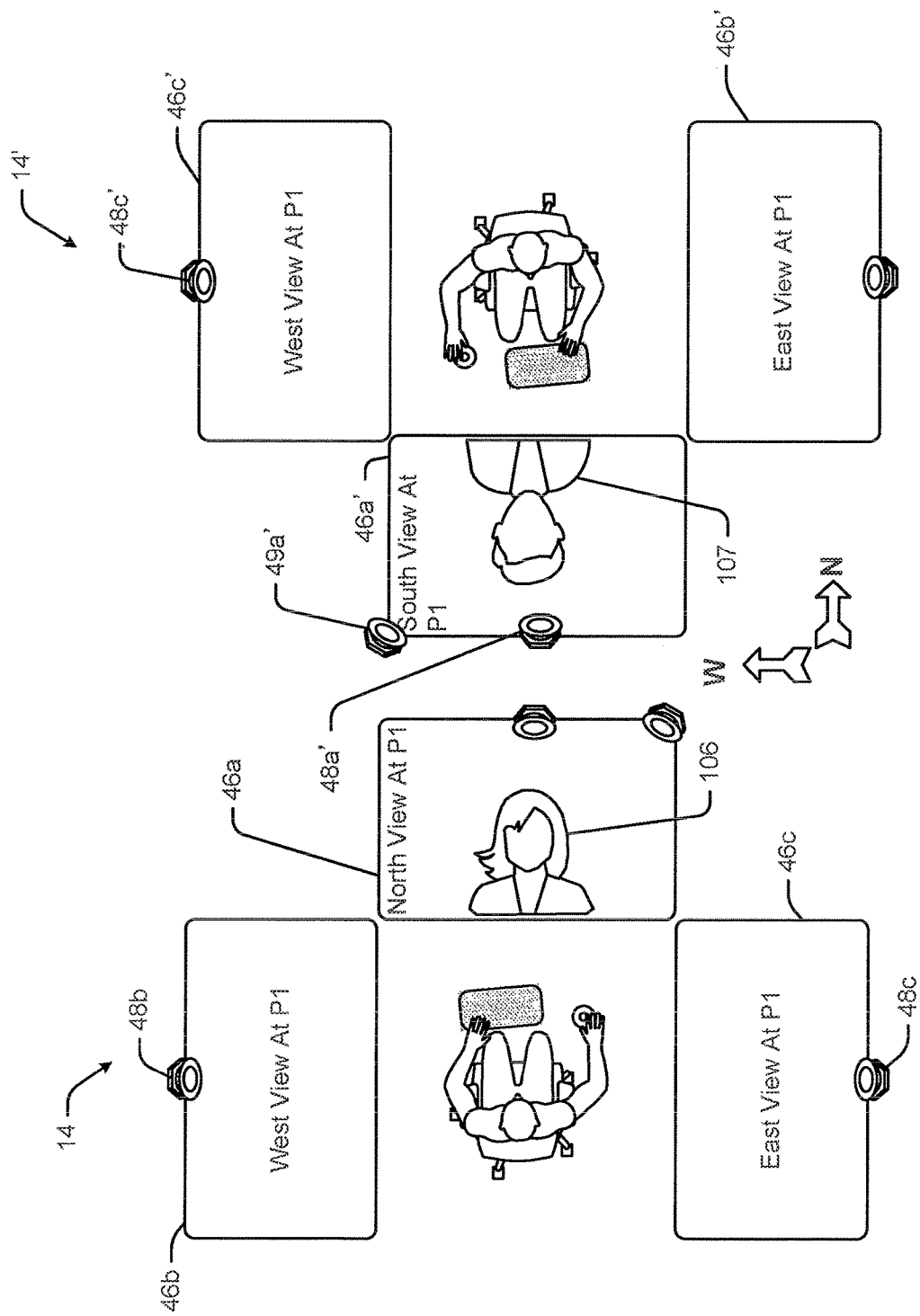
FIG. 22 is a top plan view of two employees at two different VW stations that are video conferencing in a single cohabited VW where the employees VW perspectives are opposed.

In at least some cases, when the second employee is ultimately placed in the first VW and faces the first employee, the second employee's views may be opposite the first employee's views within the first VW. To this end, see FIG. 22 where first and second configurations 14 and 14' are shown that are being used by first and second employees. Here, instead of seeing the north video for point P1 on a front surface 46a the way the first employee does in FIG. 22, the second employee sees the south video (see again FIG. 7) behind a first user representation 107 on her front surface 46a'. In addition, because the second employee in the first VW is facing the first employee in the first VW, what the first employee sees to the left on surface 46b and to the right on surface 46c is seen to the right on surface 46c' and to the left on surface 46b' by the second employee, respectively. Thus, for the first and second employees, it is like they are both present in the same virtual space and see the same thing when they look in the same side direction but see different opposing views in the VW when they look at each other.

In at least some cases more than one employee may be invited to a video conference within a VW and, in that case, a separate employee representation may be opened for each of the other employees attending the conference. Here, multiple employee representations may be opened on the same surface (e.g., 46a) or second and third representations may be opened on the side surfaces 46b and 46c, or some combination of both.

Figure 13:
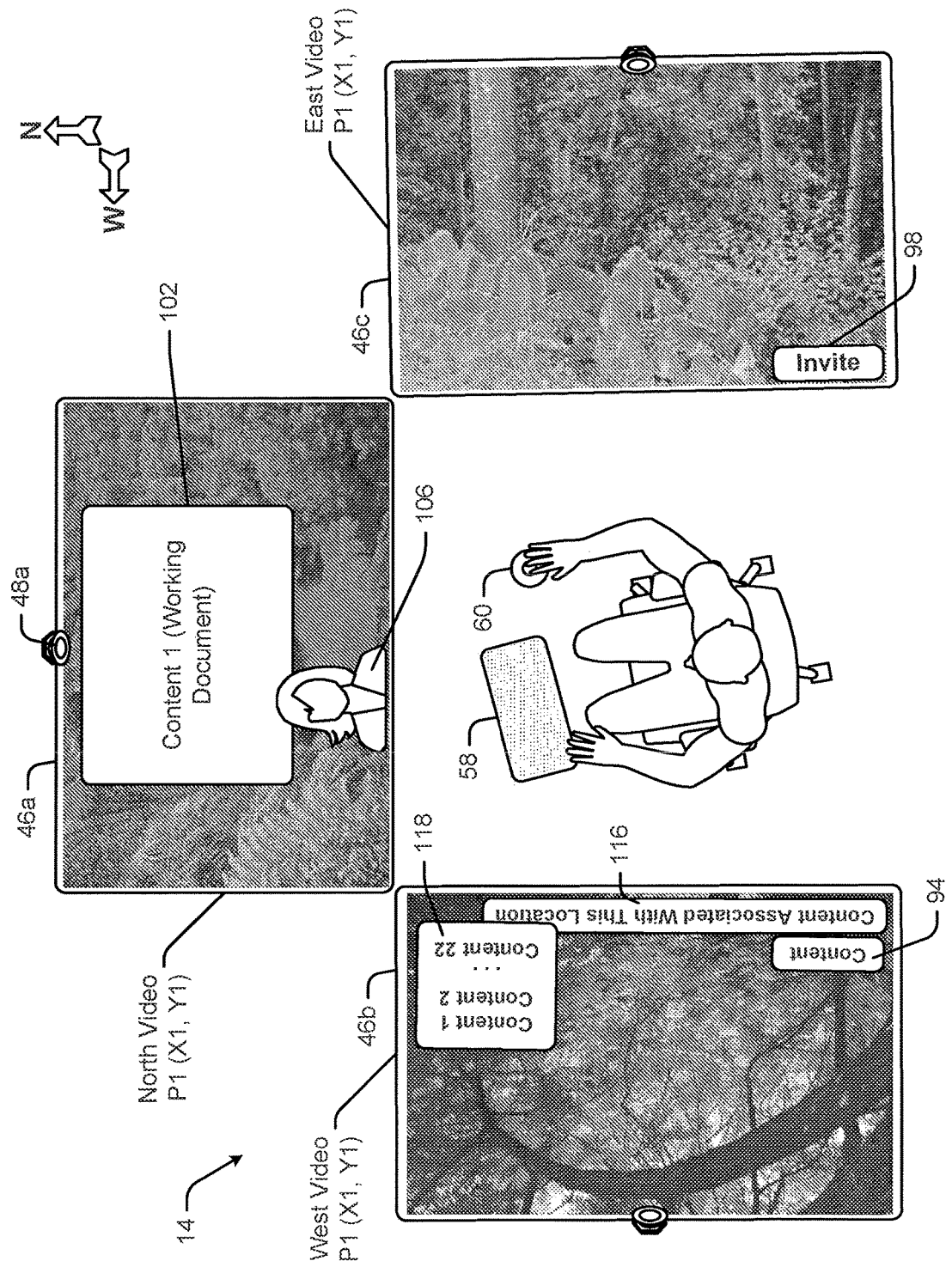
FIG. 13 is similar to FIG. 8, albeit with the statin in another operating state.

In addition to accessing content or participating in a video conference within a VW, both content access and video conferencing may occur at the same time as shown in FIG. 13. Here, the accessed content may be shared by selecting a share icon as shown at 110 in FIG. 12. In the alternative, the content may simply be accessed by a local employee without providing a copy to a remote employee. While a content window 102 and a video conference representation 106 are both shown on surface 46a in FIG. 13, in other embodiments content and video conference representations may be located on different surfaces. For instance, video conference representation 106 may be presented via surface 106 as in FIG. 12 while the content window 102 is moved to right surface 46c.

Figure 14:
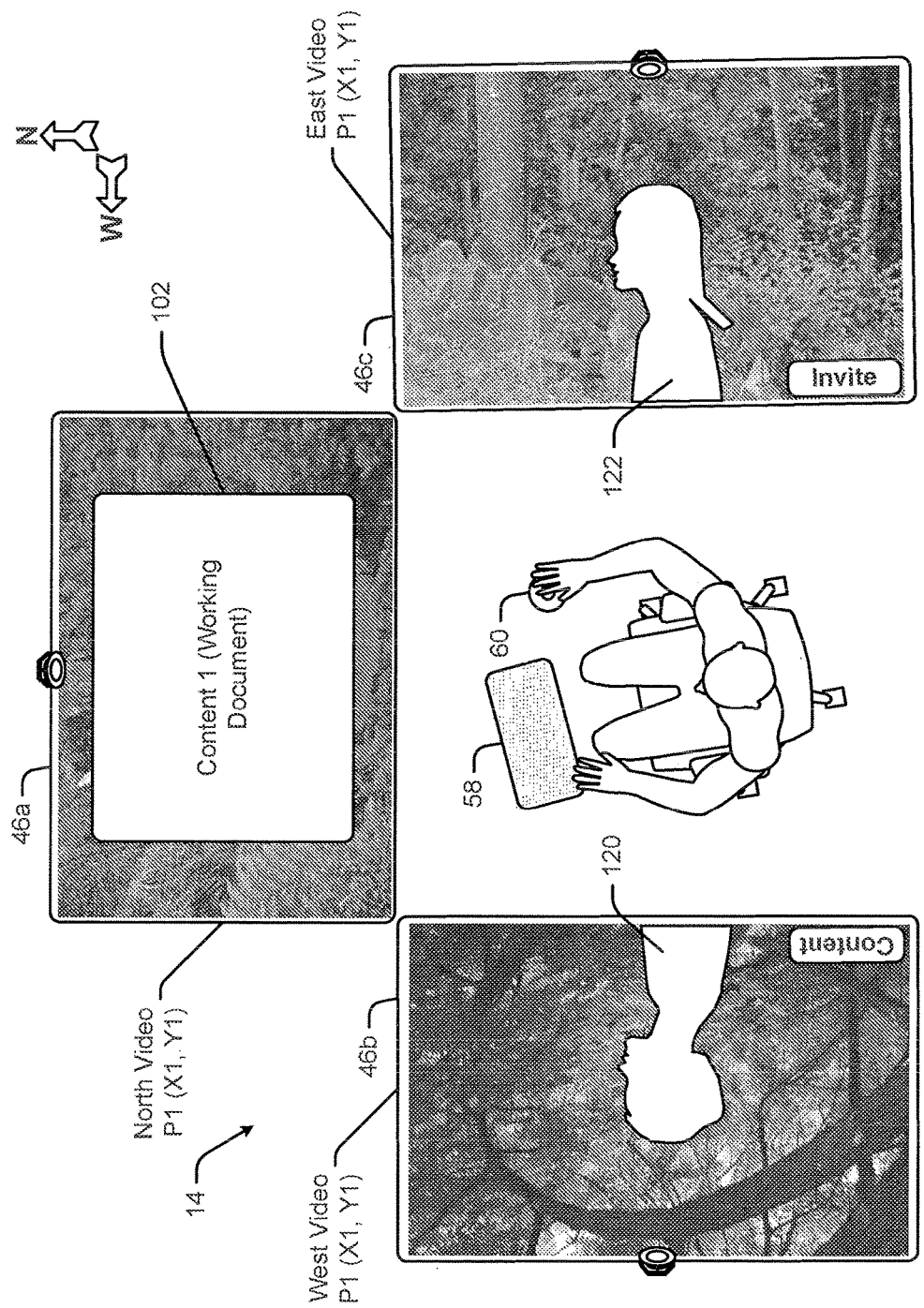
FIG. 14 is similar to FIG. 8, albeit with the statin in another operating state.

In at least some embodiments server 12 may provide the option for a first employee using configuration 14 and a second employee participating in a video conference with the first employee to have the same VW view as well as the same view of content or other presented information in the VW. Here, the second conferee may be represented in the VW to the side of the first conferee as shown at 120 in FIG. 14 where both conferees are looking forward at content within the VW (e.g., at window 102 in configuration 14 and a similar window in the configuration used by the second conferee). In this case, one of the side cameras 48c' in the second configuration 14' (see again FIG. 22) may generate the side video of the second employee to be presented at 120. Similarly, a side camera 48b in configuration 14 would generate a side image of the first employee to present on a side surface 46c' in station 14' so that the first and second employees could each look to the side and make eye contact as necessary.

In the alternative, whenever a first employee conferences with any other employee in the VW, the two employees may be, at least temporarily, moved to a virtual conference space within a VW. Here, the virtual conference space may be "equipped" with virtual affordances configured to increase productivity of the conference such as a specific persistent dynamic background effect, virtual windows for content presentation and/or for presenting employee videoconference representations as well as tools for quickly and intuitively inviting other employees to join the conference. Once a video conference is completed, each attending employee may automatically revert back to their prior VW location and activity.

In at least some embodiments it is contemplated that each station 14, 14', etc., may include additional cameras aimed at an employee at the station from other angles and the server 12 may automatically switch which camera video from one station is used to represent the employee at that station to employees that are using other stations in order to provide even a better sense of common view while still having the ability to make eye-to-eye contact when needed. To this end, see, for instance, FIG. 23 where first and second stations 14 and 14' are again shown that are occupied by first and second employees. Station 14 includes a single additional camera 49a mounted adjacent one side edge of surface 46a to be angled toward the location occupied by the first employee while station 14' includes a similarly mounted camera at 49a' Here, when the first employee at station 14 faces forward to view content on surface 46a, camera 49a obtains an angled front view of the first employee which may be presented on a right side surface 46c' at station 14' as shown at 107'. Similarly, when the second employee at station 14' faces forward to view content on surface 46a', camera 49a' obtains an angled front view of the second employee which may be presented on a right side surface 46c at station 14 as shown at 106'. Here, the angle of camera 49a with respect to the first employee generates an angled front-side view of the first employee and therefore, when representation 107' is presented on surface 46c', the representation 107' is perceived by the second employee at station 14' to be staring more directly at the content window on surface 46a'. A similar effect occurs when representation 106' which is an angled front-side view of the second employee is presented on surface 46c.

Figure 23:
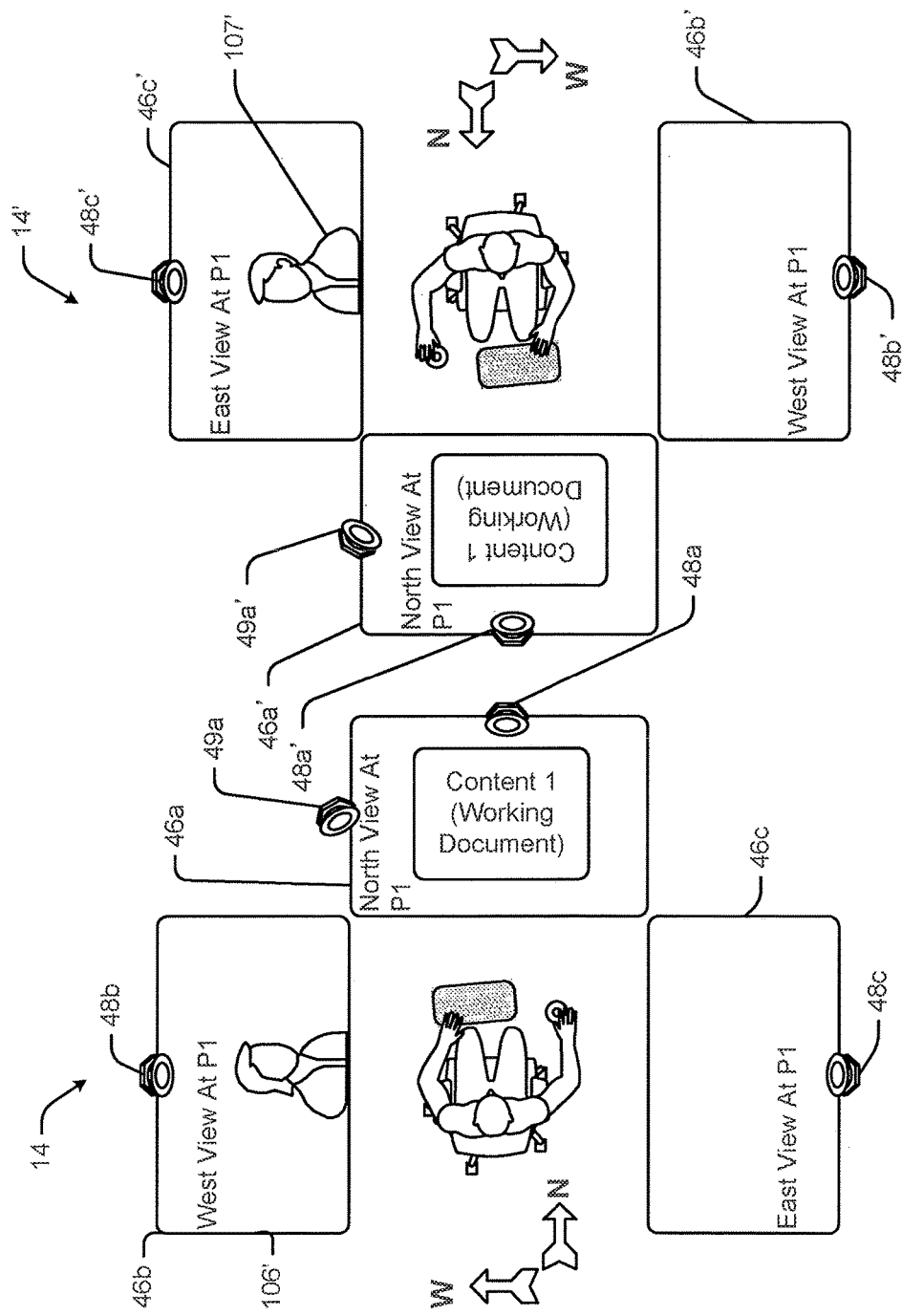
FIG. 23 is similar to FIG., 22, albeit where the first and second employees have the same views of content and the VW they cohabit.

Referring still to FIG. 23, if the first employee at station 14 turns to face the second employee's representation 106' to make eye-to-eye contact, server 12 may be programmed to recognize that the first employee has turned toward representation 106' and may automatically and immediately start using video from camera 48b to drive the representation at 107' so that representation 107' shows the first employee looking directly at the second employee. Here, similarly, if the second employee turns to representation 107' to look directly at the first employee, server 12 may recognize the turn and automatically and immediately start using video from camera 48c' to drive representation 106' at station 14. Changes in the first employee's gaze direction may continue to be sensed and used to drive which camera video 48a or 48b is used to generate representation 107' and changes in the second employee's gaze direction may continue to be sensed and used to drive which camera video 48a' or 48c' is used to generate representation 106' so that the first and second employees have a better sense of being in the same VW and participating in a common session.

In FIG. 23 recognize that the first and second employees are both facing north in the VW and therefore have the same front surface North View at location P1 in the VW. Thus, except for having silhouette type video images of the other employee on side surfaces, the views of the first and second employee in the VW and of content are the same in all VW directions.

Where three or more employees video conference, the third employee may be presented on a side surface opposite the second employee when all employees have the same VW view. For instance, see the third employee represented at 122 in FIG. 14 on the right side surface 46c. Here, again, the system would automatically use side images as appropriate to present the third employee at the first station 14 and the first employee at a third station so that the first and third employees could view each other to the side. Here, the second and third employees would have similar side views of each other so that they too could have sideways eye to eye contact when they look sideways away from the first employee's representation at their respective stations.

Referring specifically to FIG. 13, in at least some embodiments it is contemplated that a first employee at configuration 14 could change the perspective of the second employee by simply rotating the first employee's perspective in the VW. For instance, if the first employee were to rotate his perspective 90 degrees to the right in FIG. 13 so that the west video were to appear on surface 46a, the second user's perspective may also rotate 90 degrees so that she would be viewing the east video on her front surface (e.g., 46a' in FIG. 22) and the side surfaces would be updated accordingly. Similarly, if the first employee at configuration 14 where to move content window 102 from surface 46a to surface 46c, a similar content window presented to the second employee at configuration 14' would move to surface 46b' at station 14'. Similarly, movement of video conference window 102 among surfaces at station 14 would change the second employee's perspective in the VW accordingly.

In still other cases when two or more employees video conference in VWs, each employee may remain in his or her VW and simply view content and video conference windows in any one of the manners described above (e.g., video conference windows head on or employee representations to the side and content windows head on or to the side). Here, movement of windows within one VW may cause similar movement in other VWs used by other employees.

In cases where control icons (e.g., 92 in FIGS., 8, 94, 96 and 98 in FIG. 9, etc.) are presented on station surfaces, in at least some embodiments those icons will not be persistent so that the employee is not bothered by those icons unless some affirmative step occurs. For instance, in some cases the control icons may only be presented upon some request entered via one of the portable wireless devices 58, 60, 198, etc., such as selection of a control button or the like. Here, in some cases after control icons are presented, the icons may automatically fade away after a short time (e.g., 10 seconds) while remaining accessible when needed via the interface devices. In other cases when control icons fade away, one "Control" icon (not illustrated) may remain, perhaps in a ghost format (e.g., partially transparent), to be selected by an employee when control icons are desired.

Figure 15:
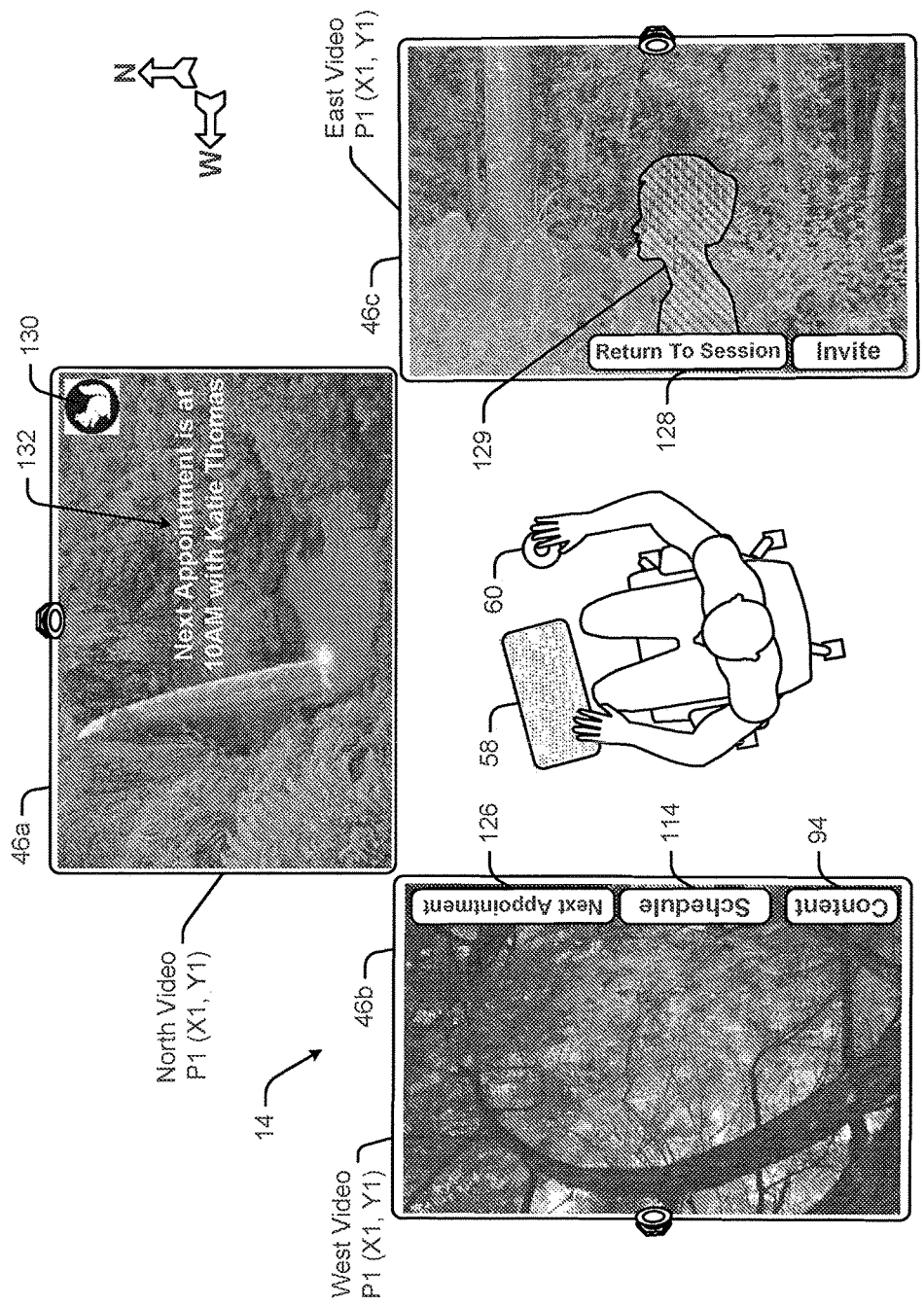
FIG. 15 is similar to FIG. 8, albeit with the statin in another operating state.

In some cases, server 12 may provide subtle messages to an employee is a VW. For instance, when an employee in a VW has an appointment starting in a few minutes, server may automatically present a subtle message to the employee as shown at 132 in FIG. 15. As another instance, if an employee receives an e-mail or other type of electronic message from another employee, server 12 may present some type of message warning such as, for instance, a squirrel icon as shown at 130 in FIG. 15. As yet one other instance, other employee status may be subtly indicated to a first employee in a VW. For instance, if a second employee is within the same instance of a VW as is the first employee but is at a different location, the second employee may be represented via a ghost silhouette as shown at 129 in FIG. 15 with or without specific identifying information for the second employee. Similarly, ghost silhouette's may be presented for employee's of other statuses such as, for instance, other employees available for conferencing but not currently within a VW, employees present in other VWs, employees present in a specific physical location (e.g., a specific enterprise facility, an enterprise campus, etc.), employees present in specific sections of specific VWs, etc.

Because station 14 presents a VW to an employee, the VW may be altered to present notices or warnings by changing the VW itself in some way that is consistent with VW surroundings yet noticeably different than the persistent dynamic background effect that exists at the employee's immediate VW location. For instance, instead of presenting a squirrel icon as at 130 in FIG. 15, a VW engine may cause server 12 to include a virtual monkey in one of the jungle trees on left surface 46c in FIG. 15 to indicate that another employee is looking for the employee at station 14. As another instance, referring again to FIG. 15 where the persistent dynamic background effect includes a waterfall on front surface 46a, as the end of a scheduled rejuvenation activity approaches (e.g., within 5 minutes of the end), the volume of water in the waterfall may become less and may eventually stop just before the end of the activity. As still one other instance, as a rejuvenation activity is ending, a sun may rise to illuminate a VW scene more intensely to simulate a morning scene. Many other changes to the persistent dynamic background effect to indicate different notices, messages and warnings are contemplated. As yet one other instance, if another employee sends an electronic message to the employee at station 14 in FIG. 15, a person on a flat may flat into the pond on surface 46a and flat around for at least a short time to indicate arrival of the message. In all of these cases, the indication of a message or a warning may only persist for a short duration and then disappear if ignored. In other cases, where a warning or notice is ignored, the indication may become more pronounced to make sure that the employee at station 14 takes notice.

While messages, notices and warnings may be presented at any time to an employee in some embodiments, in other embodiments sensors (see 36 in FIG. 1) at a station 14 may be used to detect whether or not an employee at the station is current in some activity flow (e.g., a work flow, a rejuvenation flow, etc.) and, when possible, message delivery may be timed to occur during non-deep flow periods. For instance, to detect when an employee is in a deep work flow and should not be disturbed, one sensor may simply monitor work product (e.g., is a document persistently being developed by the employee) by monitoring edit rates of some content and discerning when production is high or when it drops off. As another instance, one or more sensors may determine physical characteristics of an employee at station 14 such as heart rate, temperature, attention, etc., and estimate a flow state from that type of information. In still other cases images from the stations cameras 48*a* through 48*c* may be examined to detect flow.

As described above, in at least some embodiments it is contemplated that two or more employees may be present at different locations in the same VW instance at the same time. For example, see again the VW 2D representation 32 in FIG. 16 where representations of two other employees are shown at 162 and 164 and where a representation of the employee using a station 14 is shown at P2. While several employees are in the same VW instance, in at least some embodiments, if two employees are not near each other in the VW, they may not have any idea that they are co-inhabiting the VW. Here, to avoid a case where a first employee traveling through a VW encounters the second employee in the VW unexpectedly, the second employee may have the ability to "cloak" her existence in the VW from other employees. Here, for instance, when the second employee cloaks her existence in the VW, server 12 may simply disable travel of other employees through the location of occupied by the second employee. In some cases the VW may be altered for the first employee so that some physical barrier (e.g., a large tree) is included in the VW along a path to the second employee's VW location.

In other cases where a second employee cloaks her existence in a VW from a first employee, if the first employee travels to the location of the second employee, server 12 may simply provide a virtual patch in the VW that allows the first employee to travel through the space of the second employee without noticing the second employee's presence.

In some cases, server 12 may always indicate to each employee in a VW instance when others are present in the same instance even when the employees are not near each other or are cloaked to be hidden. To this end, see FIG. 17 where a tablet type interface device 198 is shown that includes a screen shot 193 that shows a 2D top plan view representation of a 3D VW in a simplified form. A current station 14 user's VW location is shown by an employee icon 179 at P5 where the arrow in icon 179 indicates that the employee is currently facing east in the VW. Two other employee locations are indicated by thumbnail images of those employees at 162*a* and 164*a* to indicate that those employees are present at those VW locations. A "Do Not Disturb" label 174 is presented along with employee indicator 162*a* to indicate that that employee does not want to be disturbed or, in some cases, that that employee cannot be disturbed or even is cloaked at that location so that the employee will not be found at the location even though she is there. Employee indicator 164*a* does not have a label akin to label 174 and therefore is available and could be found or at least contacted within the VW.

In at least some embodiments, referring still to FIG. 17, if a first employee associated with icon 179 wants to contact a second employee in the VW, the first employee may simply select the icon associated with the second employee via interface 198. In some cases selecting icon 164*a* may only allow one type of contact such as, for instance, an instant message to be generated. In other cases various contact types may be available and presented via a pull down menu. Exemplary contact types may including messaging of several types, video conferencing within the VW as described above, the ability to patch into scheduling software to schedule a VW conference or a real world conference at a later time, etc.

Double tapping on employee icon 164*a* may automatically send a VW conference request to that employee which, if accepted, may automatically bring the first and second employees together in the VW for a conference as described above. Here, the first employee's VW location may be changed to the second employee's VW location for the conference, the second employee's VW location may be changed to the first employee's VW location or both employees may be ported to a specially afforded conference location within the VW as described above, at least temporarily, to facilitate the conference.

In some cases the employee associated with icon 179 may touch and drag that icon to the location of a non-cloaked or otherwise available second employee as indicated at 164*a* to travel in the VW the second that employee's location to commence an on the fly video conference at that VW location. When a first employee commences VW travel to the location of a second employee, server 12 may give notice to the second employee that the first employee is on her way. In a similar fashion, the first employee may invite the second employee to the first employee's VW location by touching the second employee icon 164*a* and dragging that icon to the location of the first employee at P5. If the invite is accepted, the second employee would commence traveling in the VW to location P5 for the conference.

Similarly, in at least some cases, it is contemplated that the first employee associated with icon P5 may move to any VW location that is not cloaked or blocked in some fashion by simply selecting or otherwise indicating a target location via interface 198. To help the employee navigate the 3D VW, content associated with specific VW locations may be indicated in representation 193. For instance, in FIG. 17, content 1 and content 2 are indicated at 160*a* and 170, respectively. Here, by touching on a content icon, an employee can see a thumbnail of that content as shown at 176 and 178 where basic information about that content is presented. Although not shown, the basic information may include a title, a date when the content was generated or associated with the specific VW location, employees that developed the content, etc. As indicated by hand icon 180, an employee can select his representative icon 179 and drag that icon to a content representation 160*a* to move or travel to the location P1 of that content in the VW. Although not shown, the employee at station 14 may touch and drag icon 179 to any other non-blocked location in the VW to move to that location.

Whenever an employee selects a location on a 2D VW representation to move to or is moved to some location automatically for some reason (e.g., the employee is being ported to a conference space temporarily to participate in a conference or from a conference space back to a prior space at the end of a conference), server 12 may be capable of moving that employee through the VW in several different ways. First, the employee may simply be immediately moved to the selected VW location. Here, while the employee would move quickly to the selected location, there would typically be a large discontinuity in the VW perceived by the employee which may not be desirable.

Second, the server may facilitate an autopilot type travel through the VW from an initial location to the selected location. In this case the employee's VW views would change smoothly but continuously as the employee travels through the VW and travel could take several minutes, depending on how large the VW is and the relative locations of the initial and target VW positions.

Third, the server may simply generate a VW patch or bridge to take the employee from an initial VW location to the target VW location so that the VW views have some type of continuity without requiring the long travel time between the actual VW locations.

In still other cases when an employee is at a first VW location and is experiencing a first persistent dynamic background effect when she selects a different discontinuous VW location to travel to, prior to commencing the VW travel, the server may modify the first persistent dynamic background effect to help the employee change mind state prior to travel to the target VW location. For instance, if a first employee is in the middle of a rejuvenation session when a conferencing request from a second employee is accepted, the server may automatically commence a 5 minute VW rejuvenation ending sequence prior to a 3 minute VW travel sequence to optimally affect the first employee's mind state prior to the conferencing session. In this case, upon accepting the invite, server 12 would send an accept notice to the second requesting employee that the first employee will "arrive" in the VW for the session in 8 minutes.

Referring again to FIG. 17, in some cases when an employee selects a target VW location to travel in the VW, server 12 may present movement options in a window 186 including, for example, "Hike" and "Skip" options as indicated at 188 and 190, respectively. Here, the hike option causes server 12 to present a full travel experience where the employee moves from the initial to the target location through a complete VW path without any short cuts while the skip option causes server 12 to either skip immediately to the target location or to generate a quick travel patch or bridge from the initial location to the target location.

In still other cases when an employee selects a VW location different than a current location, the system may present a fly over type experience wherein the employee views scenes that simulate the employee moving upward from an existing location and a 3D ariel view of the VW as the employee "flies" to the selected or target location. Once over the target location, the scenes may simulate a landing at the target location at which point location and orientation views at ground level would again be presented via the surface assemblies.

Referring yet again to FIG. 17, other employees that are currently in other VWs controlled by server 12 are indicated in field 192 via employee image icons. Here, in at least some cases the employee associated with icon 179 may interact with any one of the other VW employee icons in field 192 to perform functions similar to the functions described above with respect to icon 164a. Thus, for instance, a double tap on employee icon 197 may cause a conference invite to be sent to the employee associated with icon 197. If the invite is accepted, either the inviting or the invited employee may travel to the other's VW location, at least temporarily, for the conference or both may travel to some conferencing location in one of their VWs or some other VW reserved for conferencing activities.

Figure 18:
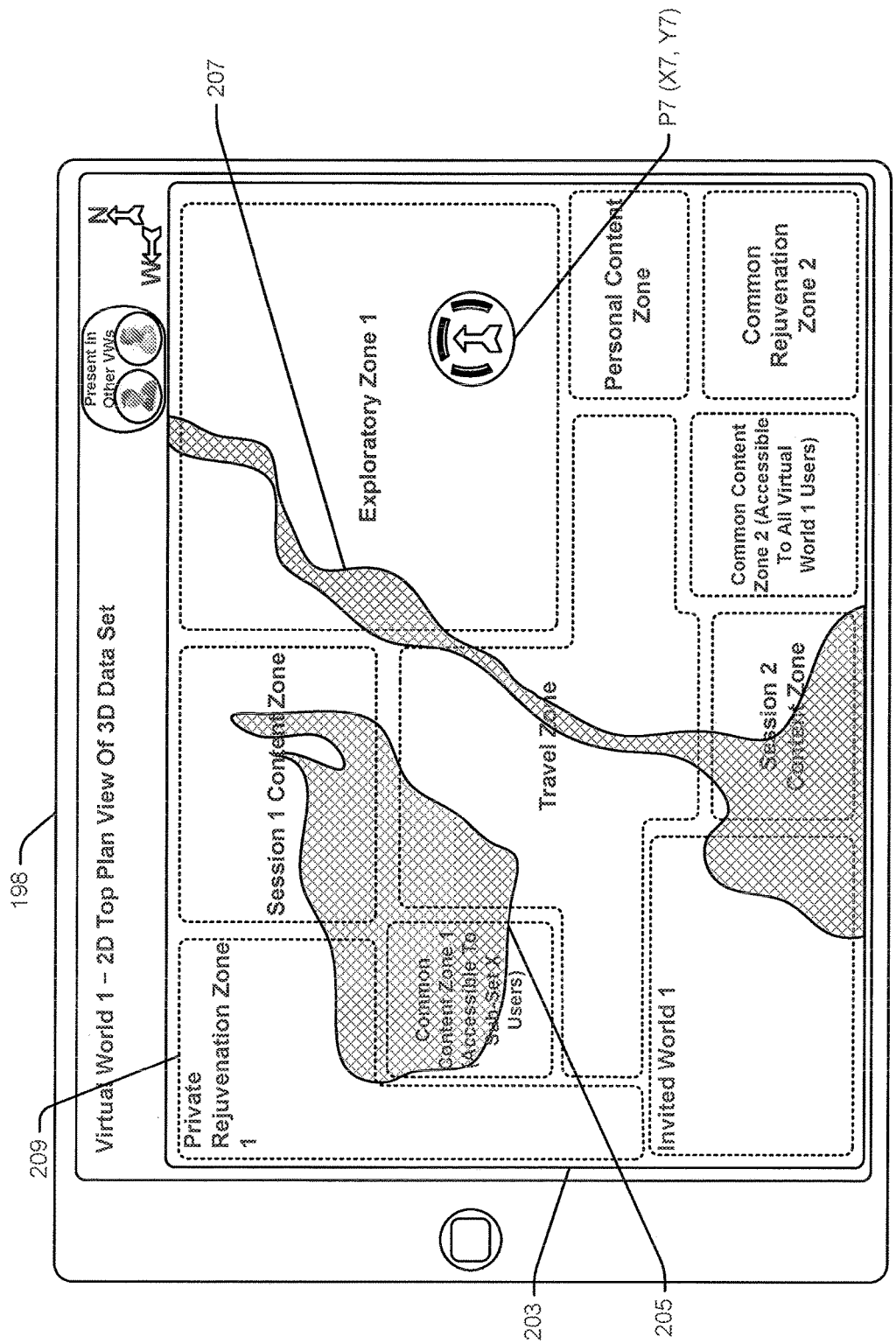
FIG. 18 is similar to FIG. 17, albeit showing different VW zones in the VW presented via the interface device.

While the screen shot representation 193 is shown without any topological detail (e.g., hills, trees, bodies of water, cliffs, rocks, etc.), in most embodiments the 2D representation will include at least some topological detail to help orient an employee to the VW they are experiencing. Thus, for instance, in some cases the top plan 2D view may include an actual top plan image of a VW while in other cases the 2D view may be cartoonish in nature to more clearly show different areas of the VW for selection purposes. In FIG. 18, a screen shot 203 akin to screen shot 193 in FIG. 17 is shown that includes a top plan 2D view including exemplary representations of a pond at 205 and a river at 207.

It has been recognized that many advantages can be obtained from dividing a VW into different zones and ascribing different rules for use of the different zones. For instance, in a simple example, a VW may be divided into two different zones including a rejuvenation zone and a content or work product development zone. In this case the rejuvenation zone would be reserved for and potentially specially afforded for rejuvenation activities while the content development zone would be reserved for and potentially specially afforded for content generation activities. As another instance, a first zone may be for content generation activities related to work and a second zone may be for personal activities including rejuvenation and personal content development or access. As yet one other instance, a first zone may be only for individual activities while a second zone is provided for any type of activities including personal individual or common activities where multiple employees participate. Many other zone types reserved and/or afforded for specific activity types are contemplated. For instance, in addition to private rejuvenation, content development, and personal or private zones, other zones may include session content zones where content related to only a single session is accessible or generated, exploratory zones where any employee can travel to try out new environments and seek preferred or new background effects, common rejuvenation zones where multiple employees can travel at the same time, travel areas that are simply provided for traveling among different VW zones, common content areas where any employee can post and/or access content placed there by any other employee, common content areas that are restricted to only a subset of VW using employees (e.g., employees on a specific project team or some other employee subset), etc.

In at least some cases VWs may come with predefined zones that are restricted or afforded in special ways. To this end, see again FIG. 18 where different zones are shown in phantom and are labelled to indicate different zone types. Again, an employee icon 179 is shown at P7 located in an exploratory area. Here, it is contemplated that the employee associated with icon 179 can move to any location in any of the zones but that other employees in the VW would be restricted. In addition, content presented or accessible or development may be limited in many of the zones based on zone restrictions (e.g., the private rejuvenation zone 209 in the upper left corner of the VW may not allow content development or access to at least certain types of digital content (e.g., work related content).

In some cases, while two VW zones may be immediately adjacent each other, there may only be certain paths between the two zones so that an employee traveling there between needs to follow a path to pass between the zones. To this end, see the top plan 2D VW representation in FIG. 19 at 32 where multiple different zones are shown and labelled and where arrows indicate restrictive travel paths between the zones. Double headed arrows (e.g., 230) indicate two way paths meaning that an en employee can travel in either direction between two zones while a single headed arrow (e.g., 228) indicates one way travel. In at least some cases there may be no ability to travel directly between two adjacent zones. Thus, for instance, see that there is no direct path between zones 218 and 224.

Figure 19:
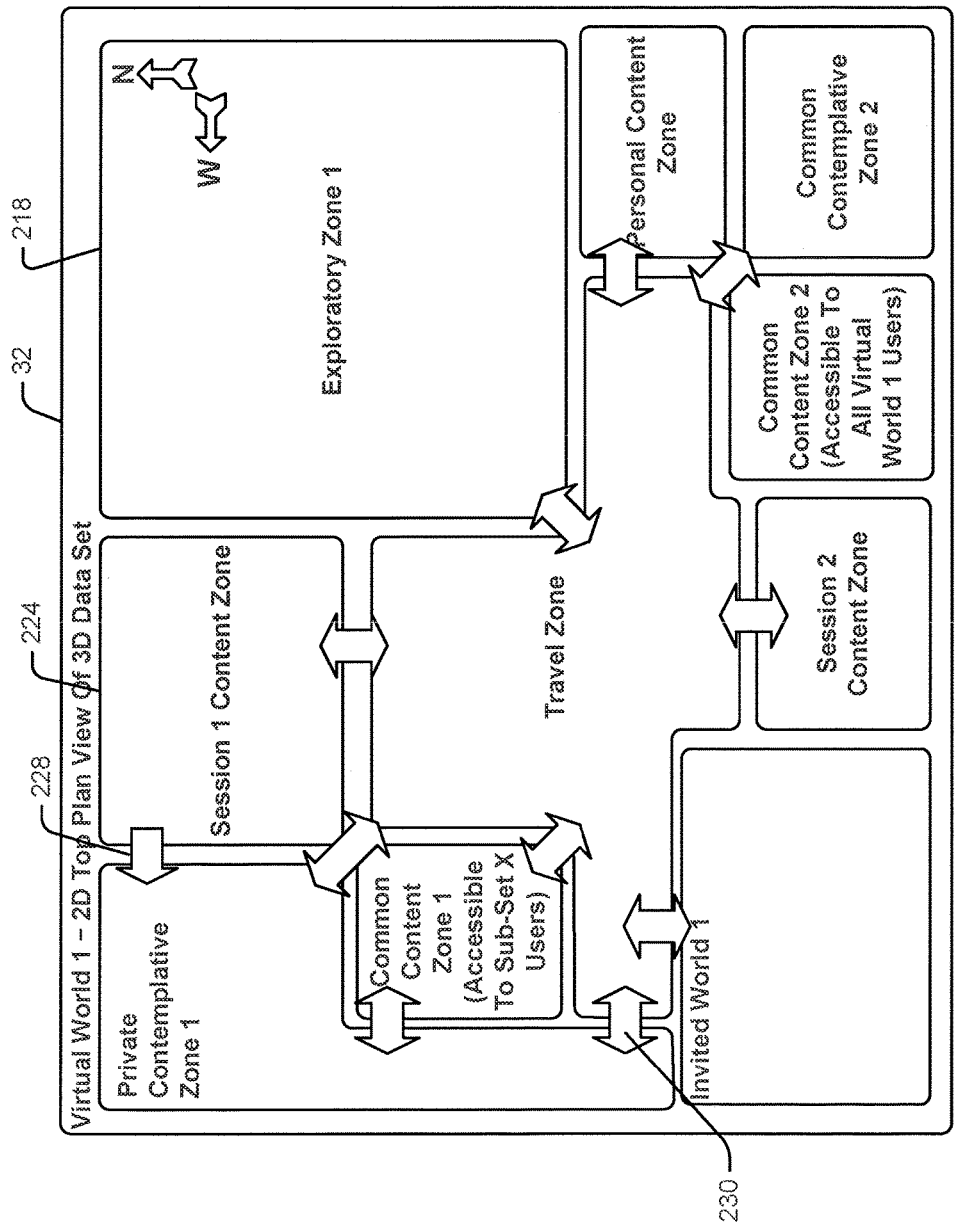
FIG. 19 is similar to FIG. 7, albeit showing VW zones and paths between those zones in a 3D data set.
Figure 20:
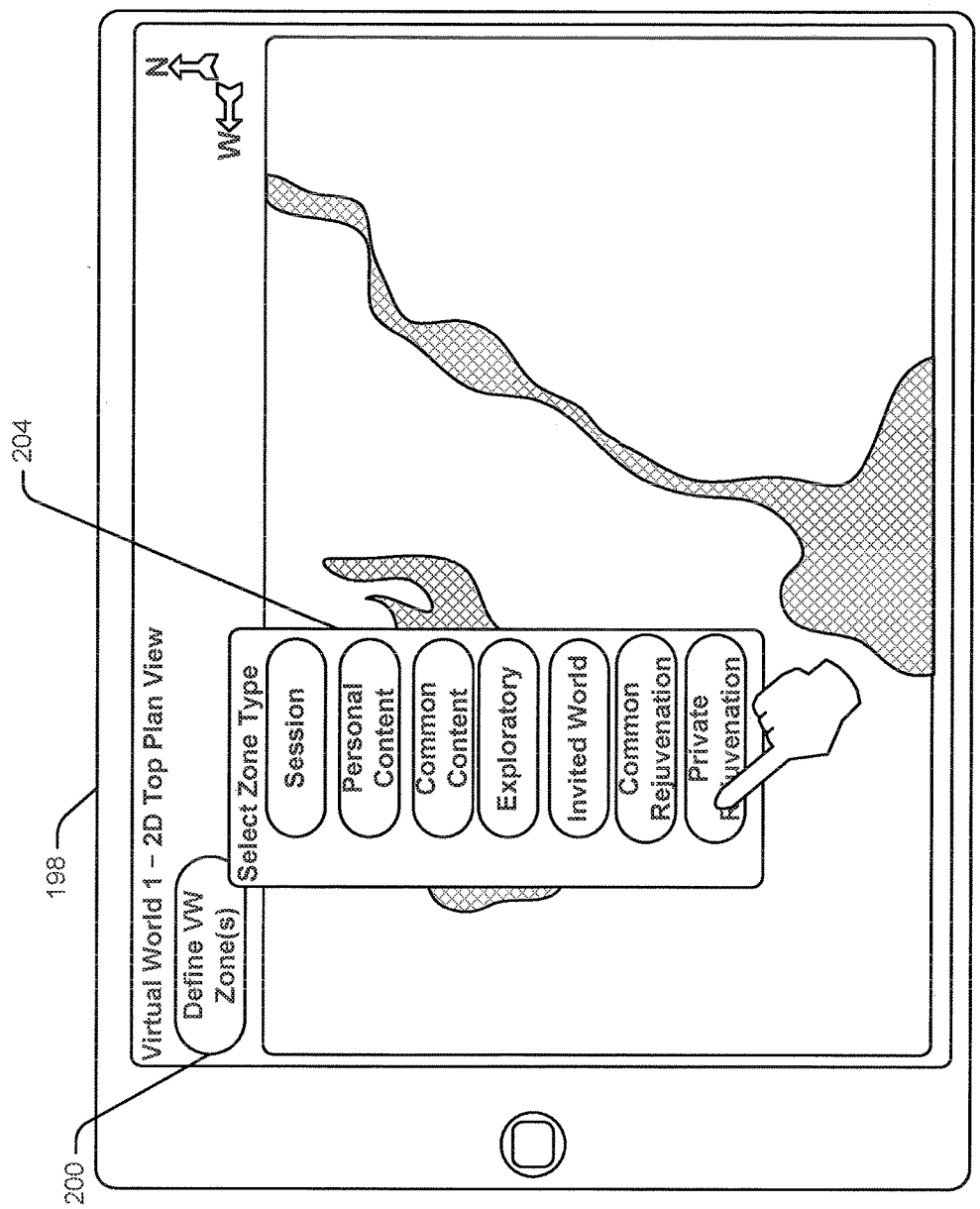
FIG. 20 is similar to FIG. 17, albeit showing zone specifying tools that may be used to specify a personalized set of zones within a VW.
Figure 21:
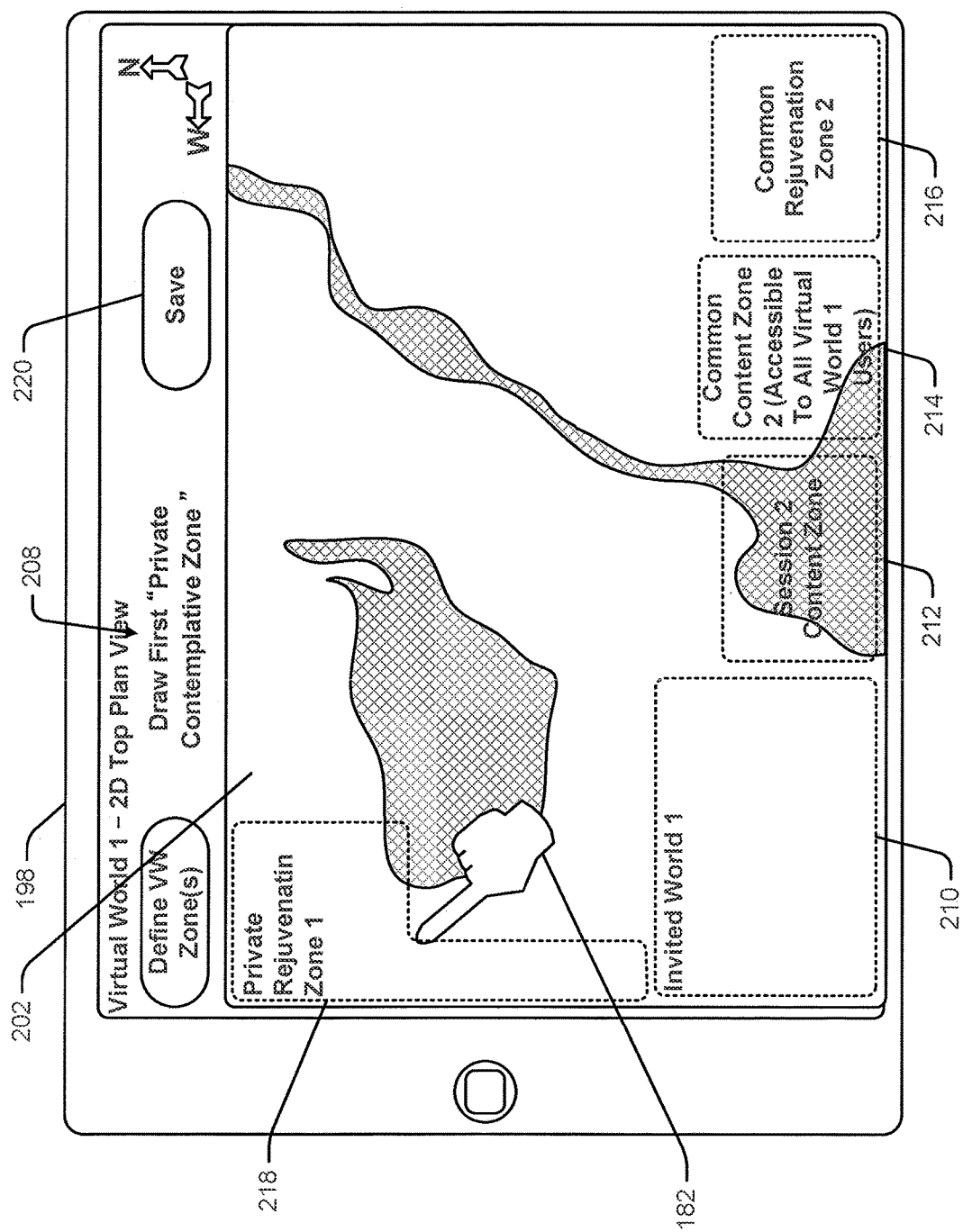
FIG. 21 shows an employee defining personalized VW zones using a tablet interface device.

In at least some embodiments the VW engines will allow at least some customization of VW characteristics. For instance, in at least some cases an employee will be able to specify preferred zones and zone characteristics and limitations. To this end, see again FIG. 17 that includes a "Define VW Zone(s)" icon 200 that is selectable to define or modify existing VW zones to fit an employee's preferences. When icon 200 is selected, a pull down menu 204 as in FIG. 20 may open up to allow the employee to select one of several different zone types. Once a zone type is selected, referring to FIG. 21, the employee may be able to touch the interface screen in the VW representation and select a area thereof to define a zone. Here, instructions 208 may be presented to guide the employee in defining zones. Once all desired zones have been defined, a "Save" icon 220 is selected to save the employee's zone preferences. While not shown, other tools for specifying specific zone restrictions or limitations are contemplated as are tools for defining paths between adjacent zones as shown in FIG. 19. Other customization may include where content is posted in zones, arrangement of content at specific locations, modification of a VW by adding topological features, etc. All customized parameters are added to database 24 for persistent storage.

Figure 24:
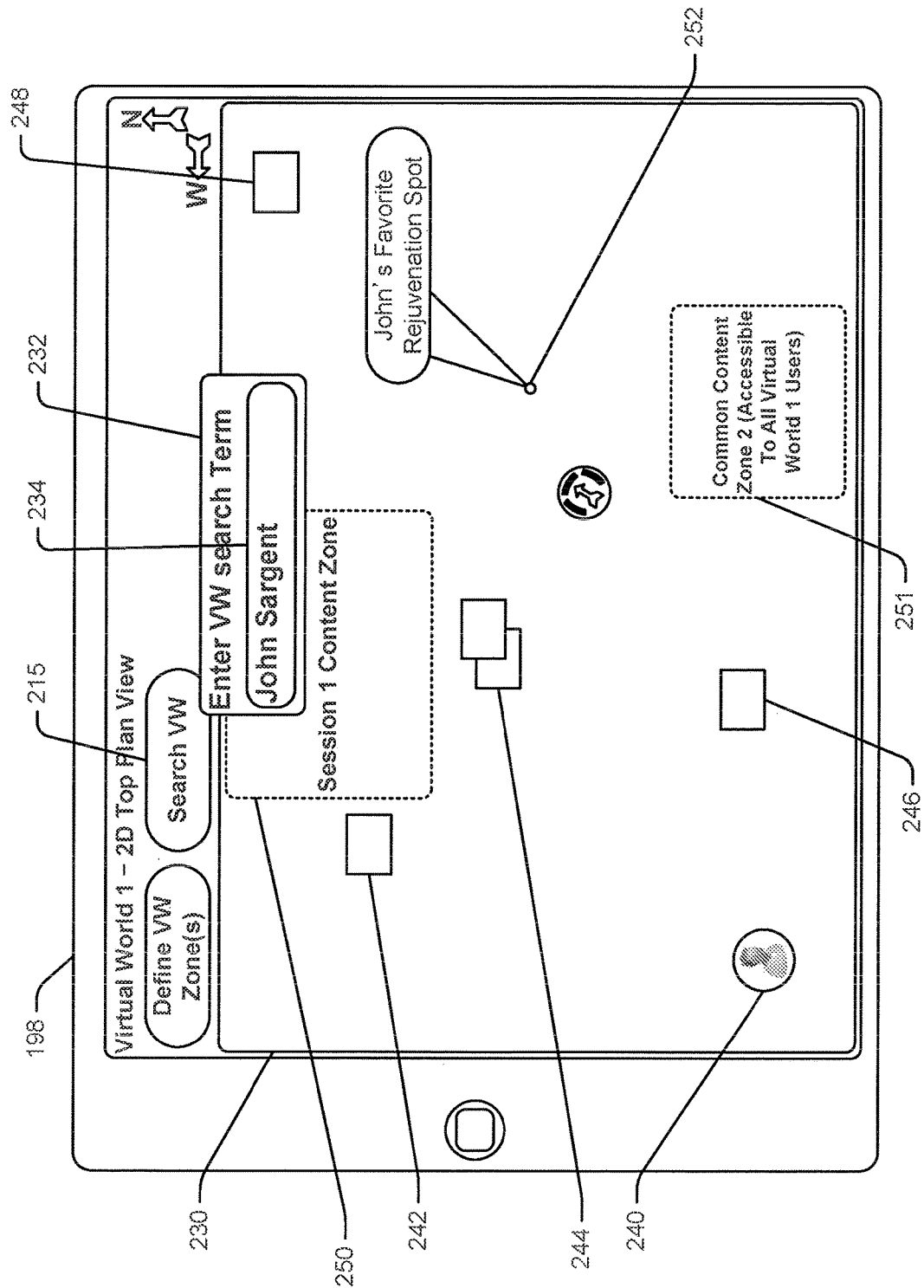
FIG. 24 is a tablet interface illustration that shows a VW searching tool that may be used to VW aspects associated with a search query.

In at least some cases VW search tools may be accessed by an employee to locate various resources including specific other employees, content, previously labelled locations, VW locations having specific persistent dynamic background effects, etc. To this end, see again FIG. 17 that includes a "Search VW" icon 215 selectable to open the search window 232 in FIG. 24 where an employee can enter a search term or phrase and cause server 12 to search the VW for information related to the search query. In the illustrated example, the search query includes an employee's name "John Sargent". In response to the query, server 12 renders a new screen shot 230 that includes John's current VW location at 240 via an image icon. In addition, server 12 locates any content that is publically accessible or at least accessible by the employee that issued the query as indicated at 242, 244, 256 and 248. Moreover, server 12 may identify one or more zones 250, 251 in which John is somehow related to (e.g., John may have posted information in each of the indicated zones). Furthermore, server 12 may identify some other posting by John like an earmarked favorite rejuvenation spot in the VW as indicated at 252 with a textual label. Many other locations and content associated with John may be indicated via screen shot 230.

Figure 25:
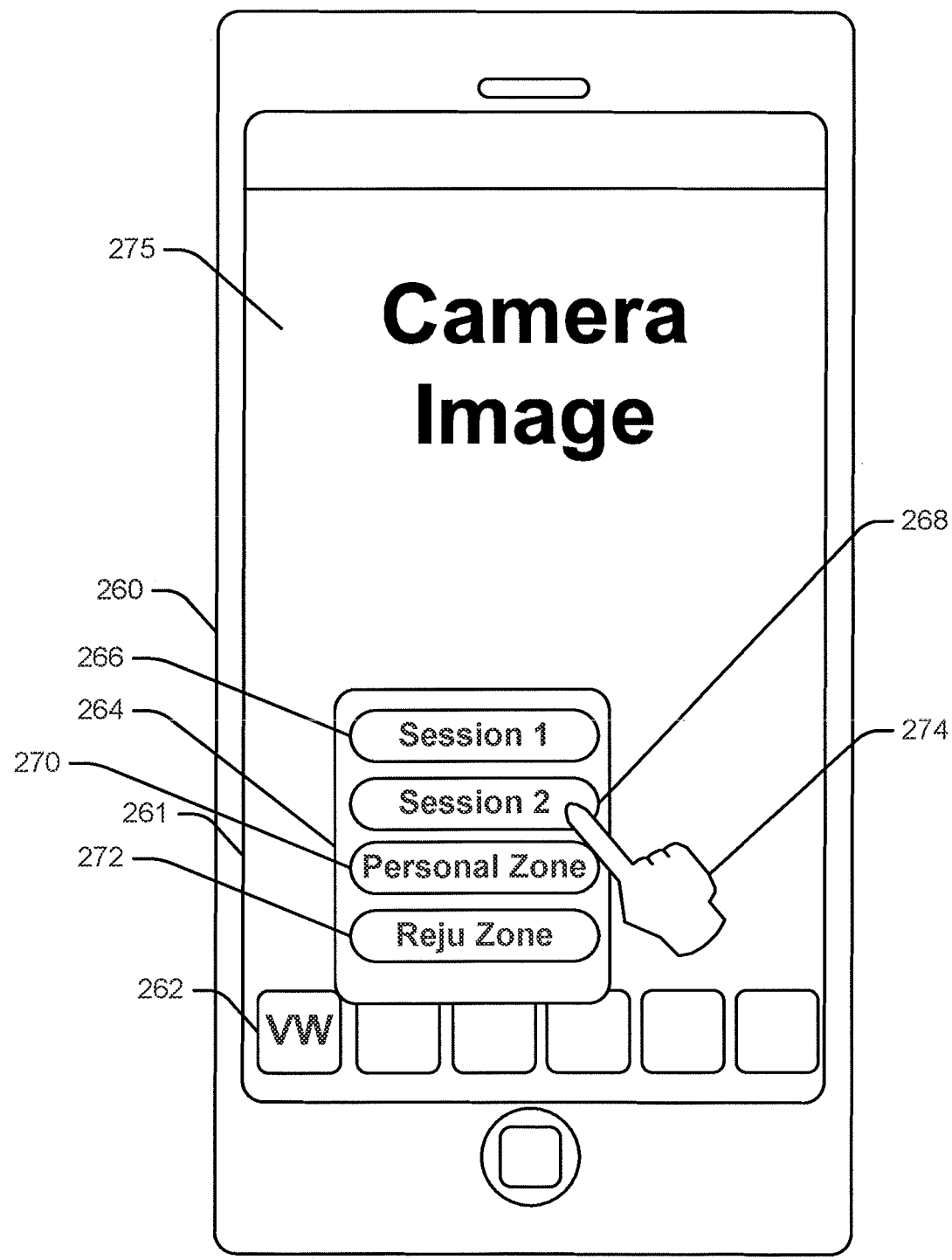
FIG. 25 is an image of a smart phone device useable to post content to specific locations within a VW for subsequent access.

In at least some embodiments it is contemplated that an employee may be able to use many different types of computing devices to post content to specific locations or zones within a VW for subsequent access when the employee re-enters the VW. For instance, see FIG. 25 where a portable smart phone is shown at 260 that includes a touch sensitive display screen 261. In the illustrated example a VW icon corresponding to a VW application loaded onto device 260 is shown at 262. Here, with content like a camera image 275 present on screen 261, an employee can select icon 262 to open a VW target window 264 that includes various VW target locations to receive the content presented on screen 261. The exemplary VW target locations may be standardized on and, in some cases may be automatically customized based on an employee's customized VW. Thus, for instance, where an employee has specified a personalized set of VW zones as described above, each zone that can receive content may be included in window 264. Similarly, where an employee has specified first and second different project or session zones, a separate target location for each of those zones may be presented in window 264. Exemplary target locations in FIG. 25 include a session 1 target 266, a session 2 target 268, a personal zone 270 and a rejuvenation zone 272. Many other options for the target list are contemplated. Other computing devices may be used like the phone device shown in FIG. 25 to post content to a VW.

Figure 26:
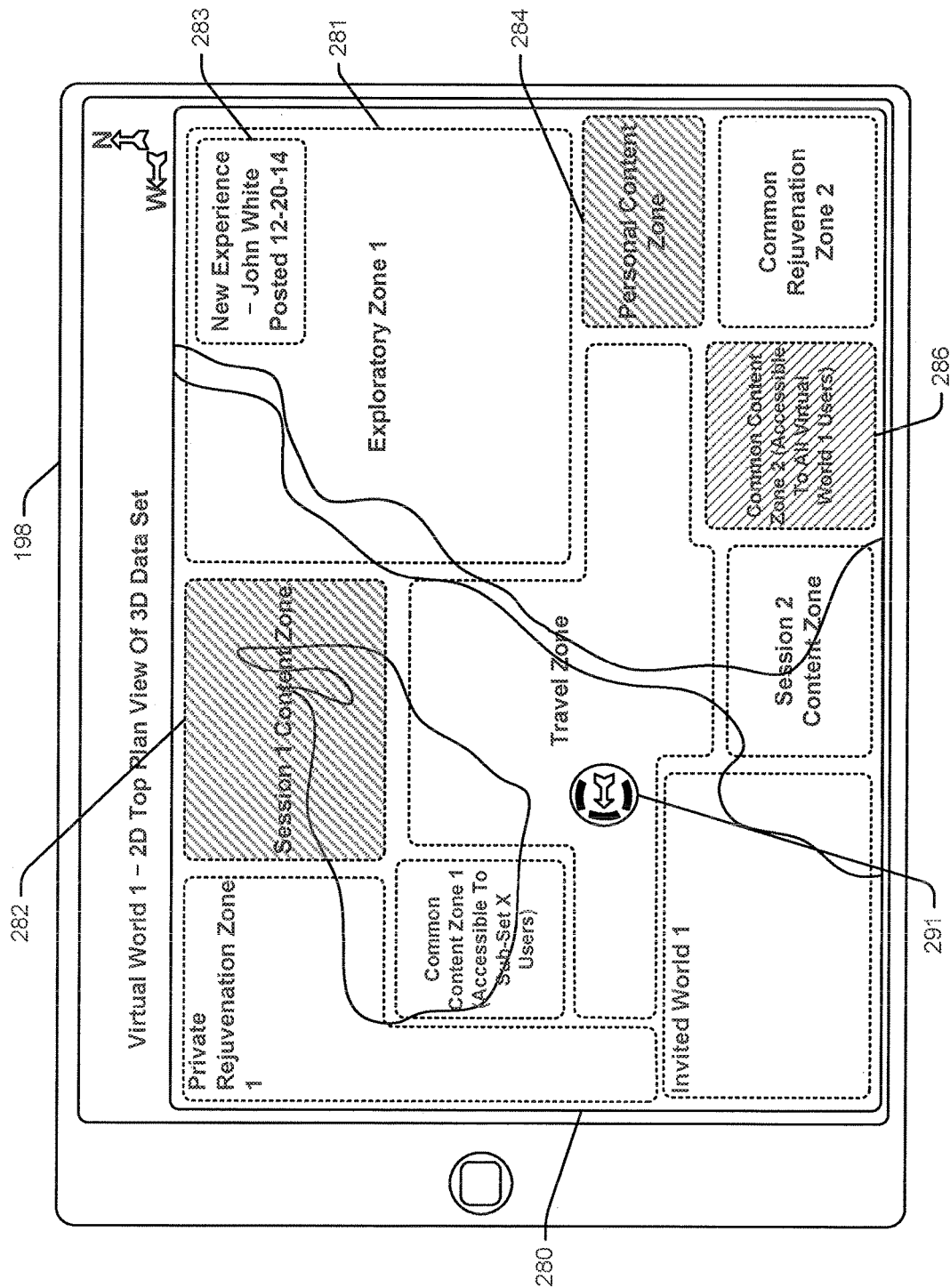
FIG. 26 is a tablet interface view similar to FIG. 24 where zones including newly posted content or information are highlighted.

If an employee enters a VW after posting new content to some VW location, a reminder that there is new content associated with specific VW locations may be presented to the employee. To this end, see, for instance, FIG. 26 where another top plan 2D screen shot 280 is shown with different VW zones shown in phantom. Zones 282 and 284 are shown left up to right cross hatched to indicate that the employee using device 198 posted content to those zones since the last time she was in the VW. Zone 286 is left down to right cross hatched to indicate that some other employee posted new content to that common content zone since the last time the employee using device 198 was in the VW. Here, in some cases to access the newly posted content, the employee would travel to the highlighted zone to see the content therein. In other cases the system may enable a hover over feature wherein the employee could simply touch a zone to open up a preview of the newly posted content via device 198 or to open up a preview window via one of the station 14 surfaces 46a, 46b or 46c (see again FIG. 8).

In some embodiments a newly posted content queue may simply be provided or accessible to an employee upon entering a VW for reconsideration. Here, the employee may choose to do nothing with the newly posted content or may move to a VW location of choice and post any or all newly posted content in the queue at the VW location.

In some embodiments an employee may be able to "pack up" content accessed at a specific VW location and move that content to some other VW location to be re-accessed at the new location. For instance, see again FIG. 10 where two different content sets (e.g., Content 1 and Content 2) are presented at a specific P1 location. A "Pack Up" icon 290 is presented on surface 46c which is selectable to pack up the presented content 1 and content 2 to be moved to a different VW location. By packing up the content, the employee has a clearer view of the VW around herself while steering from an initial location to a target location. Once at the target location, the employee can unpack the content to bring the content back up in the same relative surface juxtapositions to continue her activities in the new VW location.

Figure 27:
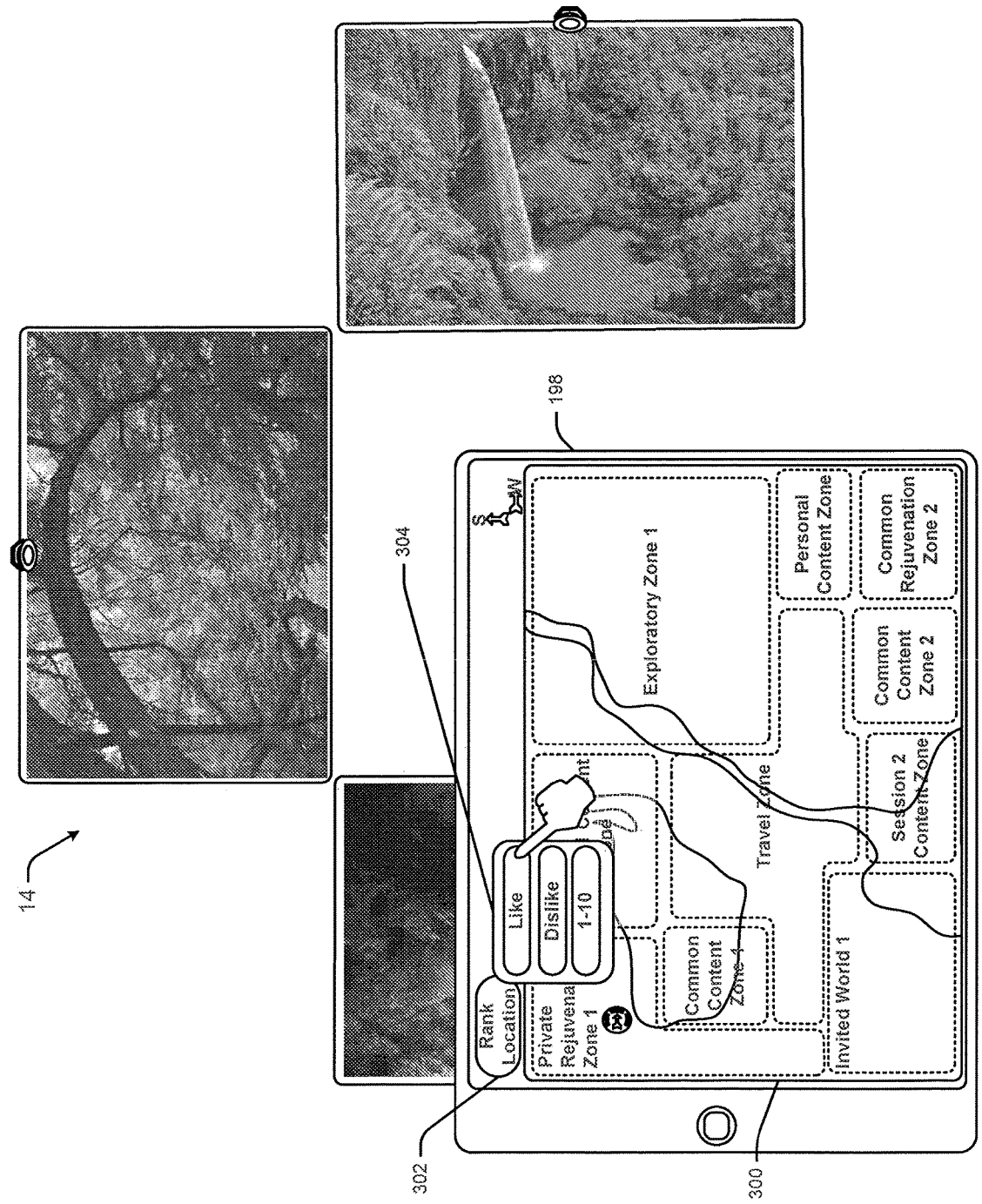
FIG. 27 is a schematic showing a rating tool for VW locations presented on a tablet type interface device.

In at least some embodiments it is contemplated that a system will enable employees to rate different locations for different purposes or activities within a VW for their own purposes and also as a feedforward mechanism for other employees to consider when seeking their own preferred VW locations for different activities. To this end, see FIG. 27 where a tablet interface device 198 shows a screen shot 300 including a "Rank Location" icon 302 selectable to open a ranking window 304 with various location ranking options. Here, an employee's space ranking may be general and binary or may be very specific and have many different gradations. For instance, rank options may simply include "like" or "dislike" or may allow an employee to specify an activity and a rank between 1 and 10 to provide more useful information. Once VW locations are ranked, that information may be presented to other employees seeking VW locations having specific characteristics or for specific activity types.

In addition to the VW location ranking capabilities described above, in some embodiments an employee may be able to perform experience ranking. For instance, an employee may be able to specify a specific rejuvenation sequence at a specific VW location such as, a 30 minute sequence that simulates the sun going down in the first 3 minutes and rising in the last 3 minutes with a relatively dark VW environment there between. Here, the system may allow an employee to rank the sequential experience for subsequent use by that employee or others. Thus, here, if a second employee is seeking a useful rejuvenation sequence and most other employees have already highly ranked one sequence at a specific VW location, the second employee may select the same sequence to experiment during a next rejuvenation period.

Figure 28:
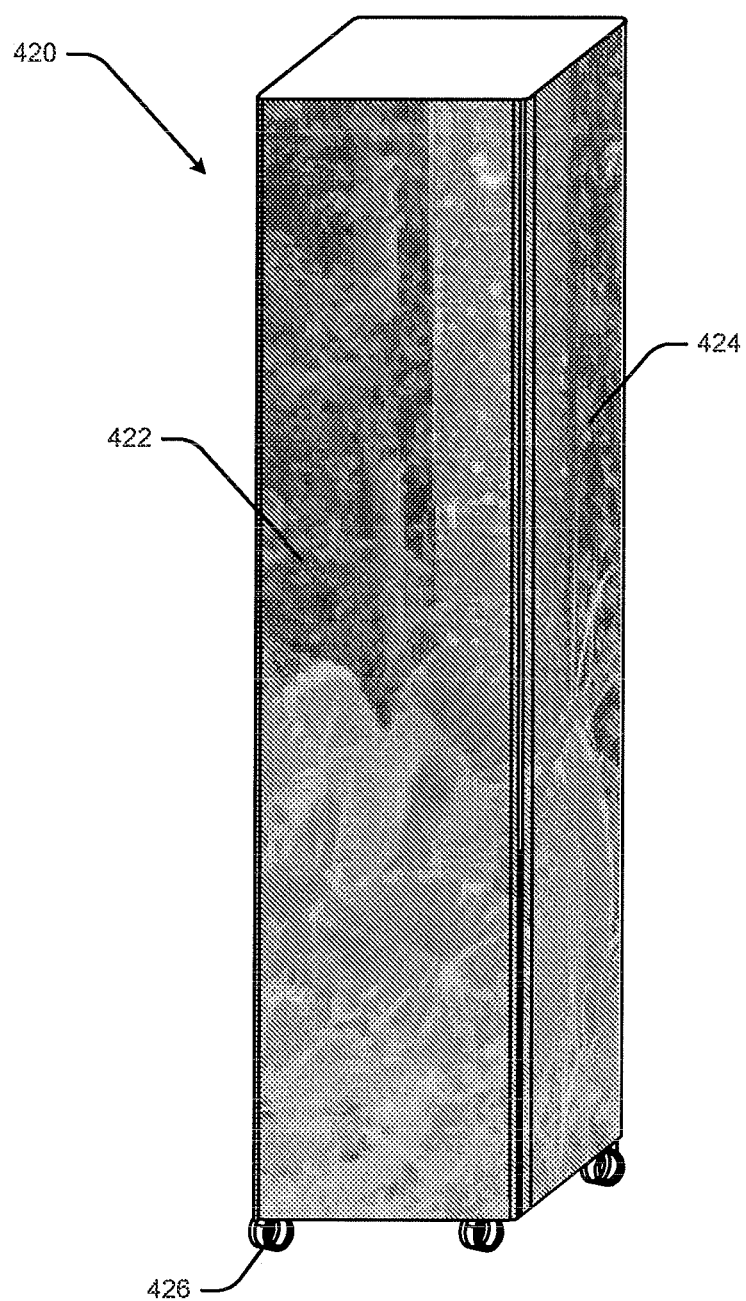
FIG. 28 is a perspective view of a square totem emissive surface assembly that is consistent with at least some aspects of the present disclosure.
Figure 29:
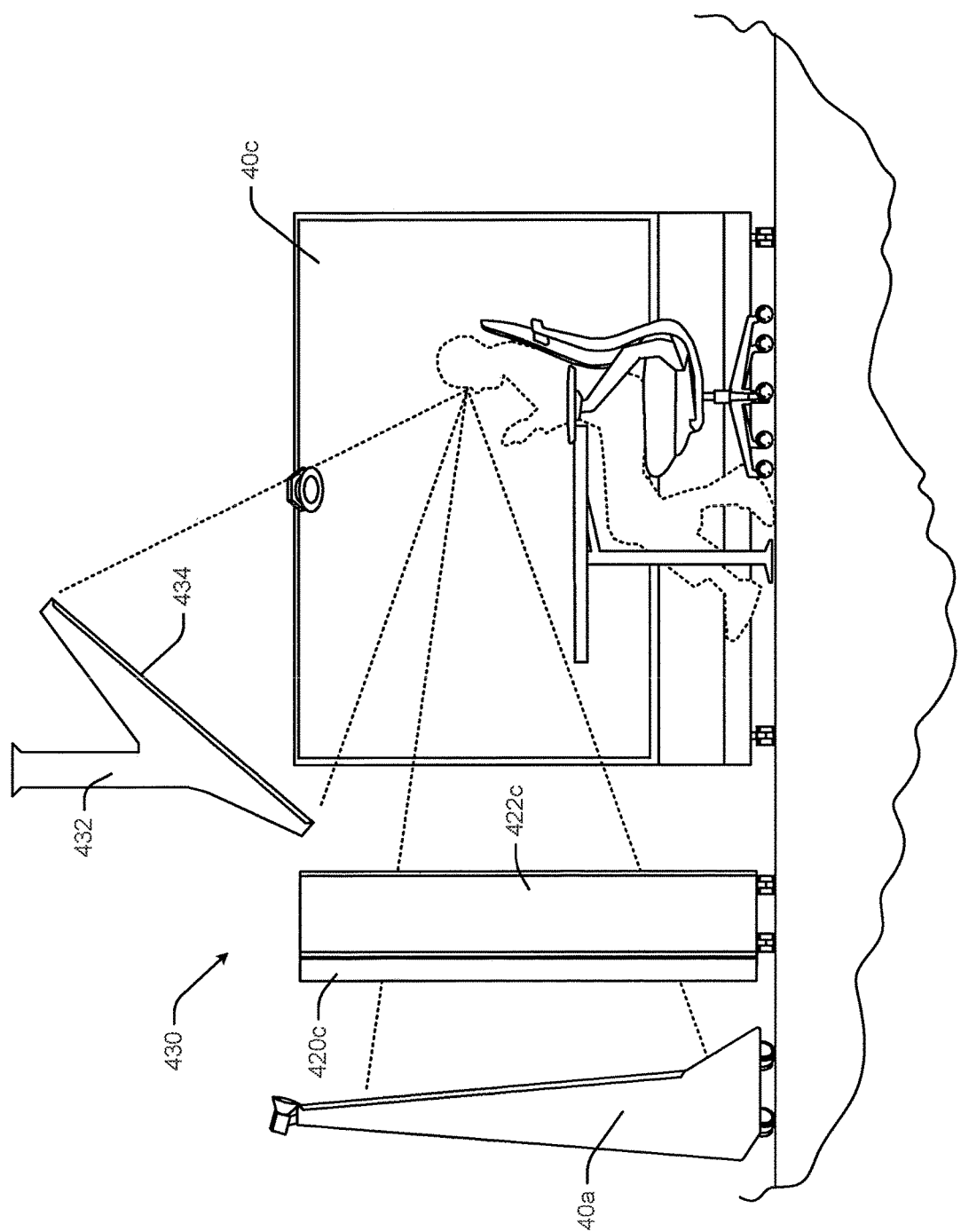
FIG. 29 is a schematic showing another station configuration including, among other surface assemblies, a ceiling mounted assembly.

Other emissive surface assemblies may be added to a VW station in order to further enhance the VW experience. One other exemplary assembly 420 is shown in FIG. 28 and includes a tall four sided totem on casters 426 where each of four rectangular side surfaces is substantially entirely emissive. See also and again FIG. 3 where three instances 420a, 420b and 420c of the totem 420 are shown in top plan view arranges in the open space FOVs between other assemblies 40a, 40b and 40c. See also FIG. 29 where totem 422c is shown in a gap between assemblies 40a and 40c. Here, each totem 420a, 420b and 420c provides additional pixels via at least one totem surface (e.g., 422a, 422b and 422c) that faces the employee's real world location that can present other views into a VW to at least partially fill in the open space FOVs described earlier. Again, an employee's brain operates to stitch together the different views into the VW. In FIG. 3 the additional emissive surfaces provided by the totems help to stitch the VW together. As illustrated in FIG. 3, two or more of the totems 420a and 420b may be located immediately adjacent each other and the VW view presented thereby may be substantially completely contiguous. Referring again to FIG. 28, where two of the emissive surfaces (e.g., 422 and 424) can be seen by an employee at one time (e.g., the employee is not directly aligned with one of the emissive surfaces), a VW view may wrap around the two surfaces 422 to provide at least somewhat of a 3D effect.

As another example, one or more additional emissive surfaces may be suspended above an employee to provide an upper VW view that, in combination with other views, increases the sense of immersion. To this end see again FIG. 29 where a ceiling mounted emissive surface assembly 432 is shown suspended above an employee's VW station 430. Assembly 432 provides a large emissive surface 434 that faces the employee's real world location. Again, a view into the VW that is consistent with the employee's immediate point of view at an instantaneous VW location would be presented via surface 434.

While station 14 described above includes three display assemblies 40a, 40b and 40c arranged about an employee location, other display or emissive surface configurations are contemplated that should also be able to provide an immersive effect to influence employee mind state in a fashion similar to that described above. To this end, one other useful emissive surface configuration includes the cylindrical or circular configuration or assembly 320 shown in top plan view in FIG. 30. Assembly 320 includes a cylindrical structure or wall member 322 that forms a cylindrical internal emissive surface 324 about an employee emersion location as shown. Assembly 320 may include a door member 326 to allow the employee to enter and exit station 320. In some cases the internal surface of door member 326 may be emissive to create a 360 degree emissive surface for creating VWs. Here, instead of the employee's mind having to stitch together images separated by open FOV spaces as in the other embodiments described above, a complete view of the VW may be presented about the employee. Any of the features or processes described above may be implemented in the context of station 320.

Figure 31:
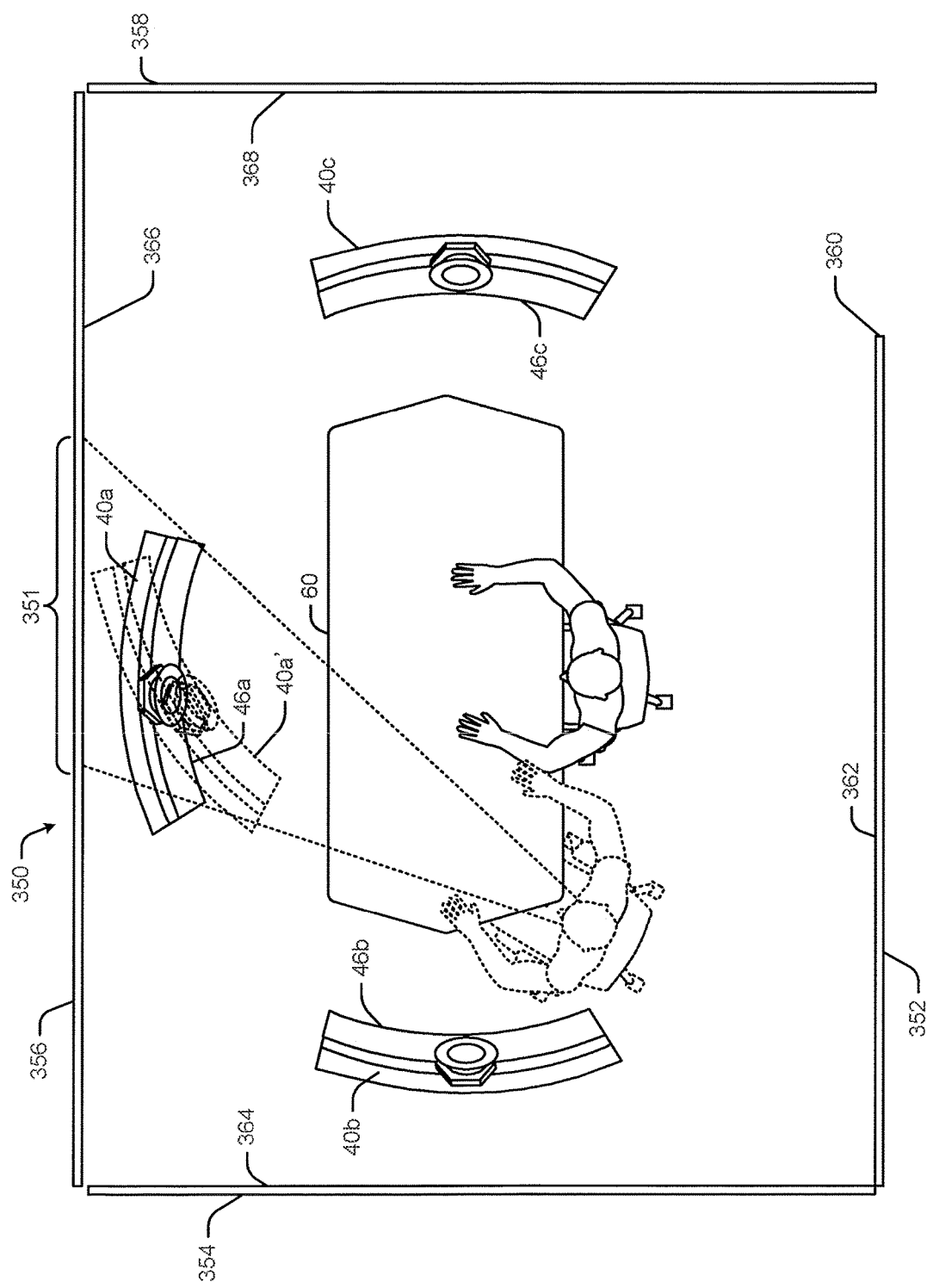
FIG. 31 is a top plan view of another station including emissive surface walls that surround a station.

Another VW station 350 is shown in top plan view in FIG. 31. In addition to including three emissive surface assemblies 40a, 40b and 40c as described above, station 350 also includes surrounding wall structure 352, 354, 356 and 358 that forms a rectangular space about assemblies 40a, 40b and 40c where the physical space includes an opening 360 for entry and exit. Here, in at least some embodiments, one or several of the interior surfaces of the wall structures may present additional large emissive surfaces. For instance, in some cases each of interior surfaces 362, 364, 366 and 368 may be emissive and therefore able to present any digital content including VW views, employee work product, etc. Here, server 12 (see again FIG. 1) would be linked to each of the emissive surfaces associated with assembly 350 for driving those surfaces in a coordinated fashion to facilitate any of the methods or concepts described above.

Figure 32:
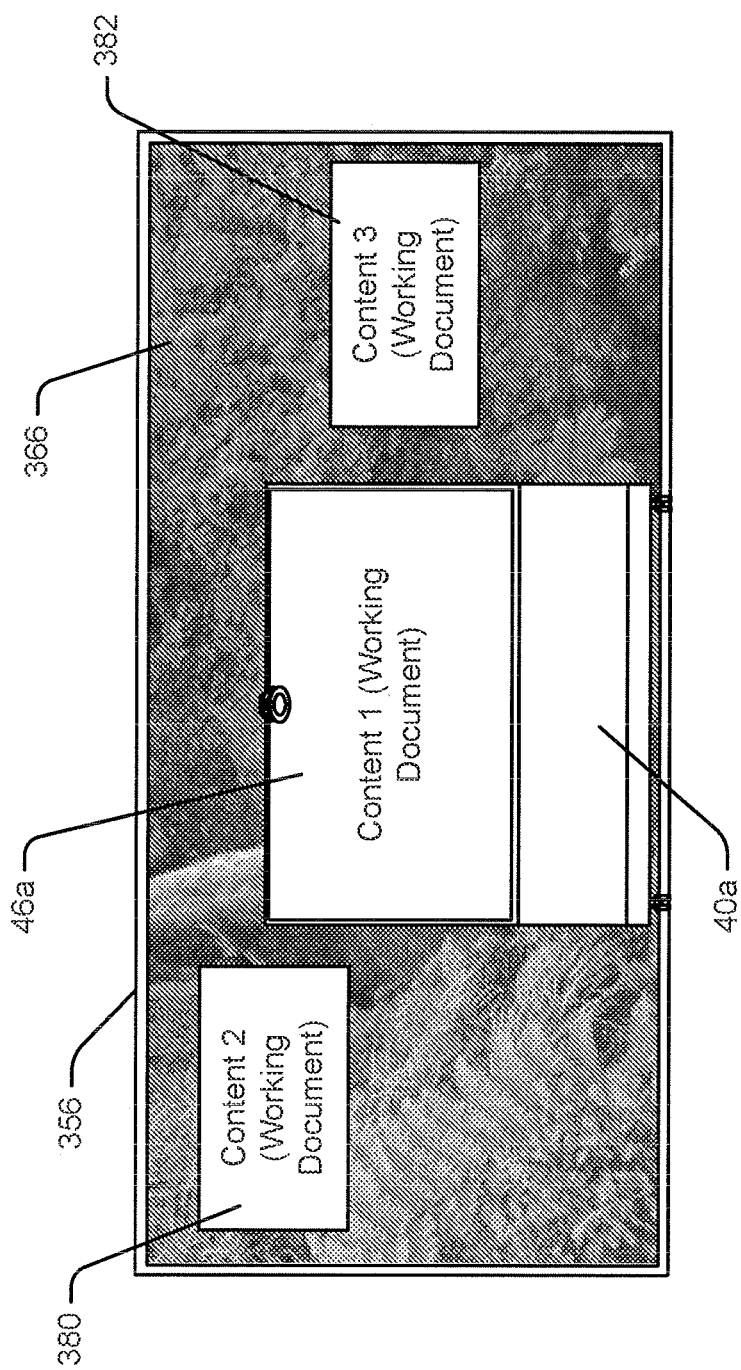
FIG. 32 is a front plan view of a mobile emissive surface assembly located in front of an emissive wall structure.

Referring to FIG. 32, one view of assembly 40a and the emissive surface 366 formed by wall 356 is illustrated where surface 366 is primarily used to present a VW view and surface 46a of assembly 40a that resides in front of surface 366 is primarily used to present work content at the instant illustrated. In addition, some secondary content is also shown posted in windows 380 and 382 on lateral side sections of surface 366. Here, it is contemplated that an employee using station 350 may develop content on surface 46a primarily and post that content for reference to surface 366 by dragging the content or otherwise indicating a content movement to the side edge of surface 46a. Here, the system would track the location of assembly 40a in the station space and may automatically post content in windows 380, 382 so that the content is not blocked from view by assembly 40a.

While not shown in FIG. 32, in other cases it is contemplated that at least a ribbon of ambient visuals that is consistent with the ambient visuals presented via surface 366 may be presented along the peripheral edge of surface 46a. Here, again, an employee's brain can stitch the ribbon and similar visuals on surface 366 together across a screen bezel formed by assembly 46a so that a sense of the content on surface 46a being suspended within the VW is enhanced.

Figure 33:
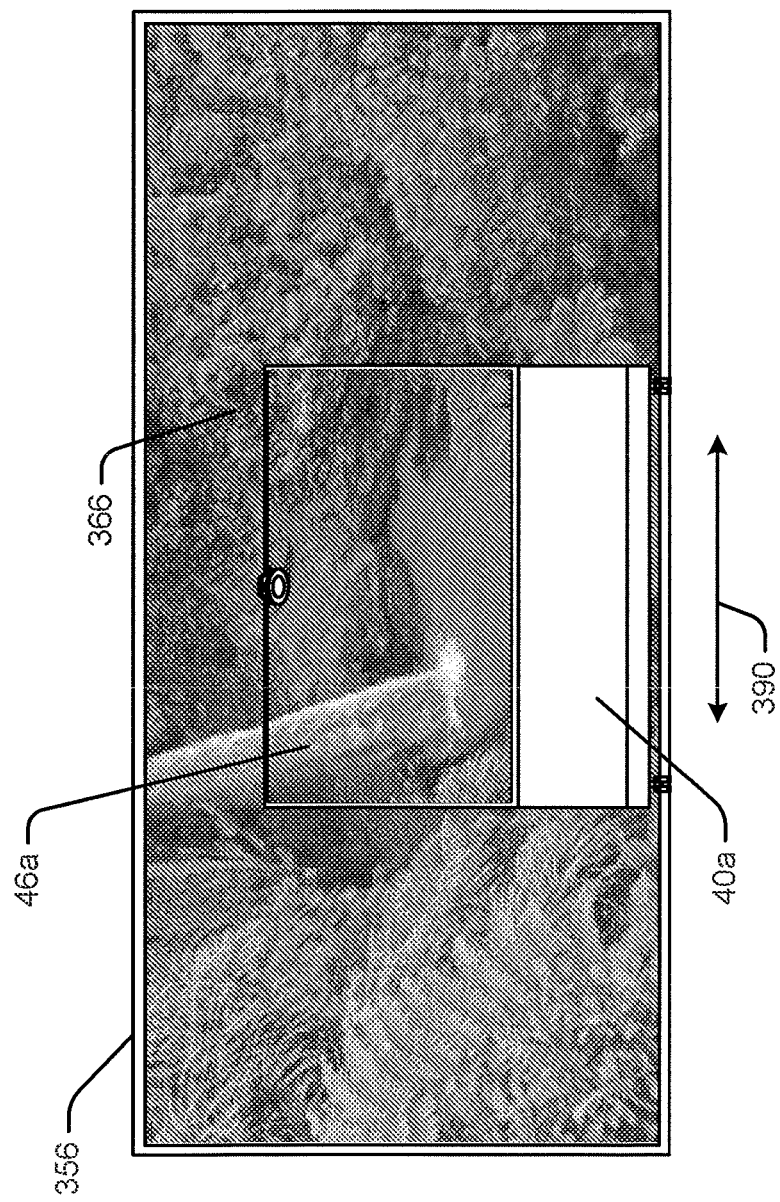
FIG. 33 is similar to FIG. 32, albeit where ambient visuals are presented on each of the emissive surfaces shown.

Referring also to FIG. 33, at other times when there is no content presented on surface 46a, a VW scene may be presented on surface 46a. Here, in some cases, the VW scene presented on surface 46a may be contiguous with the VW presented on the background surface 366 as shown in FIG. 33 where the waterfall on surface 366 continues onto surface 46a. Here, where there is only one employee in the space of station 350, server 12 may track the location of the employee's head generally and hence the general location of the employee's eyes and viewpoint and may adjust the image on surface 46a accordingly. Thus, for instance, when the employee is immediately in front of assembly 40a as shown in FIG. 31, surface 46a may present the image shown in FIG. 33 that is aligned with the employee's instantaneous FOV. However, if the employee is located at the side location shown in phantom in FIG. 31, the image or video presented via surface 46a may be angled so that an area corresponding to a different section of the VW as shown at 351 is presented. Similar adjustments to images presented via surfaces 46b and 46c based on an employee's instantaneous point of view or FOV in the real world are also contemplated.

Figure 34:
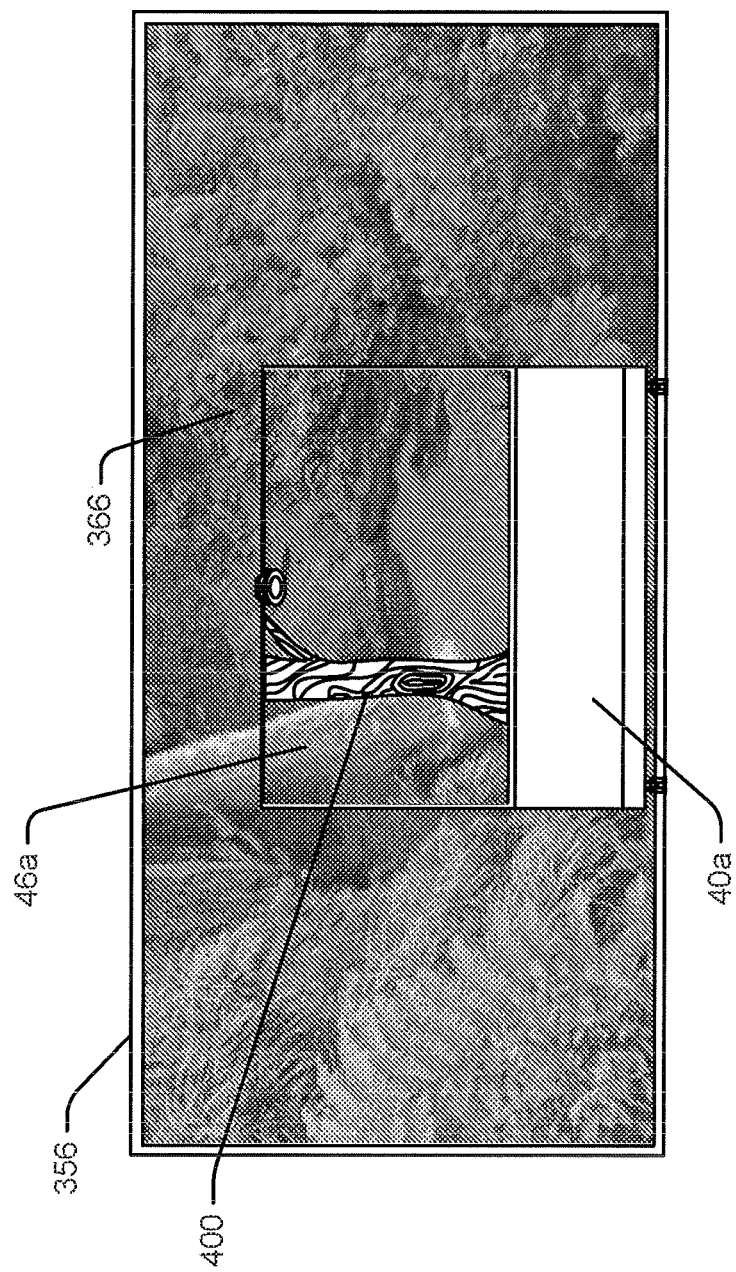
FIG. 34 is similar to FIG. 33, albeit where a foreground feature from a VW is presented on the mobile assembly to create a 3D effect.

Referring yet again to FIG. 33, in some embodiments assembly 40a may be manually or otherwise moved within a station space as indicated at 390. Here, in some cases cameras or other sensors associated with the station 350 may generate data useable by server 12 to track the location and orientation of assembly 40a and may automatically adust the image presented via surface 46a so that the presented image is contiguous from an employee's instantaneous viewpoint with the image presented on the background surface 366. While lateral movement is indicated by arrow 390, forward and rearward movement are contemplated as is rotational movement about a vertical axis so that an employee views the front plane of surface 46a along other than a 90 degree tangent trajectory (e.g., see phantom assembly 40a in FIG. 21).

Where different display screens or emissive surfaces are located at different distances from an employee at a station as shown in FIGS. 31 and 32, in at least some embodiments it is contemplated that server 12 may track the locations of the surfaces relative to the VW and present different depth perspectives to an employee to even further create an illusion of being immersed in the VW. To this end, see FIG. 34 where surface 46a is closer to an employee in real space than is surface 366. Here, surface 366 presents a long distance view and includes VW artifacts that can be seen in a long distance perspective. While surface 46a also presents a section of the long distance view that is contiguous with the view presented on surface 366, because surface 46a is closer to the employee in real space, other VW artifacts that are closer to the employee in the VW may be presented as foreground features within the employee's view in the VW. For instance, in FIG. 34, a foreground tree 400 is presented on surface 46a which gives a 3D effect to the overall VW presentation. In effect, the combined view presented via surfaces 46a and 366 includes some artifacts in the foreground and most in the background.

Figure 35:
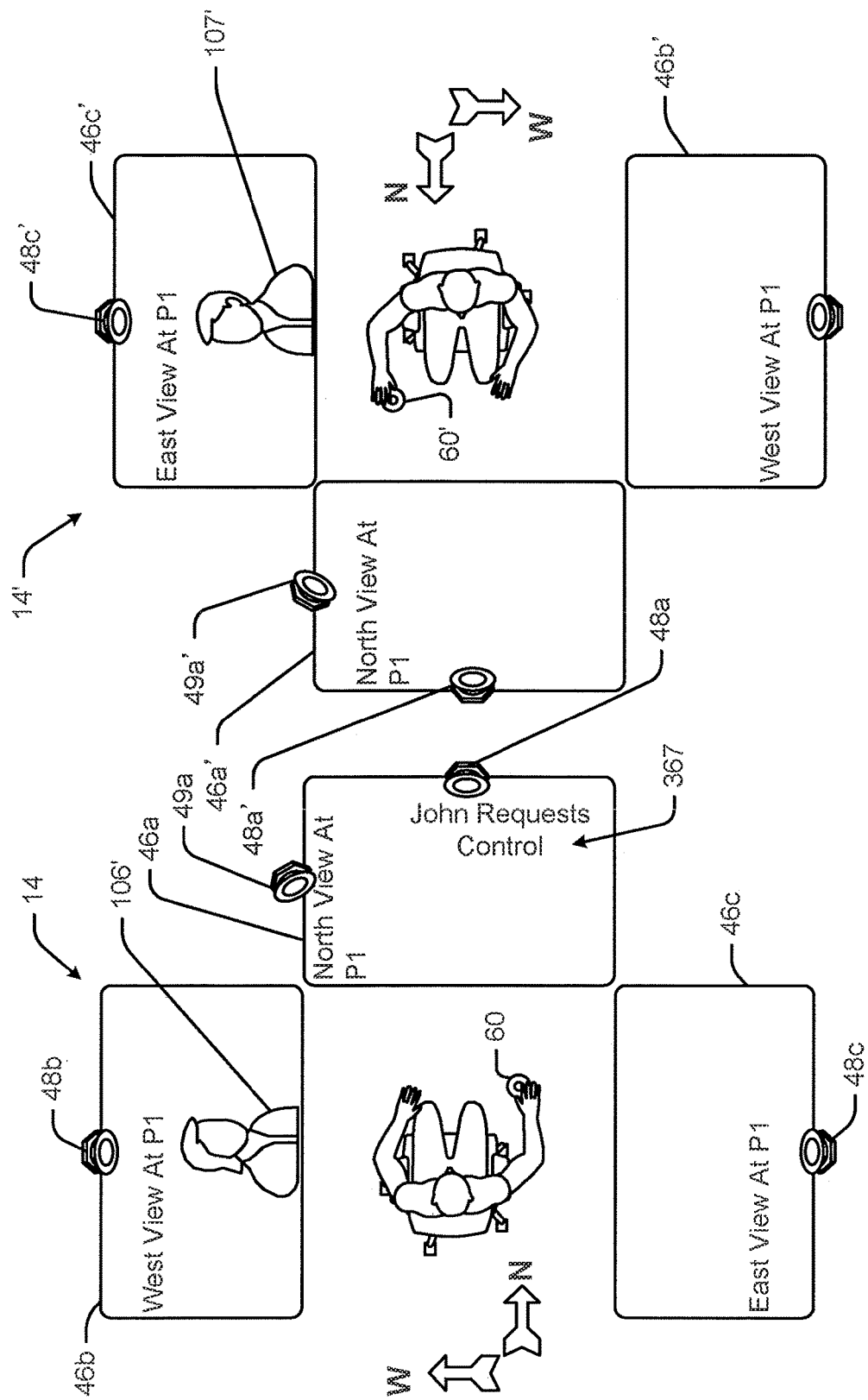
FIG. 35 is similar to FIG. 33, albeit showing two employees side by side in a VW traveling within the VW.

In at least some embodiments employees may be able to move around virtually together in a VW. For instance, in some cases a first employee may want to escort a second employee as the two employees "travel" through a VW to experience a specific VW path or other rejuvenating activity. Here, to simulate simultaneous movement together through a VW, a control scheme similar to the scheme illustrated in FIG. 23 and described above may be adopted by server 12. To this end see FIG. 35 where each of first and second employees is at their own stations 14 and 14' and is located at a point of view P1 facing north in a VW. Here, an image of the first employee at the first station 14 is presented on side surface 46c' at station 14' while an image of the second employee at station 14' is presented on the side surface 46b at station 14. In this case, if the first employee at station 14 uses interface 60 to move north (e.g., to the right as illustrated in FIG. 35), the second employee at station 14' would see the same changes in her VW representations and would virtually move north as well (e.g., to the left as illustrated in FIG. 35). Again, the employees could look to their sides to make eye to eye contact while traveling in the VW.

While control of travel may be limited to one employee at a time in some cases, in other cases it is contemplated that travel control may be egalitarian so that either of the first or second employees (see interface 60' in FIG. 35) or even a third or fourth employee if other employees are linked into a session with the first and second employees could control travel. Here, any time one employee stops VW travel control, any other employee could automatically assume control if desired. In other cases a controlling employee may be required to yield travel control prior to a second employee taking control. In some cases, where one employee is controlling travel and a second employee wants to tae control, any action via interface 60' or another interface device by the second employee may cause a visual indication to be presented via one of the emissive surfaces at the station used by the controlling employee indicating a desire to control travel (see 367 in FIG. 35).

While employee perceptions of VW spaces (e.g., like or dislike, rate 1 to 10, etc.) may be helpful to specific employees and other employees in locating useful spaces, in at least some embodiments stations may include one or more sensors 36 to sense employee flow and hence perceived mind state while employees are working, rejuvenating or performing some other activity in different VW environments/locations and may calculate a different set of metrics for employees to use to assess effectiveness of specific environments over time. To this end, while sensed flow is useful in the real world to assess value of different affordance sets, those metrics should be even more valuable in a VW where affordance sets or different types of environments as well as perception cycles (e.g., a 30 minute sequence designed for rejuvenation) can be modified quickly and many different sets, environments and cycles can be experimented with over time. Thus, server 12 may use physiological parameters tracked by sensors 36 to determine how long it takes for a specific employee to enter and exit different activity flow types, how deep the employee gets into different flows, how energetic the employee is in certain circumstances or after certain VW experiences, how the employee maintains energy or other useful characteristics during different activities in different VW environments. Here, these metrics tracked over time should allow the system to identify most optimal VW locations and conditions for at least a handful of different activities for each specific employee using the VW.

Once optimal VW locations/conditions are identified, server 12 should be able to at least suggest those locations and conditions to the employee based on the activity the employee intends to perform at a station. In addition, server 12 will be able to provide metrics on flow and other mind state conditions to make employees aware of VW locations and conditions that appear to negatively affected flow and other perceivable mind state conditions. For instance, where an employee was unable to achieve a deep rejuvenation flow or only achieved a relatively short flow in a specific VW location, server may provide an immediate notice to the employee as well as subsequent warnings the next time the employee intends to participate in a rejuvenation activity.

In many cases, while sensors may gather information useable to discern employee flow states, an employee may recognize that there is some anomalistic reason why the employee was unable to achieve a desired state or why achieving the desired state took longer than optimal. Here, where server 12 provides metrics to the employee immediately after an activity has ceased or between scheduled activities, in at least some embodiments the employee may be presented the option to command the system to disregard the provided metrics for the specific session or activity instance so that the anomalistic metrics do not affect future VW location and experience suggestions. For instance, if the system indicates that an employee was unable to achieve a deep rejuvenation flow state during a session immediately following an extremely stressful conference, the employee may recognize that her inability to achieve the desired state is the result of the stressful meeting and may opt for the system to disregard the sensed flow results for the session in the future.

In addition, it is contemplated that once server 12 identifies optimal activity specific VW locations/conditions for an employee, server 12 may be programmed to modify at least some less than optimal VW locations so that those locations are imbued with some or most of the characteristics of the optimal location/condition sets. Here, the other locations would not be identical to the previously optimal locations so that the employee would continue to have choice within the VW, but at least some optimal characteristics may operate as a seed to positively affect other VW locations in a personalized way. In the alternative, in cases where an employee's flow state characteristics are positively affected by one or a set of specific VW characteristics, server 12 may seek out other VW locations that have similar characteristics and suggest those locations to the employee to try. Thus, for instance, where a first lake side scene in a VW has a positive effect on an employee's ability to get into work flow, server 12 may identify four other VW locations that are similarly afforded and suggest those to the employee for consideration.

As described above, in most cases the VW scenes presented on station surfaces will include at least some persistent dynamic motion (e.g., wheat rustling in a gentle wind). In some cases it is contemplated that the rate of motion may be controlled as a function of what an employee is doing at a station. Thus, for instance, where the employee is heads up and using a front surface (e.g., 46a in FIG. 10) to develop content, the rate of movement may be relatively low compared to when the employee is heads down reading a document on a tablet type device 198 or reading a book. To this end, referring again to FIG. 1, sensors 36 or the station cameras may again generate data useable by server 12 to determine the posture or some other physiological condition of an employee at station 14. Based on that condition, server 12 controls the rate of movement within the persistent dynamic background effect.

Similarly, the pace of movement may be different on different station surfaces. For instance, referring again to FIG. 10, the pace of movement on front surface 46a may be less than the pace of movement on side surfaces 46b and 46c that are only perceivable peripherally. Here, it has been recognized that movement in a person's peripheral view is more difficult to perceive than movement in a foveal front view and therefore more movement peripherally may be required to present an immersive feeling for some employees.

In at least some embodiments a VW station or VW configuration may be physically used by two or more employees at the same time. To this end, see for instance FIG. 36 where first and second employees are both physically located in a single VW station 350 akin to the station described above with respect to FIG. 31. Here, because there are two employees in the station, in at least some cases it will be advantageous for one of the employees to manually move one or more of the mobile emissive surface assemblies to a different location in the space so that each of the employees has a sense of being immersed in a VW during a session at the station. Thus, for instance, in FIG. 36, instead of assemblies 40b and 40c being spaced on opposite sides of a single employee to substantially oppose each other (see again FIG. 33), assemblies 40b and 40c have been moved about so that the three assemblies 40a, 40b and 40c are spaced about and aligned along 120 degree trajectories with a central point in the station 350 space. In this way, the combined VW perception of the two employees should best be served as each has the same or a similar opportunity for their brain to stitch together the VW views presented via the assembly surfaces.

Figure 36:
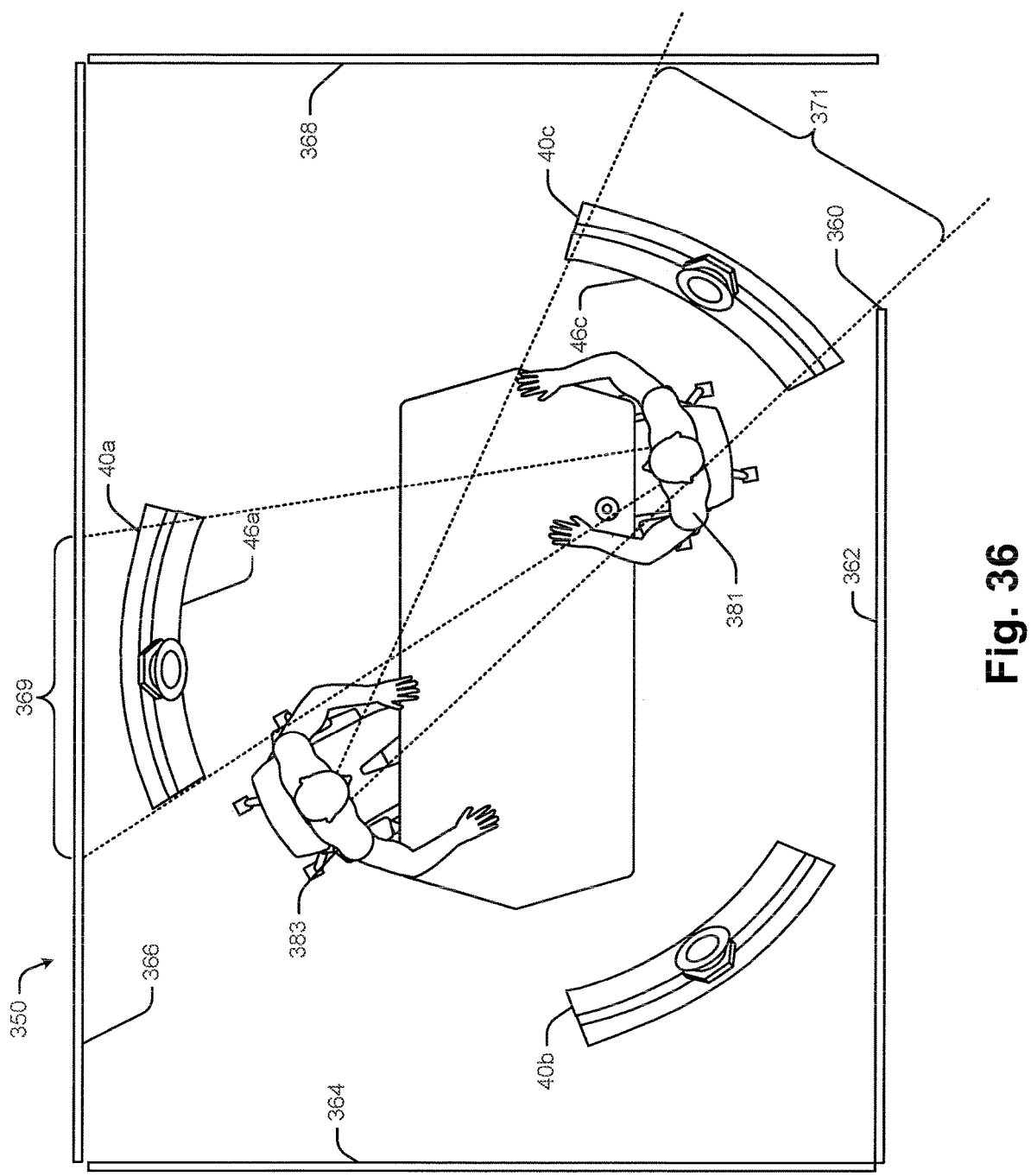
FIG. 36 is a top plan view of a station used by two employees present in the real world.

Referring still to FIG. 36, where two employees are located at the station 350 and face in opposite directions, the views on each of the assemblies 40a, 40b, etc., may be presented from the perspective of the employee that has the most direct view toward the assembly. For instance, surface 46a would present a VW view as indicated at 369 from the perspective of employee 381 instead of from employee 383's perspective while surface 46c would present a VW view as indicated at 371 from the perspective of employee 383 as opposed from the perspective of employee 381.

Figure 37:
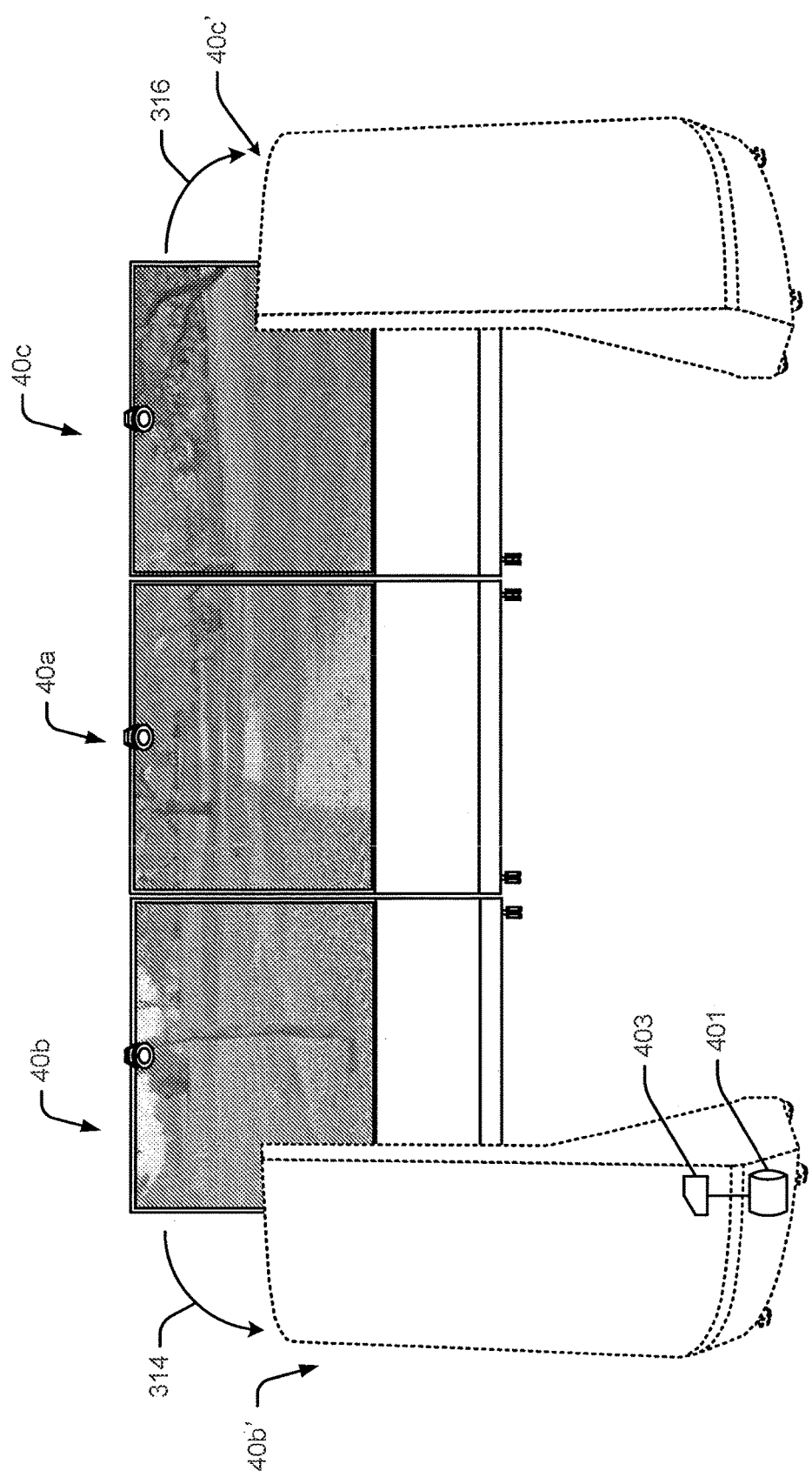
FIG. 37 is a view of surface assemblies that are mobile and moveable to different locations to create different VW effects.

While many of the emissive surface assemblies described above are mounted on casters or wheels so that they can be manually moved about to reconfigure station affordances, in some cases each or at least a subset of the assemblies may include motors 401 and control systems 403 (see FIG. 37) so that movement can be assisted.

Figure 38:
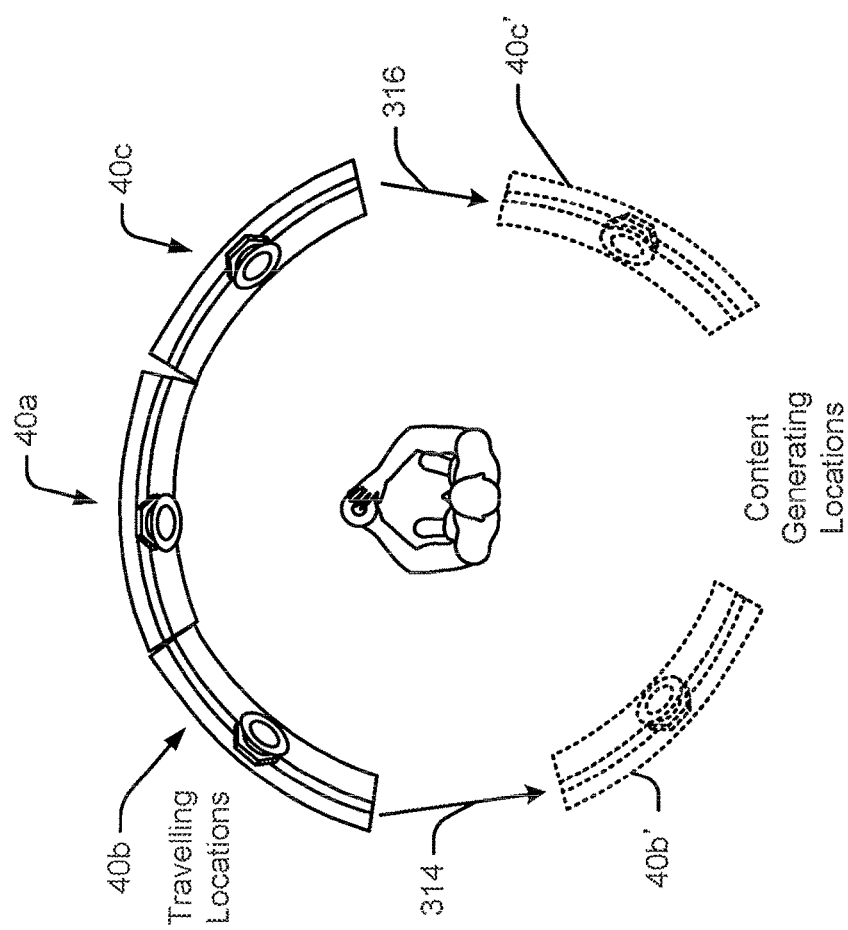
FIG. 38 shows the configuration of FIG. 37 in a top plan view.

In still other cases where emissive surface assemblies include motors and control systems, server 12 may operate to automatically move those assemblies to different locations at different times depending on a perceived activity being performed by an employee or a set of employees using a station. For instance, server 12 may automatically move surface assemblies to different locations depending on whether or not an employee is traveling in a VW, participating in a rejuvenation activity, generating work product, participating in a video conference, etc. To this end, see for instance FIGS. 37 and 38 where station surface assemblies 40a, 40b and 40c are shown in an edge to edge configuration and where the left and right assemblies are also shown in phantom at second locations. Here, for instance, when an employee is traveling in a VW, assemblies 40a, 40b and 40c may be positioned in the edge to edge configuration to provide a panoramic view of the VW during travel. Once the employee arrives at a desired VW location and accesses content or a content generating application, server 12 may automatically move assemblies 40b and 40c to the side content generating locations shown in phantom at 40b' and 40c'. Here, if the employee again starts to travel in the VW, the assemblies 40b and 40c may be automatically moved back to the travelling locations illustrated.

Figure 39:
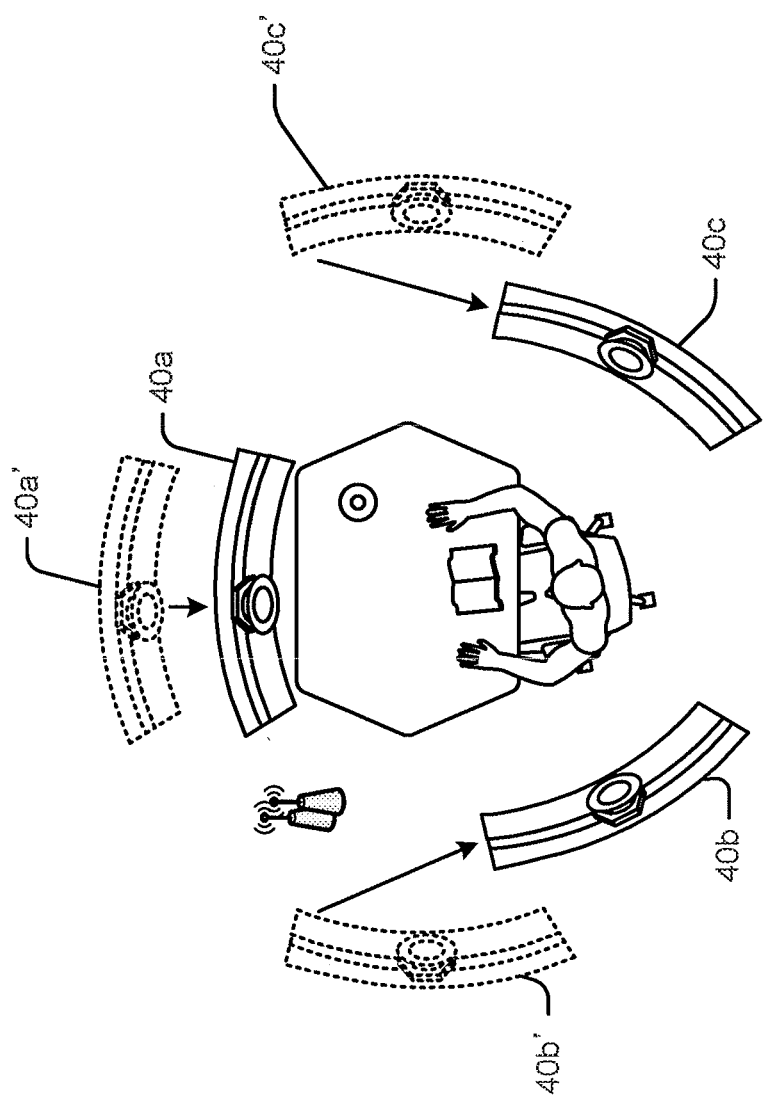
FIG. 39 is a top plan view of yet another VW station.

As another example, see FIG. 39 where assemblies 40a, 40b and 40c are shown in a content generating configuration and in a heads down reading configuration in phantom at 40a', 40b' and 40c'. Here, when generating content using the emissive surfaces, assembly 40a is pulled up near an opposite edge of the table top used by the employee and the other assemblies 40b and 40c are pulled rearward and when reading with head down, assembly 40a is spaced away from the employee's table and assemblies 40b and 40c are moved to the phantom side locations. In each of the configurations shown in FIGS. 37 through 39, as an assembly 40a, 40b or 40c is moved, the video presented thereby changes as the FOV into the VW from the employee's instantaneous location is modified so that all of the views presented are always indexed to the VW.

In some cases server 12 may be programmed to automatically move surface assemblies to different station locations at least in part based on VW content that exists at specific VW locations. For instance, where a tree exists immediately in front of an employee's instantaneous VW location, server 12 may move an assembly forward to be on the other side of the tree in the VW and adjust the VW view on the surface accordingly. In other cases a tree located in a foreground VW view that may e distracting may be removed from the VW view automatically to avoid distraction.

Figure 40:
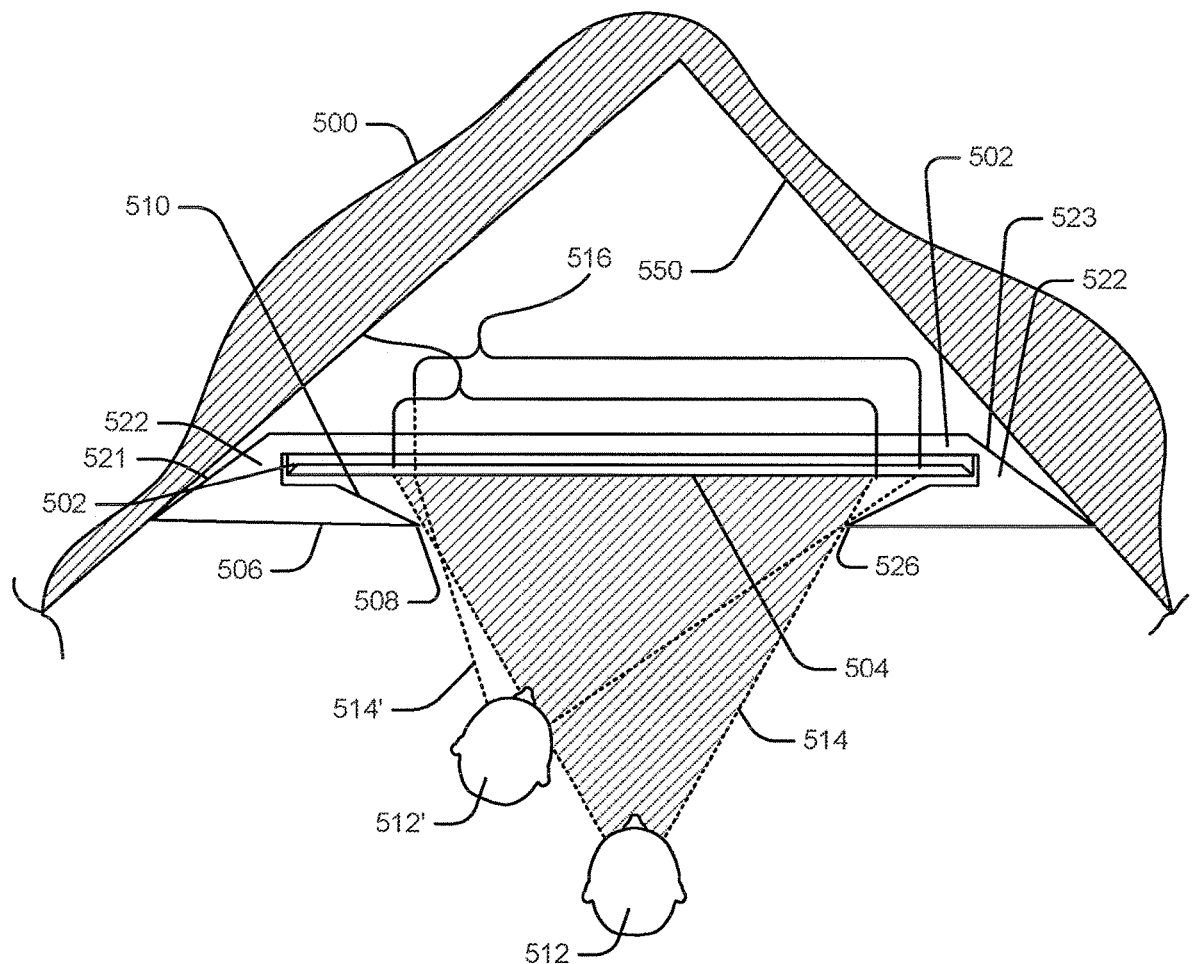
FIG. 40 is a schematic view of a surface configuration that includes an emissive surface spaced behind a frame structure to present a 3D effect to an employee as the employee changes her point of view with respect to the emissive surface.

Another emissive surface assembly 500 is shown in FIG. 40 that can be used to provide an enhanced virtual view effect. Assembly 500 includes a display 502 having a flat emissive surface 504 mounted within a frame structure 506. The frame structure 506 includes a rear rectangular member 520 and four lateral side members 522 (only two shown) that extend from edges of the rear member to form a box like structure having a cavity. A front frame member 524 is generally rectangular and has an internal edge 508 that forms a rectangular opening 526. Edge 508 slopes into the cavity toward the lateral edges as shown at 510 to form an acute angle around its entire rectangular periphery.

Referring still to FIG. 40, surface 504 is spaced rearward of edge 508 by a short distance (e.g., 1 to 10 inches) and has dimensions such that it extends laterally, upward and downward further than the opening 526 as illustrated. On each edge, the surface 504 minimally extends at least 2 inches beyond an adjacent edge 508 and, in particularly advantageous embodiments, may extend anywhere between 3 inches and 24 inches beyond an adjacent edge section 508. An inner circumferential surface 510 about the edge 508 is angled to flare open inwardly so that the edge 508 forms an acute angle about the periphery of the frame structure. Here, the angle should be such that an employee that has a side view (e.g., see 512') into the frame structure cannot see the surface 510 throughout at least a range of angular positions with respect to the frame. In some cases even when an employee is located far to the left or right and views the assembly 500, surface 510 should be completely hidden from view.

Figure 41:
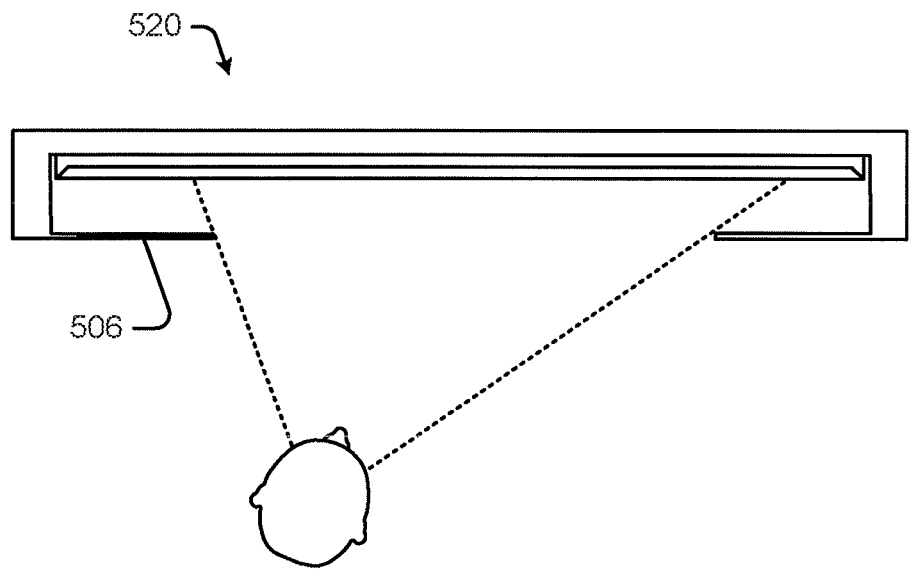
FIG. 41 is a view similar to FIG. 40, albeit showing a second embodiment of a virtual windowing arrangement that is consistent with at least some aspects of the present disclosure.
Figure 42:
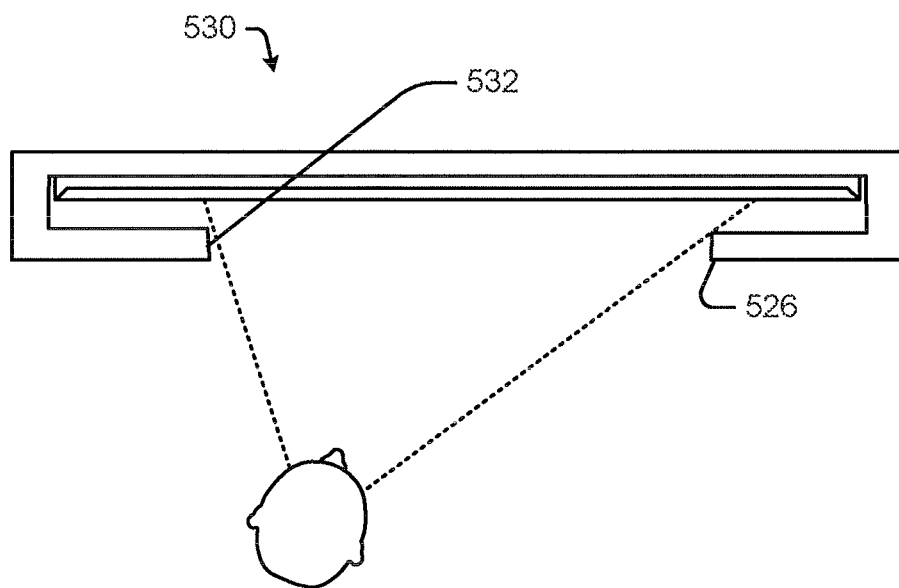
FIG. 42 is similar to FIG. 41, albeit showing a third windowing arrangement.

Referring to FIG. 41, another configuration 520 is contemplated where the thickness of the frame member 506 is minimal and uniform which creates a similar viewing effect. In still another embodiment 530 shown in FIG. 42, the frame structure has a squared off internal surface as at 532 and a space between the front part of the frame and the front of surface 534 is made larger to create a similar effect using the rear edge of surface 532.

Referring again to FIG. 40, when an employee 512 looks at assembly 500, and specifically at surface 504, front frame member 506 blocks at least some edge portion of surface 504 around the entire periphery from view. Thus, when viewing surface 504 head on as at 512, the employee only sees section 516 of surface and when viewing surface 504 from location 512', the employee only sees section 516' of the surface. Similar edge blocking occurs along the top and bottom edges of surface 504. Because surface 504 is spaced behind frame member 506, the portions of the surface that are viewable along the edges change as the employee moves to different locations to view the surface 504 from different trajectories. Here, the changing view of surface 504 mimics an experience of looking out a real world window where different trajectories result in different views of the outside world. This is particularly true in cases where persistent dynamic background effects are presented via surface 504.

While assembly 500 may be located at any location within an enterprise space to provide a useful space opening effect, in particularly advantageous embodiments, assembly 500 may be located in the typically wasted space in a corner of a room as shown at 550. Here, as a retrofittable affordance, outer edges of the frame structure 522 may be angled as shown at 521 and 523 so that outer edges of the frame structure can be placed generally flush up against corner walls.

An effect similar to the effect of the assembly 500 in FIG. 40 can be mimicked in other configurations that do not include the frame structure 506. To this end, see again FIG. 30 where a cylindrical emissive surface 324 is presented that surrounds an employee. Here, sensors 36 may include cameras or other sensor types (e.g., a Kinect sensor by Microsoft) that can sense the location of the employee's head or eyes and even the direction in which the employee's eyes are directed. Here, where a content window is presented on surface 324 in front of the employee with persistent dynamic background effects there behind, as the employee moves her head sideways so that her perspective on the content window changes, server 12 may use signals from sensor 36 to determine the direction of the employee's view and to change the background effect by shifting the perspective in the VW slightly to the new location of the employee's point of view. Here, by shifting the VW view on surface 324 while maintaining the location of the content window, the perception that the VW is in the background behind the content window is enhanced appreciably. Here, the entire VW view on surface 324 may be automatically changed in this fashion to give the employee a strong immersive sense. While basing these perspective shifts on employee eye location and trajectory of gaze may be optimal, in some cases basing these shifts on head location alone should be sufficient to create the desired effect. Perspective shifts in the persistent dynamic background effect may be implemented in any of the VW configurations described herein.

In at least some embodiments it is contemplated that a first employee that has a great experience in a specific VW location may be able to render that location available to a second employee in her own VW. For instance, assume that a first employee using a station 14 has a great rejuvenation at a first location in a jungle type VW and would like to share that experience with a second employee that routinely spends time in a Tuscan VW that does not include the jungle experience. Here, the first employee may be able to suggest the first location in the jungle type VW to the second employee in an e-mail or via some other type of notification (e.g., a notice built into a station interface) presented to the second employee when that employee next enters his version of the VW. The notice may include a hyperlink or the like to enable the second employee to immediately access the first location in the jungle type VW to have the experience. In still other cases where a recommended VW experience is associated with a specific type of activity (e.g., focused work, rejuvenation, etc.), the suggested experience may only be suggested and rendered accessible after the second employee indicates that he is about to participate in the associated activity type or when an instance of the activity type is scheduled on an employee's electronically maintained schedule.

In still other cases VW experiences suggested by other employees may be located within a specific zone in a VW. For instance, where a VW includes an exploratory zone (see 281 in FIG. 26), all suggested VW experiences may be rendered in that zone so that an employee knows where to look to consider suggested experiences. In FIG., 26, one exemplary suggested experience is labeled "New Experience—John White" indicating that John White suggested the VW experience that exists at 283.

As indicated above, a new or suggested experience may be from a second VW data set that is different than a first VW data set that an employee typically accesses. For instance, a first employee may typically access a first VW that depicts a jungle with hills, trees, paths, a few huts, a temple, ponds, rivers, etc., and a suggested experience may include an experience in a second VW that depicts a Tuscan village and countryside. Where an experience from a second VW that is different than a first VW typically accessed by an employee is added to an exploratory zone or otherwise accessible from the first VW, a system server may automatically create a VW bridge from the first VW to the second VW to allow the employee to "travel" to the suggested experience within a seamless virtual experience. Thus, in FIG., 26 where an employee is at the location indicated by icon 291 in a first VW depicting a jungle, if the employee selects the new experience sub-zone 283 that is at a specific location in a second VW that depicts a Tuscan village, the server would create a VW bridge from location 291 into the second VW and to the location associated with the suggested experience.

Figure 43:
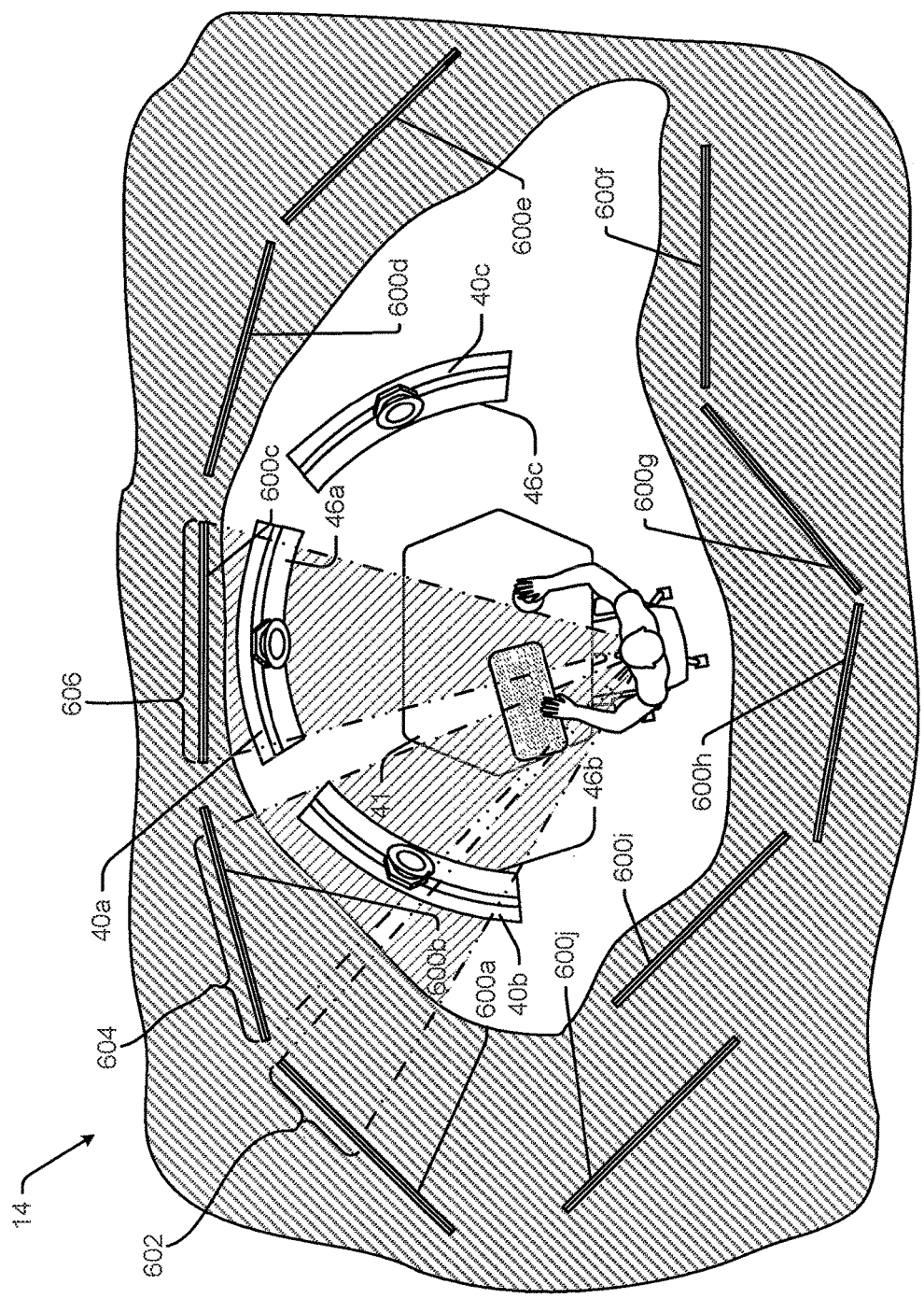
FIG. 43 is a top plan view showing an exemplary VW station and a surrounding VW arrangement of virtual emissive surfaces.

Referring again to FIG. 10, while content at any VW location may be posted on virtual display surfaces that are aligned precisely with surfaces 46a through 46c in the real world and are associated with a specific VW point (e.g., a specific X and Y location in a VW), in other cases the virtual display surfaces may be provided within the VW coordinate system at spaced apart, surface specific locations (e.g., within a section of a specific plane in a VW and in a set juxtaposition with respect to other virtual surfaces within the VW) irrespective of how those virtual surfaces align with the real world surfaces and there may be many more VW surfaces than the number of assemblies 40a through 40c that comprise a station 14. For instance, see FIG. 43 that includes three real world emissive surface assemblies 40a, 40b and 40c that are arranged about a table 41 at a station 14. In FIG. 43, left up to right cross hatching indicates a VW space and affordances presented virtually in that VW space. As shown, labels 600 followed by a lower case letter (e.g., "a", "b", etc.) indicate virtual display surfaces that occur in the VW space. As shown, while VW surface 600c is generally aligned with real world surface 46a, other VW surfaces are not. For instance, surface 600a is positioned with respect to each of assemblies 40a, 40b and 40c so that if viewed through one of the real world surfaces (e.g., 46b) while the employee is at the VW location and in the VW orientation corresponding to FIG. 43, surface 600a would be seen at a non-perpendicular angle. Similarly, each of surfaces 600b, 600d and 600e would also be viewable at non-perpendicular angles as shown. Other VW surfaces that exist within the VW behind the employee in FIG. 43 would not be observable unless the employee rotated in the VW to face in the rearward direction as illustrated in FIG. 43.

Referring still to FIG. 43, because VW surfaces 600a and 600b are not aligned with the real world surface 46b or the illustrated employee's point of view through surface 46b, only parts 602 and 604 of surfaces 600a and 600b are observable by the employee. To this end, see that the employee's FOVs through surfaces 46b and 46a and on to the virtual surfaces 600a, 600b and 600c are indicated by the left down to right cross hatching. Similarly only partial views of surfaces 600d and 600e would be seen via surface 46c given the juxtaposition of the employee to surface 46c and virtual surfaces 600d and 600e shown in FIG. 43. To view any of the virtual surfaces head on in FIG. 43, the employee may used an interface device to change VW location and orientation to square up with any of the virtual surfaces which would change the view of other virtual surfaces accordingly.

Referring yet again to FIG. 43, some virtual surfaces may be staggered one behind the other from the perspective of the employee in the VW. Thus, for instance, see in FIG. 43 that virtual surface 600j is positioned at least somewhat behind virtual surface 600i. Here, the employee may be able to move to locations in front of one or the other of the staggered surfaces to view those in the VW and would perceive the layered nature of various surfaces via a 3D presentation of the surfaces.

Figure 44:
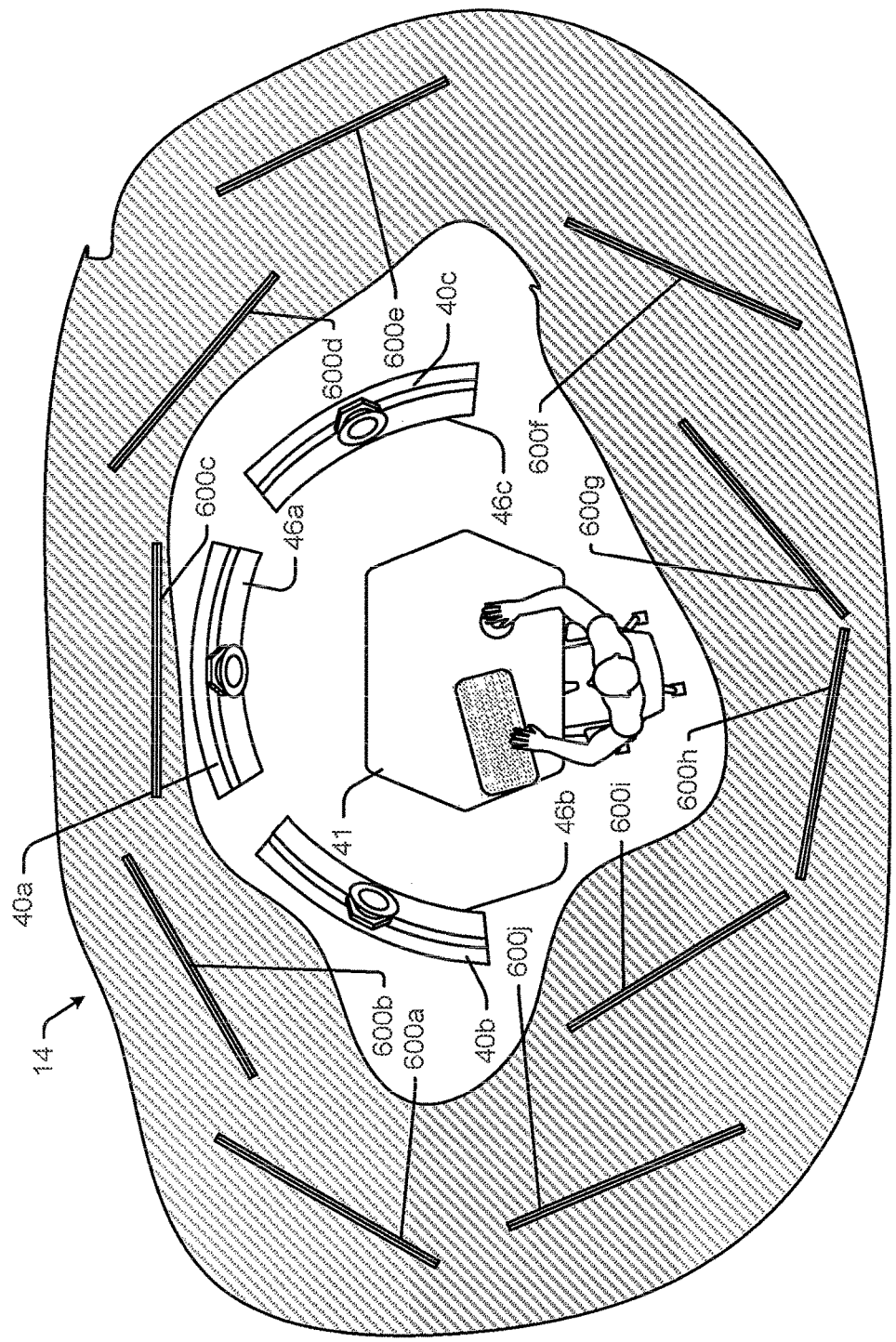
FIG. 44 is similar to FIG. 43, albeit showing a different arrangement of virtual emissive surfaces about a VW station.

While virtual surfaces in a VW may be located at surface specific locations within a VW, in at least some embodiments, a server may be programmed to always orient (e.g., actively rotate) each virtual surface to directly face an employee's instantaneous VW location. For instance, FIG. 44 shows a VW surface arrangement that is similar to the arrangement shown in FIG. 43 including 10 virtual surfaces 600a through 600j arranged about an employee's VW location. In FIG. 44, however, the virtual surfaces 600a through 600j are controlled to rotate in the VR and directly face the employee's VW location so that all content on sections of the virtual surfaces viewable via any one of the real world surfaces 46a through 46c directly faces and is more easily viewable by the employee in the real world.

While VW stations like station 14 and others described above are particularly useful in many cases, most employees will still use other enterprise spaces to perform various tasks from time to time. For instance, in at least some cases an employee may participate with other employees in a meeting within a real world conference room. An exemplary real world conference room may have a specific set and arrangement of emissive surfaces for accessing, developing and sharing content. For instance, see FIG. 45 where an exemplary real world conference room or space 640 includes four large real world emissive surfaces 670, 672, 674 and 676 arranged on four walls 650, 652, 654 and 656, respectively, that form a rectangular conference space. Three employees including a first employee 651 are shown in the conference space during a project session at a first time. During the session, it is contemplated that the three employees cooperate to access and generate project content on the emissive surfaces in the space 640. Some of the accessed and generated project content is presented on the real world emissive surfaces at the end of the session that represents the state of the project at the end of the session. In addition, herein it is assumed that other content is stored in a project queue 641 corresponding to other project content that has been developed but is not presented via the emissive surfaces at the end of the session. For instance, the project queue may include archived documents, images, video clips, audio clips, etc., developed and stored during the project session or during prior project sessions. Hereinafter, unless indicated otherwise, the content presented via the emissive surface arrangement in space 640 and the project content stored in a project queue along with project content presented via the real world emissive surfaces in space 640 and the arrangement of that content (e.g., which content is presented on which real world surfaces and the content arrangement on those surface) at any instant in time will be referred to herein by the phrase "project content state".

In at least some embodiments, at the end of a project session, one or more employees may have the option to store the project content state in a system database for subsequent access. In other cases, a system server may be programmed to automatically store project content states periodically as they are developed by employees and at the end of any session associated with a project. To this end, see again FIG. 1 where database 16 includes a project content sub-database 700 that stores a plurality of project content state data sets and content arrangements. After storing a project content state at the end of a first session, one or more employees may participate in a subsequent or second session associated with the project in space 640 and the project content state information may again be accessed and presented via the space 640 surfaces in the same arrangement as at the end of the first session.

In at least some cases where project content state is stored at the end of a project session, any authorized employee may be able to access the project content state and even a virtual representation of the real world conference space in which the content was accessed or developed via a VW station. To this end, in at least some embodiments it is contemplated that virtual representations of real world enterprise spaces may be developed and stored in a system database that can be used to render VW representations of those spaces. For instance, see again FIG. 1 that, in at least some embodiments, includes a plurality of 3D virtual representations of real world space and/or emissive surface arrangements in real world spaces associated with an enterprise at 702. Data set instances in sub-database 702 are labeled as conference spaces in the interest of simplifying this explanation. It should be recognized that any enterprise space may be virtually represented by a data set instance in database 702.

Where an enterprise has 100 different conference spaces, each of those spaces may be virtually modeled in database 702 so that the space can be presented in a VW. One exemplary conference space data set is labeled 704 in FIG. 1. An exemplary model may include wall, floor and ceiling representations as well as representations of emissive surfaces, a table or other affordances within an associated real world space. Here, the walls, surfaces and other affordances are often stationary after being installed and therefore the model data sets can be persistent in many cases. In other cases where one or more real world space affordances are at least periodically moved, in at least some embodiments the model data sets may be dynamic to reflect changes in relative juxtapositions of affordances within a space 640. For instance, in FIG. 45, where emissive surface assembly 40*d* can be moved within space 640, sensors (e.g. position, proximity, camera, accelerometer and/or gyroscope, etc.) in the real world space 640 may sense instantaneous location of assembly 40*d* and store that information as part of the project content state.

Figure 45:
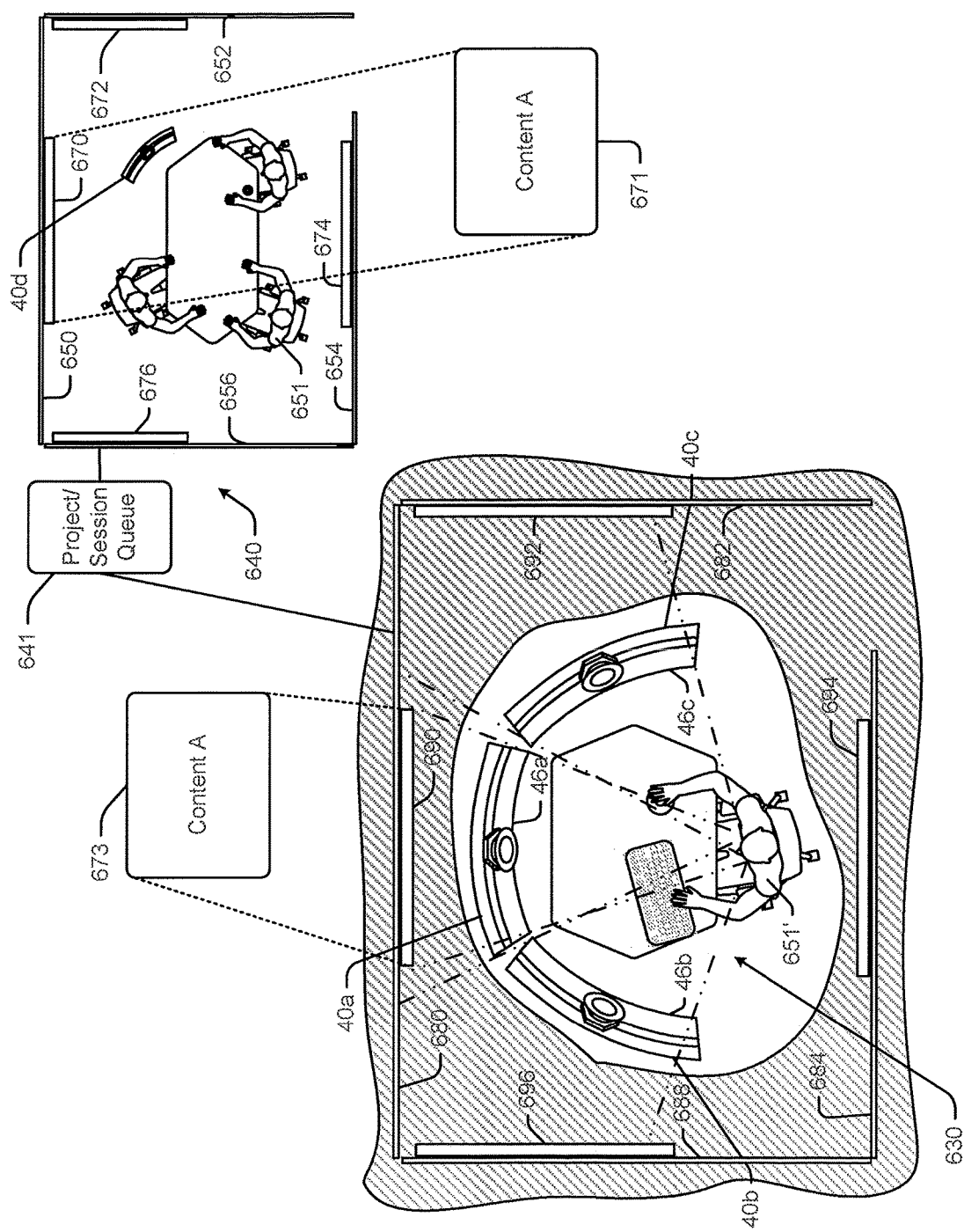
FIG. 45 is a schematic top plan view of a real world conference space and a real world VW station surrounded by a virtual representation of the real world conference space.

Thus, referring still to FIG. 45, at the end of a project session, a stored project content state may include queue content, content presented at the end of the session on each real world emissive surface, a data set representing the real world space 640 affordances including walls, stationary and moveable emissive surfaces and other space affordances as well as information specifying the instantaneous locations of moveable emissive surfaces and other moveable affordances in space 640 at the end of the session when the project content state is stored.

Referring again to FIG. 45, after the project content state is stored (e.g., at a time subsequent to the most recent project session), the employee may use VW station 630 to reaccess the project to review project content, modify project content or for any other reason. To this end, first employee 651 in space 640 is shown at 651' in station 630 at a subsequent time. Again, as in FIG. 44, in FIG. 45 all affordances shown in the cross hatched area are virtual and presented in a VW instance. Thus, virtual walls 680, 682, 684 and 686 corresponding to real world walls 650, 652, 654 and 656, respectively, and virtual emissive surfaces 690, 692, 694 and 696 corresponding to real world emissive surfaces 670, 672, 674 and 676, respectively, are presented in the VW. The space model used to generate the virtual walls and surfaces is stored at 702 in database 24 in FIG. 1.

In FIG. 45 employee 651's view into the VW is restricted to the FOVs provided by real world surfaces 46*a*, 46*b* and 46*c* so that, as located and oriented, employee 651' sees the virtual representations of real world surfaces 670, 672 and 676 along with portions of associated walls. Here, when the virtual representation of space 640 is presented via station 630, at least initially, in some embodiments all of the content as arranged at the end of the most recent project session is presented in the exact same arrangement via virtual surfaces 690, 692 and 696 (as well as 694 if employee 651' reorients to have a view of surface 694). Thus, for instance, Content A 671 on real world surface 670 at the end of the session is presented on virtual surface 690 when the session content is accessed initially via station 630. Similarly, content on surfaces 676, 672 and 674 at the end of the session is presented via surfaces 696, 692 and 694, respectively, when station 630 is used to initially access the session content.

By representing project content in the same relative positions in a VW as the content in space 640, the first employee is able to mentally plug right into the content relatively quickly to continue thought processes occurring at the end of the most recent session. In many cases an employee may not be done thinking about a project topic and re-accessing session content helps the employee complete various project related tasks.

In some cases, while accessing session content in a VW via station 630, the employee 651' may be able to modify that content or session content in the session queue either for her own purposes or to alter that content prior to a next project session in space 640 with the project team. Here, then, when the team meets a next time and pulls up the session content, the content may be presented via the real world surfaces in space 640 for consideration. In the alternative, the team may have the option to either present the project content in the state it was in at the end of the most recent session or some modified version thereof stored by the first employee or, indeed, a second or other employee that generates their own version.

Referring again to FIG. 45, while a virtual representation of a project space 630 including conference space walls, emissive surfaces and associated content may be accessed by employee 651' using station 630, in other cases the virtual representation may not include the walls and non-emissive surface affordances instead may only include virtual representations of the real world emissive surfaces in space 640. Here, the virtual emissive surfaces 690, 692, 694 and 696 may be suspended in the virtual world with ambient visuals (e.g., a jungle scene, rolling fields, etc.) there behind in the manner described above with respect to FIG. 44. Again, as employee 651' rotates in the virtual world to face rearward surface 694, the employee sees surface 694 suspended within ambient visuals (e.g., a jungle scene). Thus, in at least some embodiments the space arrangement data sets at 702 in FIG. 1 may simply include emissive surface arrangements corresponding to real world conference spaces instead of a full compliment of real world space affordances.

Figure 46:
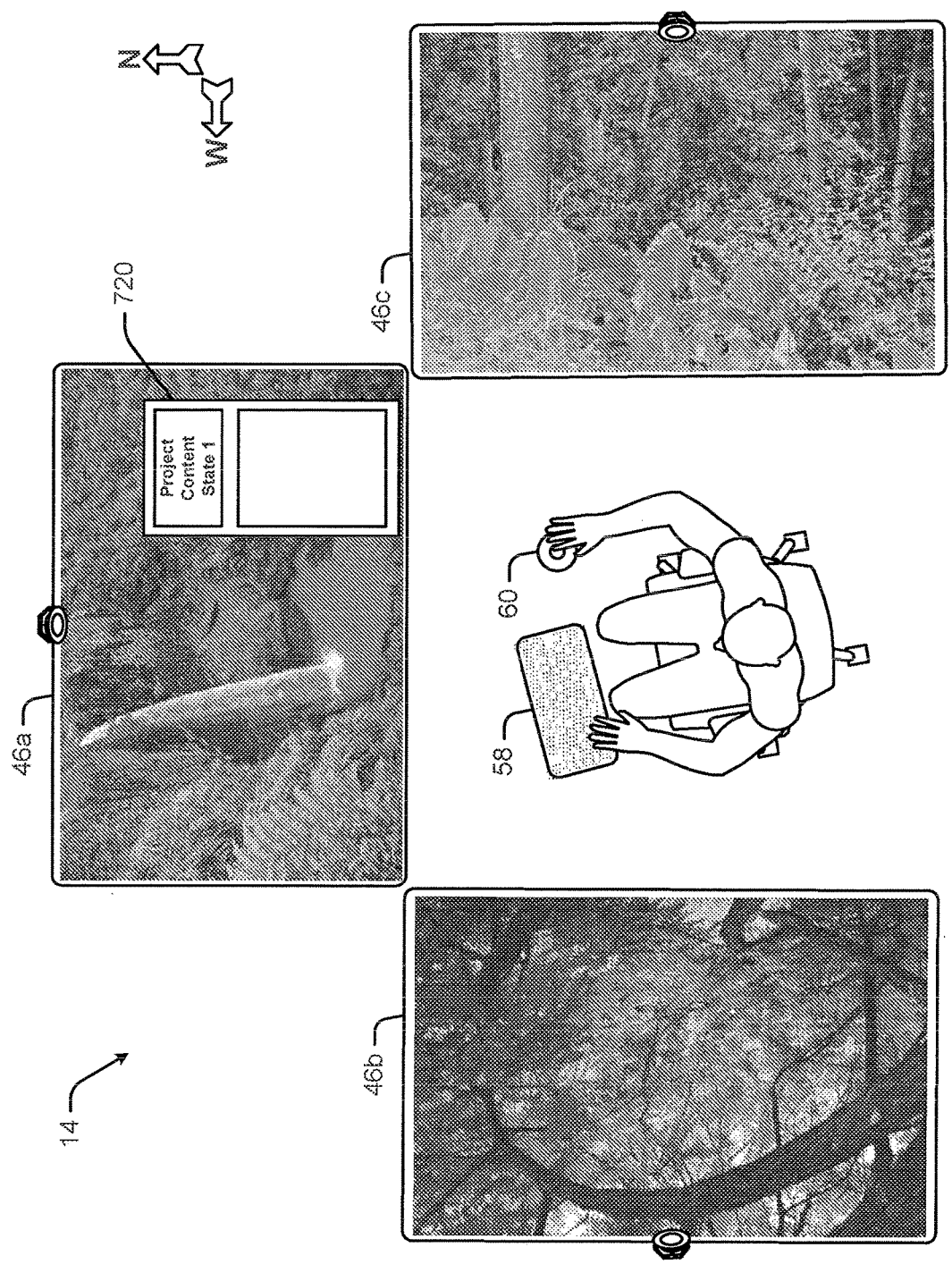
FIG. 46 is a view similar to the view shown in FIG. 8, albeit including a portal into form a VW into a virtual conference space representation that is consistent with at least some embodiments of the present disclosure.

In at least some embodiments it is contemplated that one or more project spaces may persist in a virtual world over time so that, to access the project space and content associated therewith, the employee can simply go to the VW location associated with the project space. For instance, see the Project Content State 1 tag 710 in FIG. 17 that corresponds to a first team project. Here, once a project content state has been stored for the first project in database 700, an employee associates the first project and the content state for that project with the location of tag 710. Then, whenever the employee travels to the location of tag 710, the employee is provided with the virtual representation of the current project content state. Here, the project content may be presented as content on virtual suspended surfaces (see again FIG. 44) at the location of tag 710 or, as an alternative, as a portal into the virtual conference space associated with the project content state. Thus, for instance, an exemplary portal into the space may include a labeled door as shown at 720 in FIG. 46. Here, by selecting or perhaps virtually travelling through the door type portal 720, an employee may be able to access the virtual representation of the project content state including, for instance, instantaneous project content on virtual surfaces in a virtual conference space including walls and other affordances as described above. While one portal is shown at 720, it is contemplated that an employee may create many different portals in a VW, one for each project that the employee participates in. While the portal in FIG. 46 is shown as a door, other portal representations are contemplated.

In at least some cases a single project content state may be maintained and used to drive project representations any time the content state is accessed so that virtual and real world project representations are always consistent. Thus, for instance, in FIG. 45, any project content state changes made in space 640 may be reflected in the project content state presented at station 630 and vice versa. While content access in space 640 and at station 630 is described above as occurring at different times, in at least some embodiments it is contemplated that a first employee may use station 630 to remotely participate in a conference with other employees in real world space 640. Here, any project content state modifications at either station 630 or in space 640 may be automatically presented at the other of the station 630 and space 640 essentially in real time. Thus, for instance, if a first employee at station 630 were to open a new document on virtual surface 690, an instance of that document would also be opened on real world surface 670 in space 640 for employees in space 640 to see.

Referring again to FIG. 1, where database 24 includes enterprise space data sets as at 702 useable to virtually represent enterprise spaces, in at least some embodiments an employee may be able to access a virtual representation of a real world enterprise space including a full compliment of virtual emissive surfaces arranged in the same relative juxtapositions as are real world surfaces in the enterprise space and may be able to develop content or a presentation or even a complete project content state within the virtual representation to be subsequently presented or accessed in the real world space. Thus, for instance, referring again to FIG. 45, employee 651' may use station 630 to access the illustrated VW representation shown in the cross hatched area that corresponds to space 640 and to develop content for surfaces 690, 692, 694 and 696 to be presented or accessed subsequently in space 640 by that employee or a group of employees.

In at least some embodiments there may be a history aspect to an employee's instance of a VW. To this end, because an employee can always return to any location in a VW and because a VW may facilitate a substantial amount of work product generation as well as collaborative work product in video conferences or the like, in at least some cases server 12 may be programmed to record all data developed in the VW for all activities or at least certain types of activities so that the employee can return to the specific activity when desired. For instance, assume that first, second and third employee video conference in a single VW instance and generate hundreds of documents during a several month period at a specific VW location. Here, sever 12 may store an entire record of all of the video conference activity as well as a sequence of events that resulted in the work product. In some cases the entire record may be associated with the specific VW location at which the activities were performed and the documents generated to re-experience some or all of those events and documents.

While the invention may be susceptible to various modifications and alternative forms, specific embodiments have been shown by way of example in the drawings and have been described in detail herein. However, it should be understood that the invention is not intended to be limited to the particular forms disclosed. For example, while many embodiments will include high definition 3D VW views on all emissive surfaces presented at a VW station, in other cases one or more of the views or even portions of a single view on a single surface may be blurred or otherwise visually modified in some fashion to present a different effect or to conserve processing power for other high definition views. For instance, in many cases a person can only focus on images or objects in their foveal view and simply do not have high visual acuity peripherally. Thus, For instance, in FIG. 45, employee 651' may have 100% visual acuity on surface 46a and less acuity on side surfaces 46b and 46c. Here, in many cases low definition VW views on the side surfaces would still cause a useful immersion sense for the employee 651' while requiring a reduced amount of processing power.

While 3D imagery is optimal in many embodiments of the present disclosure, in at least some cases 2D imagery or even simple abstract imagery may be presented at a VW station where the imagery is designed to help foster some intended mind state. Thus, for instance, a dynamic abstract image of stars or simple shapes or moving lines presented about an employee at station 14 may have a desired mind state effect and would be useful in at least some cases.

While optimally emissive surface should fill an employee's FOV (e.g., foveal as well as peripheral) to the extent possible, many different emissive surface arrangements are contemplated. For instance, in a very simple form a single flat panel monitor or display screen may be used by an employee to enter, travel in and manipulate a VW in ways consistent with at least some aspects of the above disclosure. As another instance two, three, four or more flat or curved emissive surfaces may be used to similar effect.

In at least some cases VW views presented on emissive surfaces may be supplemented via light devices or a projector of some type that can, at a minimum, provide a light pattern between spaced apart emissive surfaces at a VW station in an attempt to better trick an employee's eye into perceiving a VW immersion effect. TO this end, see for instance FIG. 47 where projectors 740 and 742 are included at an exemplary station 14 for projecting at least light onto surfaces that can be seen by an employee between adjacent emissive surfaces as shown at 750 and 752. Here, in at least some embodiments the projected light 750 and 752 would have a color that is at least somewhat similar to a primary color of the ambient visuals presented on the emissive surfaces to facilitate the illusion of a contiguous VW scene. Thus, in FIG. 47 where a primary jungle color is green, the projected light at 750 and 752 may also be a similar green color.

Figure 47:
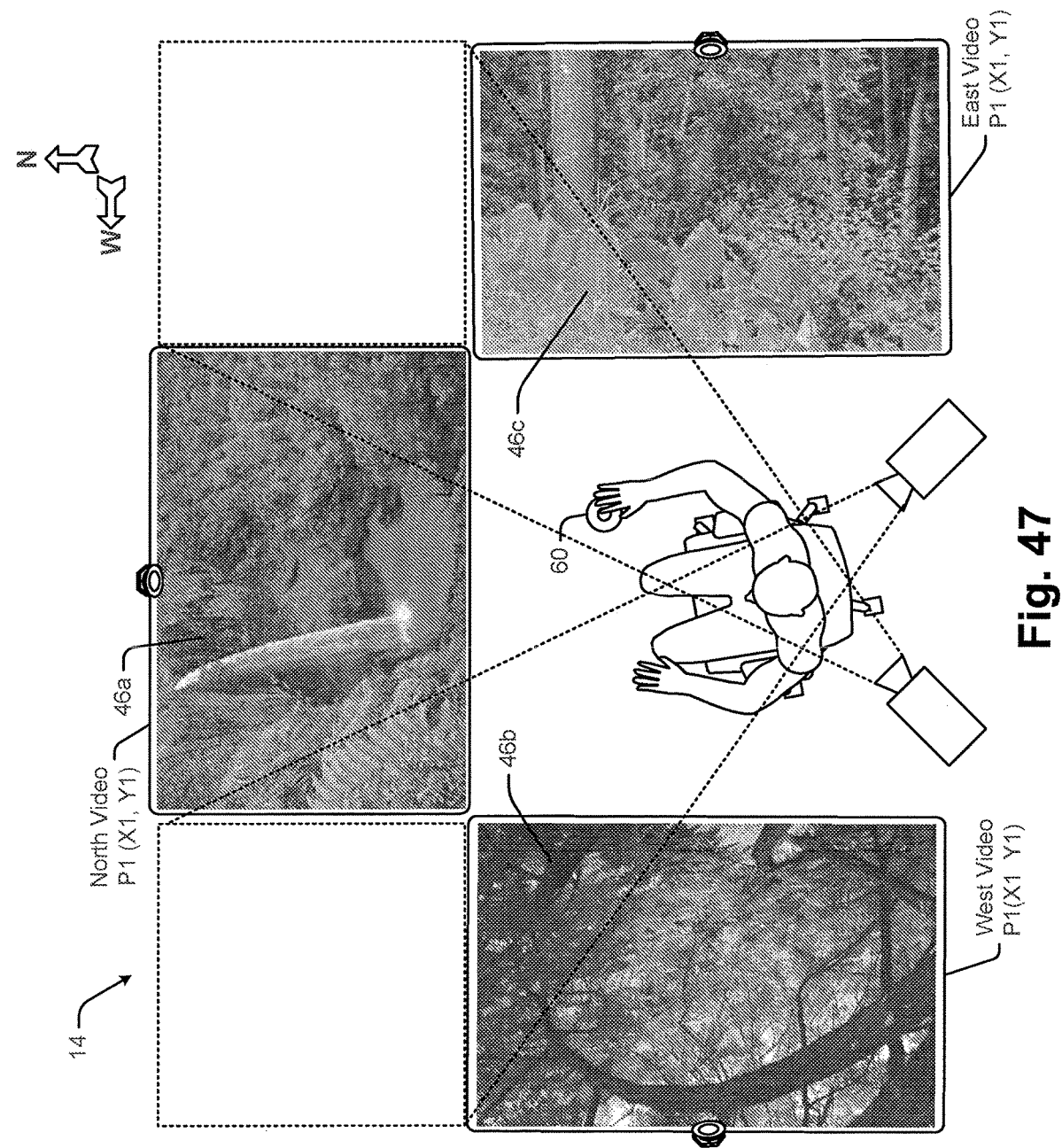
FIG. 47 is similar to FIG. 46, albeit showing a station including additional projectors for projecting at least some visual effects into non-emissive space between adjacent relatively high definition emissive surfaces.

Referring still to FIG. 47, in other cases a system server may be programmed to examine views into the VW dataset used to generate the views on surfaced 46a through 46c to identify a prominent color in views between each two adjacent high definition views presented on the surfaces 46a through 46 c and may project light consistent with the identified prominent color. In still other cases the server may project a low definition VW view into the intermediate spaces between the HD surfaces 46*a* through 46*c*. While shown between surfaces 46*a* through 46*c*, it should be appreciated that other surfaces about a station 14 that do not include emissive HD capabilities may be projected onto in a similar fashion. In addition, devices other than a light projector may be used to illuminate the intermediate surfaces such as for instance, Hue LED light devices by Phillips mounted to the rear surfaces or side edges of one or more of the assemblies 40*a* though 40*c* controllable to generate any of thousands of different light colors on a surface (e.g., a wall surface) behind one of the assemblies 40*a* through 40*c*.

Referring to FIG. 3, while several interface devices have been described above, others are contemplated such as, for instance, a table top 41 that includes an emissive touch sensitive surface. Here, for instance, any of the table type interfaces (e.g., see FIGS. 17, 18, etc.) described above may be provided on surface 41 to enable employee interaction with the system and within a VW generally.

In cases where a VW station includes sensors for sensing employee conditions like flow, biometric parameters, etc., a system server may be programmed to gamify an employee's activities and more specifically how quickly an employee can change perceived mind state between different activity types. For instance, where an employee is transitioning from a stressful teleconference to a rejuvenation activity at a specific VW location, system sensors (e.g., cameras, biometric sensors attached to the employee or proximate the employee (e.g., within a chair occupied by an employee, within a work surface, etc.) may sense various parameters useful to detect flow or other interesting conditions and may report back to the employee on how successful the employee has been in transitioning between states, how deeply the employee achieves flow, etc. Here, a transition score and a flow score may be generated and reported back to the employee for consideration. Transition and flow scores may be stored over time and used to show trends and set goals for the employee. In addition, the scores may be used by the system to generate advice for the employee on how to achieve better scores in the future so that the system effectively operates as a transition and flow coach. Here, many employees will naturally create a game out of the entire experience attempting to achieve better scores over time and to identify VW experiences that are optimized for specific activities for the specific employee.

It has been recognized that people often times associate specific encountered information with a temporally proximate visual experience. For instance, where a logo is associated with a meeting in which an employee views various project materials, the logo may subsequently be used to re-trigger memories associated with the logo. In at least some embodiments it is contemplated that employee memory of project or session content may be augmented by spatializing information or content within a VW. Thus, a VW view itself, experienced temporally proximate viewing specific content, can operate to augment an employee's memory of that content.

Figure 48:
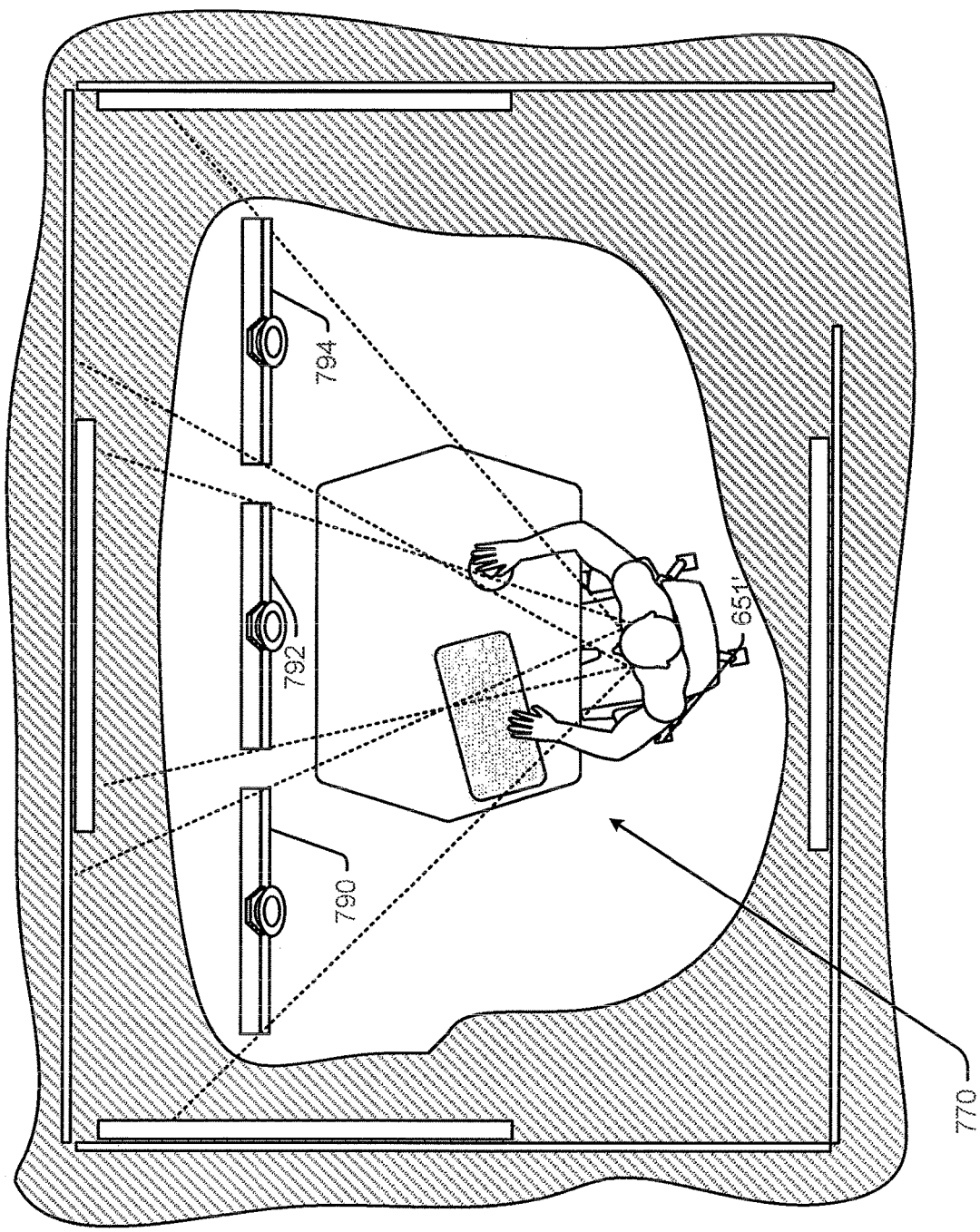
FIG. 48 is a top plan view of a VW station with a virtual conference space shown there around.

In still other embodiments emissive surfaces in the real world may be arranged in any fashion with non-emissive space there between and the views into a VW through those surfaces from an employee emersion point or location in the real world may be generated and placed on those real world surfaces to cause an emersion effect despite the non-emissive space between the adjacent surfaces. For instance, see FIG. 48 where a station 770 similar to the station 630 shown in FIG. 45 is illustrated. In FIG. 48, flat emissive surfaces 790, 792 and 794 are spaced apart but positioned within a single plane. Here, by presenting VW views from the employee's real world location through the surfaces 790, 792 and 794, an emersion effect occurs despite the non-emissive space that separates each two adjacent real world emissive surfaces.

In some cases other VW station configurations or conference spaces are contemplated. For instance, U.S. patent application Ser. No. 62/169,645 which was filed on Jun. 2, 2015 and is titled "Affordance Template System And Method" describes various conference spaces with different emissive surface arrangements as well as a template system to help system users understand capabilities of different conference spaces and associated affordances when developing content for a meeting or a session. Any of the concepts in the '645 application may be combined with the teachings in this specification to yield useful configurations and systems. The '645 application is incorporated herein in its entirety by reference. U.S. application Ser. No. 14/500,155 filed on Sep. 14, 2014 and titled "Emissive Surfaces And Workspaces Method And Apparatus" describes other conference space configurations as well as an interface system for controlling content presented in windows on emissive surfaces and any of the concepts described in the '155 application may be combined with the present application concepts to yield other useful systems.

Thus, the invention is to cover all modifications, equivalents, and alternatives falling within the spirit and scope of the invention as defined by the following appended claims. To apprise the public of the scope of this invention, the following claims are made:

What is claimed is:

1. A conferencing system comprising:
   at least a first processor;
   a first workstation comprising:
   (i) at least a first emissive surface that includes at least first and second emissive surface portions arranged to face a first user location at the first workstation;
   (ii) a plurality of cameras supported at different radial locations about the first user location and each having a trajectory aimed substantially at the first user location;
   (iii) a sensor for detecting an eye gaze direction of a user at the first workstation; and
   wherein the processor is programmed to select video of the user from one of the cameras at the first workstation to present at a second workstation at least in part as a function of the eye gaze direction of the user at the first workstation.

2. The conferencing system of claim 1 wherein the first and second emissive surface portions are arranged at different radial locations about and facing a first user location at the first workstation, the first emissive surface portion is located in front of the first user location substantially perpendicular to a horizontal first radial trajectory outward from the first user location, the second emissive surface portion is located to a lateral side of the first user location substantially perpendicular to a horizontal second radial trajectory outward from the first user location where the second radial trajectory forms a first angle with the first radial trajectory, the first angle being one of a right angle and a first acute angle.

3. The conferencing system of claim 2 wherein the plurality of cameras includes a first camera radially arranged along a horizontal third radial trajectory aimed at the first user location wherein the third radial trajectory forms a second acute angle with the first radial trajectory and wherein the second acute angle is smaller than the first acute angle, and a second camera radially aligned with the second radial trajectory.

4. The conferencing system of claim 3 wherein the at least a first processor receives video of a second user at the second location and presents a video representation of the second user at a location on the second emissive surface portion at the first workstation.

5. The conferencing system of claim 4 wherein the processor selects video from the second camera when the eye gaze direction of a user at the first user location is aimed at the video representation of the second user on the emissive surface.

6. The conferencing system of claim 5 wherein the processor selects video from the first camera when the eye gaze direction of a user at the first user location is aimed in a direction other than at the video representation of the second user on the emissive surface.

7. The conferencing system of claim 5 wherein the processor selects video from the first camera when the eye gaze direction of a user at the first user location is aimed substantially along the first radial trajectory.

8. The conferencing system of claim 4 wherein the plurality of cameras includes a first camera radially aligned with the first radial trajectory and a second camera arranged along another horizontal radial trajectory aimed at the first user location wherein the another radial trajectory forms an acute angle with the first radial trajectory that is equal to or smaller than the first acute angle.

9. The conferencing system of claim 8 wherein the processor is further programmed to present content on the first emissive surface portion and selects video from the second camera when the gaze direction of a user at the first user location is substantially toward the presented content.

10. The conferencing system of claim 9 wherein the processor is further programmed to present a video representation of a second user located at a remote second workstation on the second emissive surface portion and to select video from the second camera when the gaze direction of a user at the first user location is substantially toward the video representation.

11. The conferencing system of claim 1 wherein the processor is further programmed to present content on the first emissive surface portion at a location that forms a horizontal first radial trajectory from the first user location and present a video representation of a second user located at a remote second workstation on the second emissive surface portion at a location that forms a horizontal second radial trajectory from the first user location, the cameras including at least a first camera aligned with the second radial trajectory and directed at the first user location and a second camera misaligned with the first and second trajectories and aimed at the first user location, the processor further programmed to select video from the first camera when the gaze direction of a user at the first user location is directed at the video representation of the second user and to select video from the second camera when the gaze direction of a user at the first user location is directed at the content presented on the first emissive surface portion.

12. The conferencing system of claim 11 wherein the at least a first emissive surface includes first and second emissive surfaces and wherein the first emissive surface forms the first emissive surface portion and the second emissive surface forms the second emissive surface portion.

13. The conferencing system of claim 11 wherein the first and second emissive surface portions are non-parallel.

14. The conferencing system of claim 1 wherein the first and second emissive surface portions are non-parallel.

15. The conferencing system of claim 11 further including a second workstation remote from the first workstation and comprising:
  (i) at least a second emissive surface that includes at least first and second emissive surface portions arranged about a second user location at the second workstation;
  (ii) at plurality of cameras supported at different radial locations about the second user location and each having a trajectory aimed substantially at the second user location;
  (iii) a sensor for detecting an eye gaze direction of a user at the second workstation; and
  wherein the processor is programmed to select video from one of the cameras at the second workstation to present at the first workstation at least in part as a function of the eye gaze direction of the user at the second workstation.

16. The conferencing system of claim 15 wherein the processor is further programmed to present content and a video representation of a user at the first user location on the first and second emissive surface portions, respectively, and to select video from a camera at the second workstation such that, when the gaze direction of a user at the second user location is at the content, the video representation of the second user presented at the first workstation shows the second user looking in the direction of the content presented at the first station and, when the gaze direction of the user at the second user location is at the video representation of the first user at the second location, the video representation of the second user at the second workstation shows the second user looking in the direction of the first user location.

17. A conferencing system comprising:
  at least a first processor;
  a first workstation comprising:
    (i) at least a first emissive surface that includes at least first and second emissive surface portions arranged at different radial locations about a first user location at the first workstation;
    (ii) a plurality of cameras supported at different radial locations about the first user location and each having a trajectory aimed substantially at the first user location;
    (iii) a sensor for detecting an eye gaze direction of a user at the first workstation;
  a second workstation remote from the first workstation and comprising:
    (i) at least a second emissive surface that includes at least first and second portions arranged at different radial locations about a second user location at the second workstation;
    (ii) a plurality of cameras supported at different radial locations about the second user location and each having a trajectory aimed substantially at the second user location;
    (iii) a sensor for detecting an eye gaze direction of a user at the second workstation; and
  wherein the processor is programmed to present common content on each of the first emissive surface portions at each of the first and second workstations, a first user video representation of a first user at the first user location on the second emissive surface portion at the second workstation, and a second user video representation of a second user at the second user location on the second emissive surface portion at the first workstation, wherein the first user video representation shows the first user looking toward the second user location when the first user is looking at the second user video representation and shows the first user looking in the direction of the common content presented at the second workstation when the first user is looking at the common content at the first workstation and the second user video representation shows the second user looking toward the first user location when the second user is looking at the first user video representation and shows the second user looking in the direction of the common content presented at the first workstation when the second user is looking at the common content at the second workstation.

18. The conferencing system of claim 17 wherein the first and second emissive surface portions at the first workstation are non-parallel.

19. A conferencing system comprising:
   at least a first processor;
   a first workstation comprising:
   (i) at least a first emissive surface that includes at least first and second portions arranged at different radial locations about a first user location at the first workstation;
   (ii) an interface for selecting a location on the at least a first emissive surface at which a video representation of a remote user located at a second workstation is presented; and
   wherein, the processor is programmed to identify the location of the remote user representation on the at least a first emissive surface and use that location to select a camera at a second workstation from which video of a user at the second workstation is to be obtained.

20. The conferencing system of claim 19 further including a plurality of cameras supported at different radial locations about the first user location and each having a trajectory aimed substantially at the first user location, wherein the processor is further programmed to use the location of the remote user representation on the at least a first emissive surface to select a camera at the first workstation from which video of a user at the first workstation is to be obtained to be transmitted to the second workstation.

* * * * *